United States Patent [19]

Loughmiller, Jr. et al.

[11] Patent Number: 4,914,605
[45] Date of Patent: Apr. 3, 1990

[54] APPARATUS AND METHOD FOR DISPLAYING A MAP

[75] Inventors: George E. Loughmiller, Jr., Cupertino; Stanley K. Honey, Newark; Kenneth A. Milnes, Fremont, all of Calif.

[73] Assignee: ETAK, Inc., Menlo Park, Calif.

[21] Appl. No.: 309,000

[22] Filed: Feb. 8, 1989

Related U.S. Application Data

[63] Continuation of Ser. No. 663,862, Oct. 22, 1984, abandoned.

[51] Int. Cl.⁴ .......................... G09G 1/00; G09G 3/00
[52] U.S. Cl. ............................... 364/518; 364/424.01; 364/521; 364/443; 340/995
[58] Field of Search ........... 364/518, 521, 522, 424.01, 364/443, 449, 450, 460; 340/992, 995, 996, 998–990

[56] References Cited

U.S. PATENT DOCUMENTS 4,481,584 11/1984 Holland ............................... 364/424
4,608,656 8/1986 Tanaka et al. ....................... 364/449

Primary Examiner—Gary V. Harkcom
Assistant Examiner—H. R. Herndon
Attorney, Agent, or Firm—Fliesler, Dubb, Meyer & Lovejoy

[57] ABSTRACT

A computer hardware and software system and method for displaying a map of streets corresponding to an area over which a vehicle may move to assist a driver to navigate, the system displaying the map on a display based on a scale-dependent street prioritization scheme, providing on the display a vehicle position symbol indicating the current position and heading of the vehicle and a moving map which moves in translation and rotation as the vehicle moves, selectively and dynamically labelling streets on the display as the vehicle moves, and providing a destination symbol on the display indicating a desired destination or the direction to a desired destination.

37 Claims, 30 Drawing Sheets

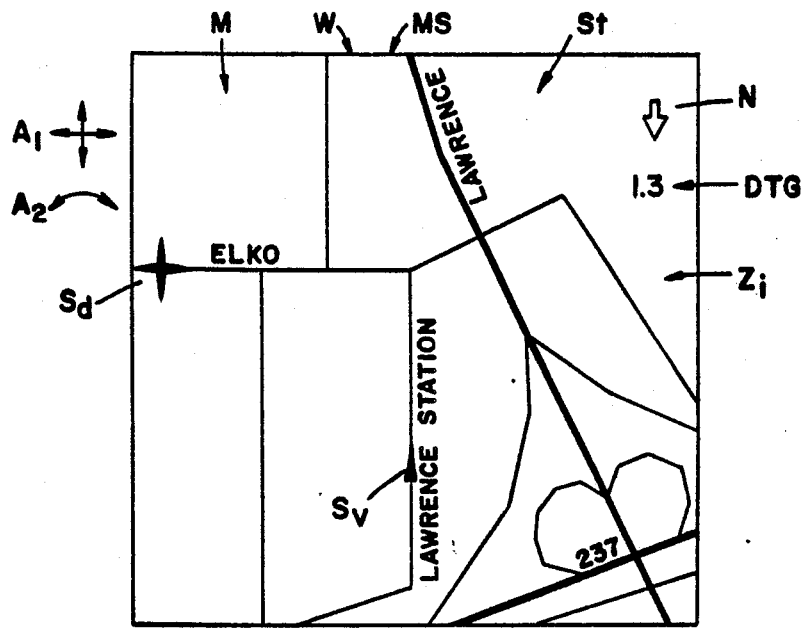
FIG _ 1
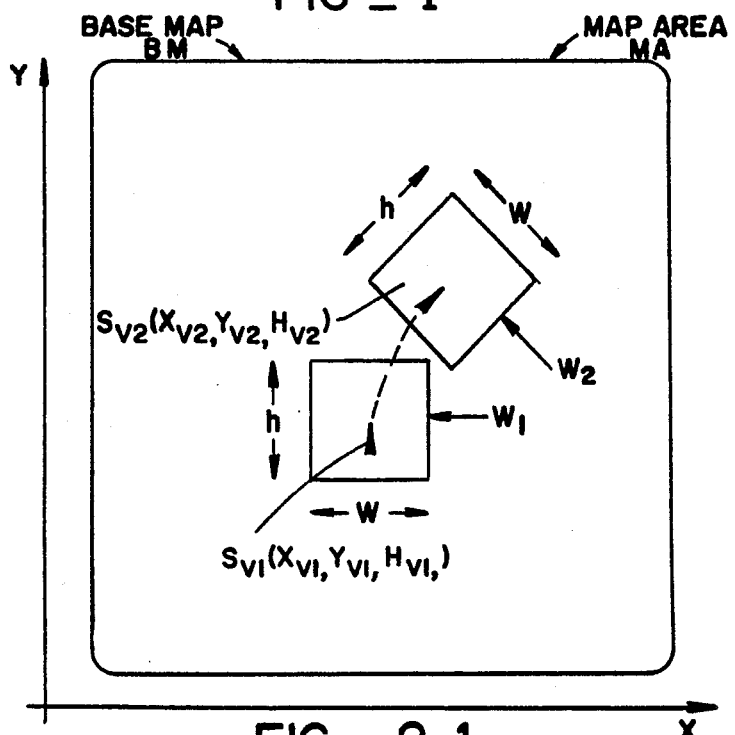
FIG _ 2-1

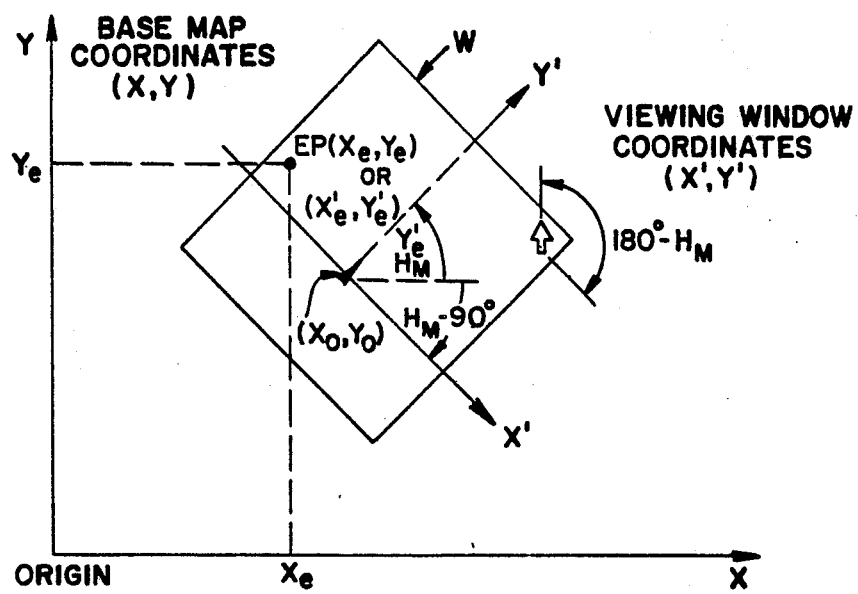
FIG _ 2-2
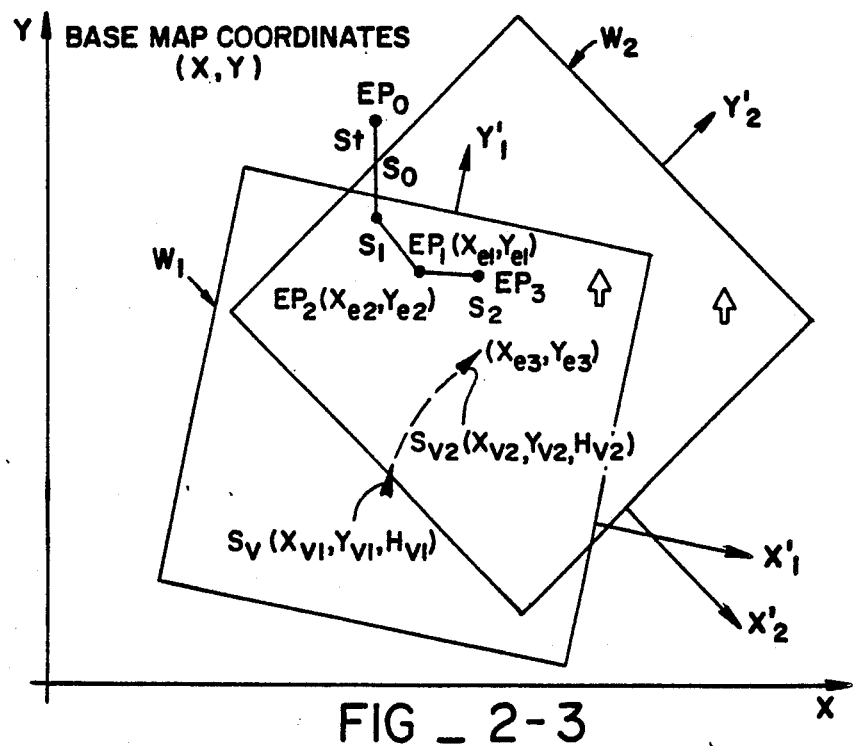
FIG _ 2-3

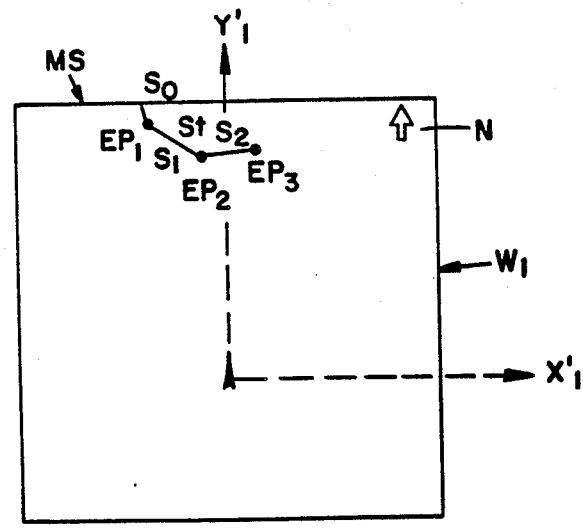
FIG — 2-3A
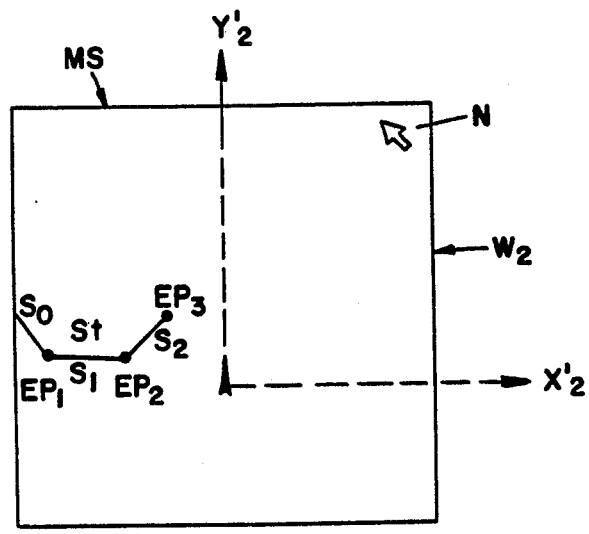
FIG — 2-3B

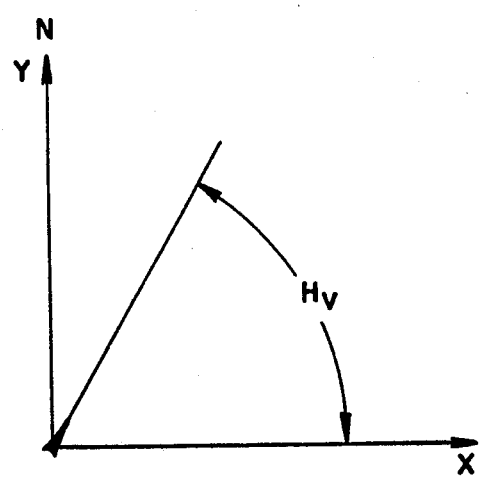
FIG _ 2-4
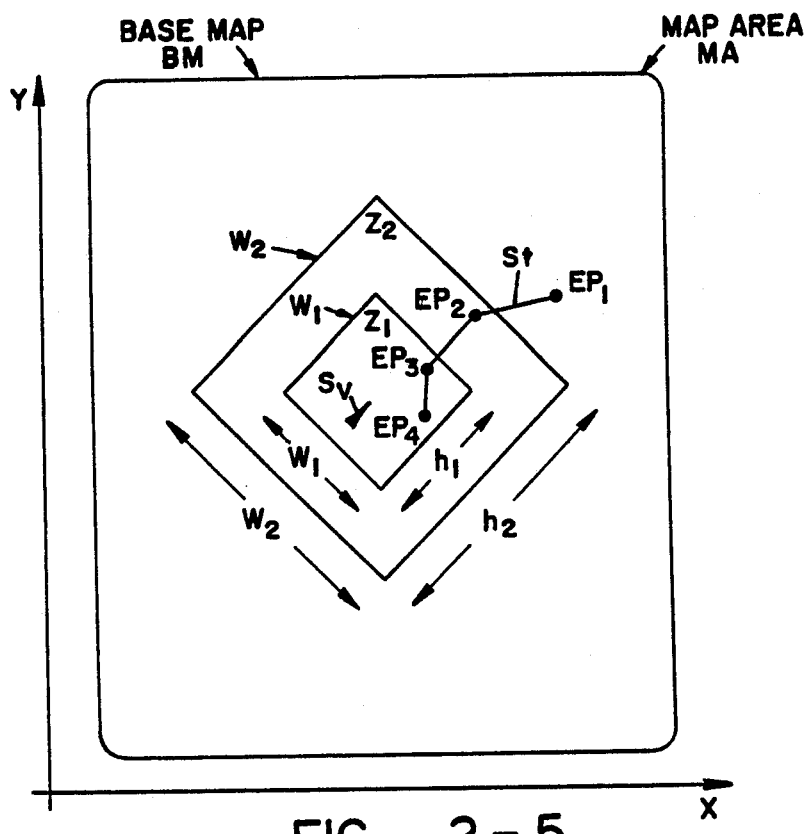
FIG _ 2-5

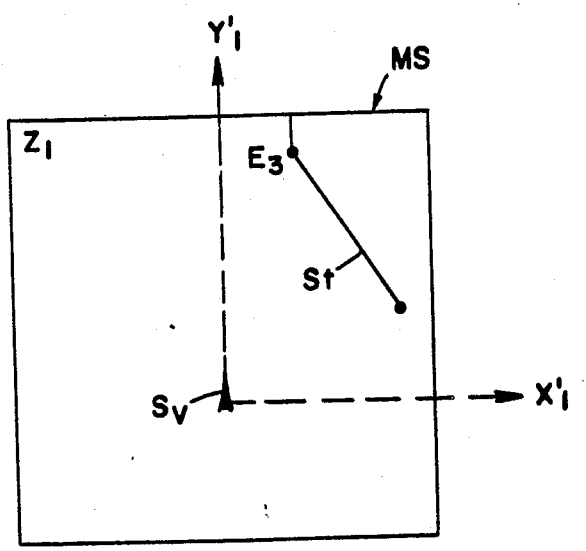
FIG _ 2-5A
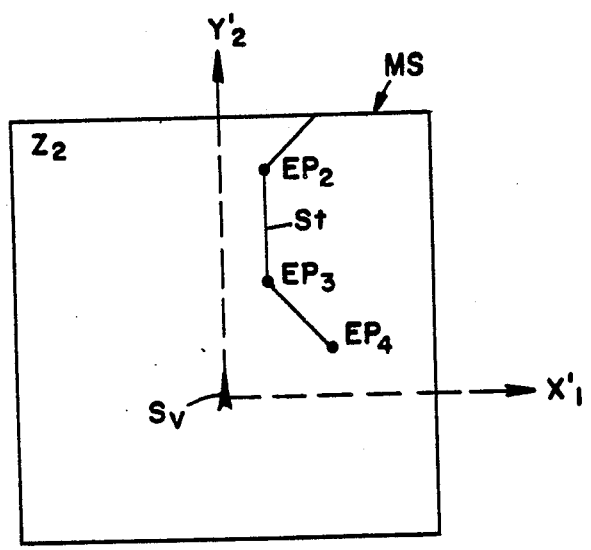
FIG _ 2-5B

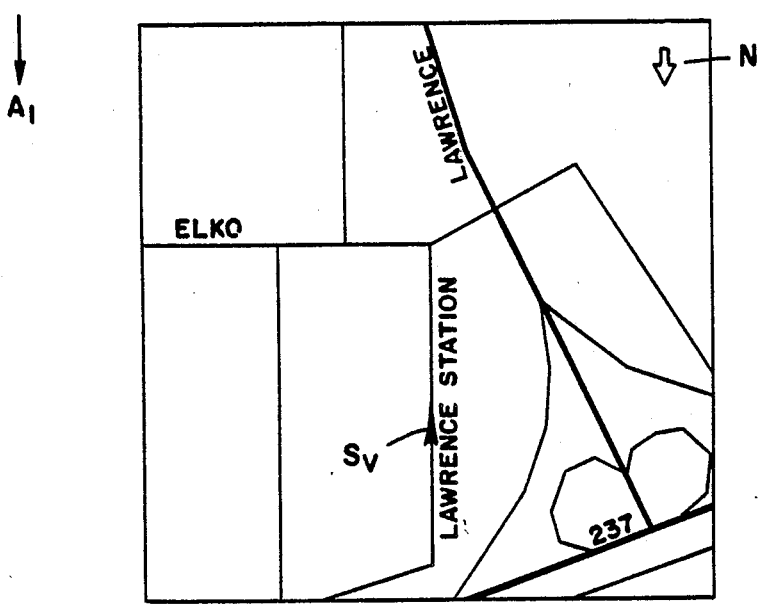
FIG _ 3A
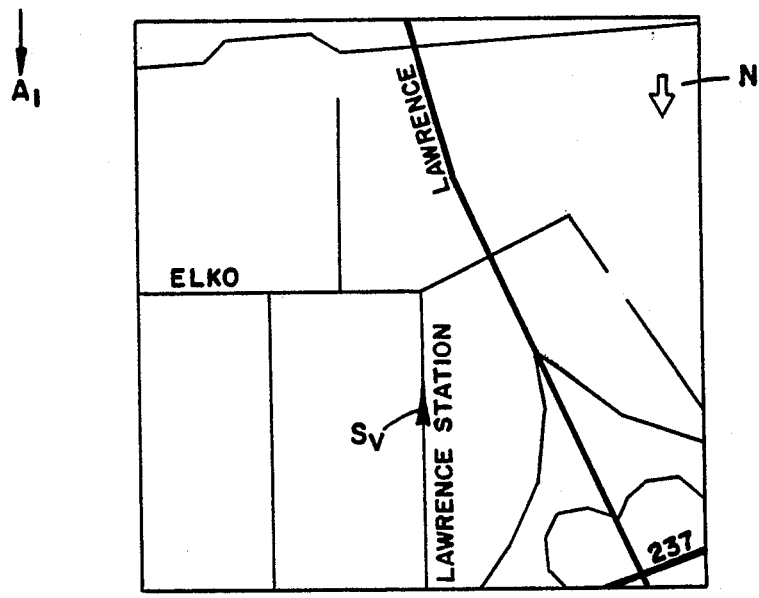
FIG _ 3B

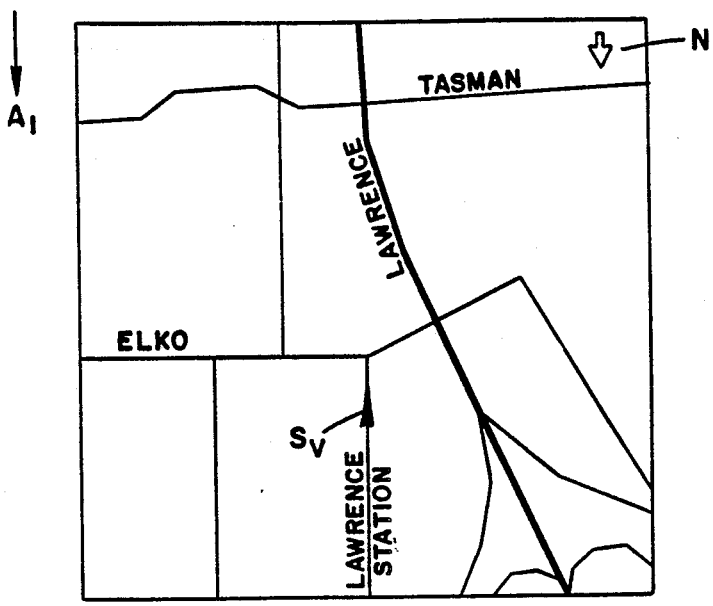
FIG — 3C
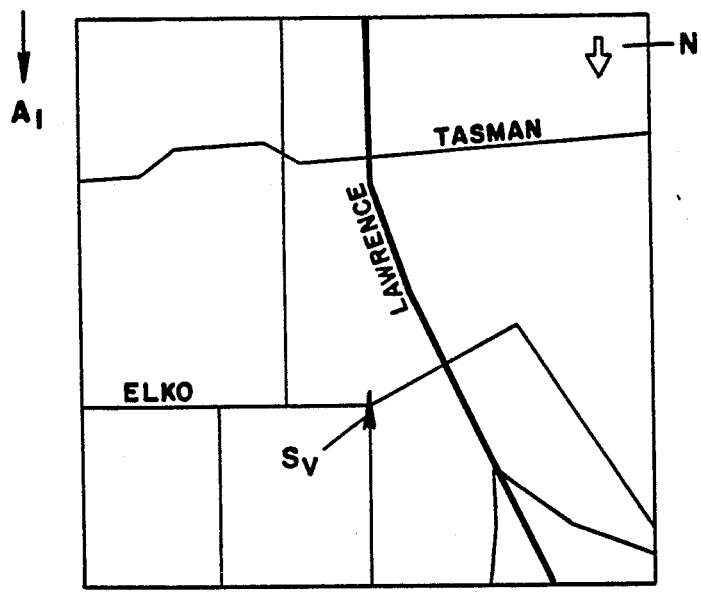
FIG — 3D

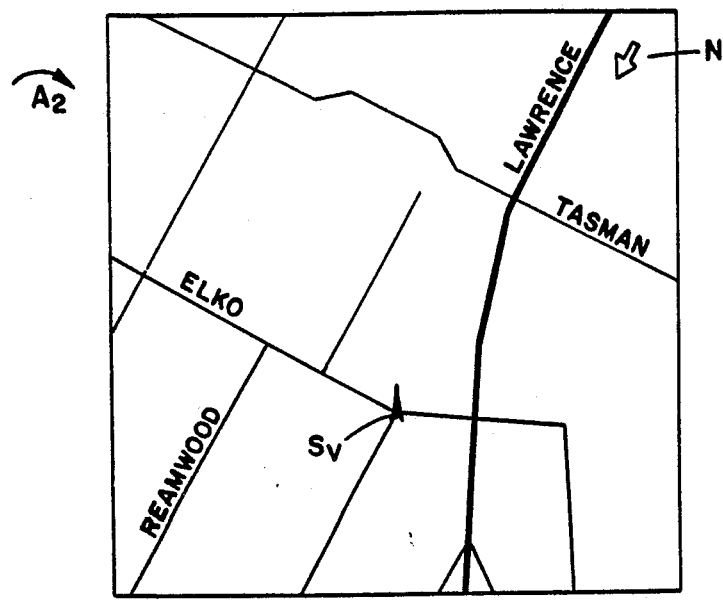
FIG _ 3E
FIG _ 3F

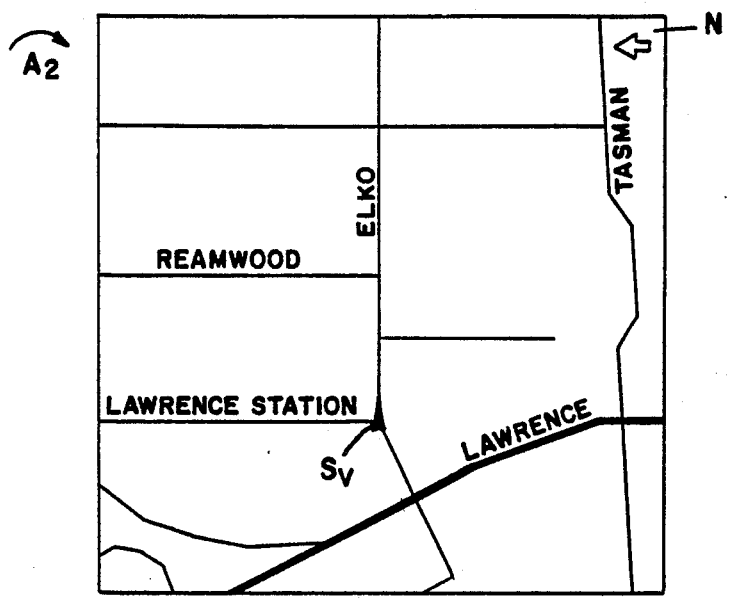
FIG _ 3G
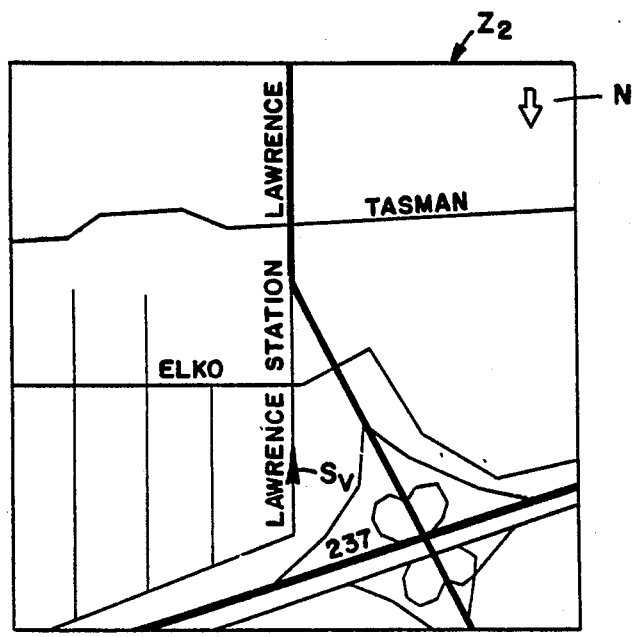
FIG _ 3H

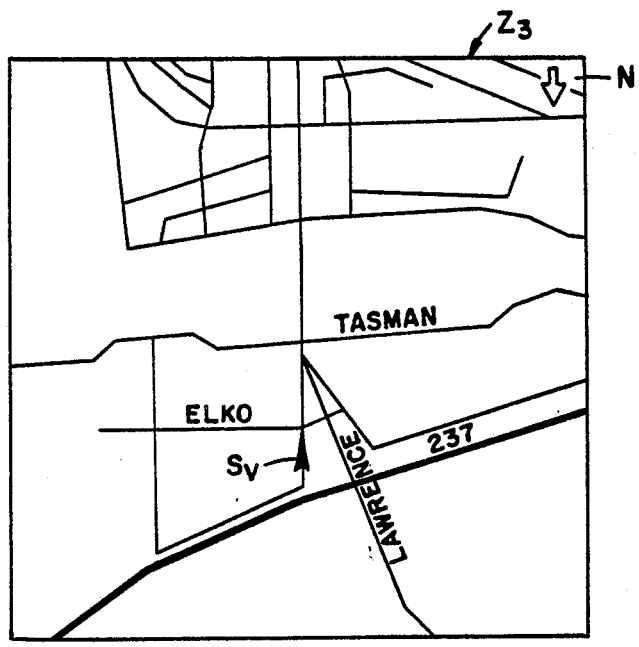
FIG _ 3I
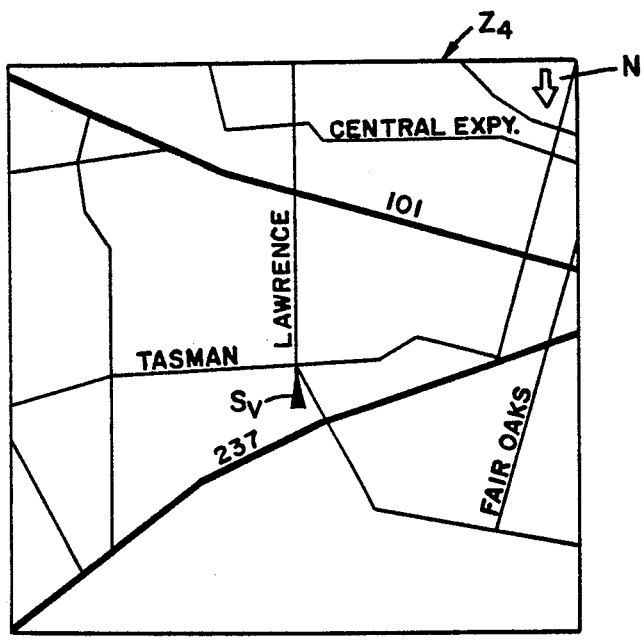
FIG _ 3J

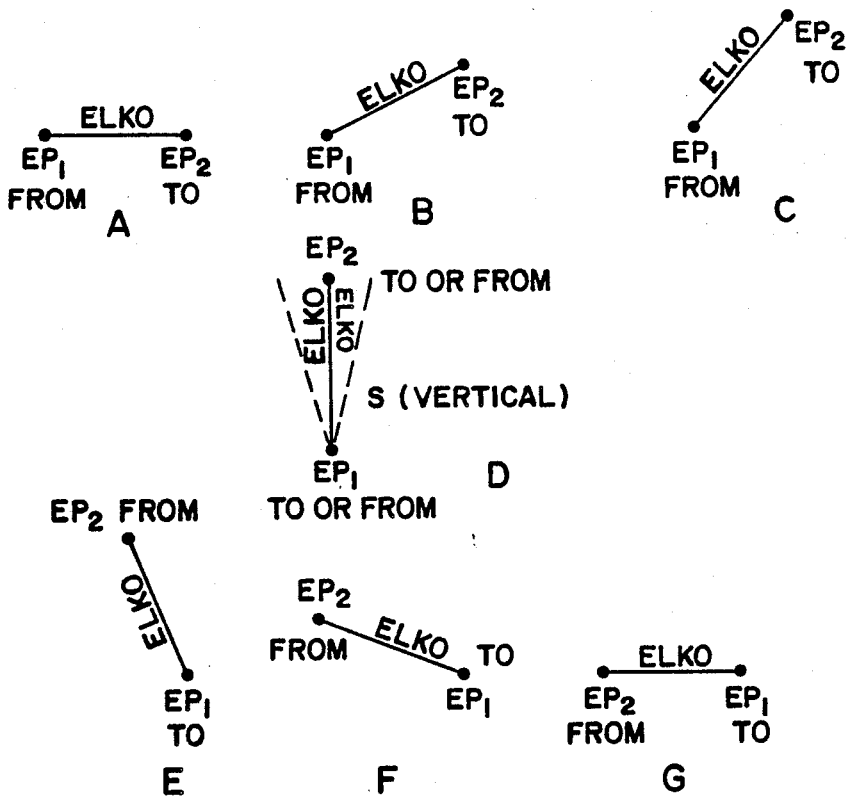
FIG _ 4
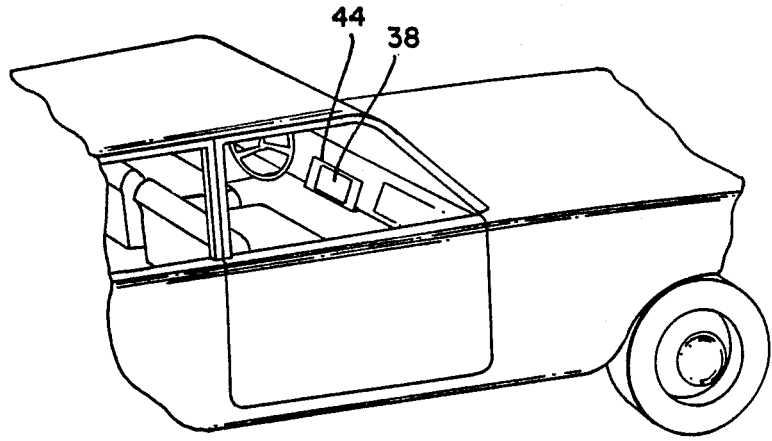
FIG _ 5A

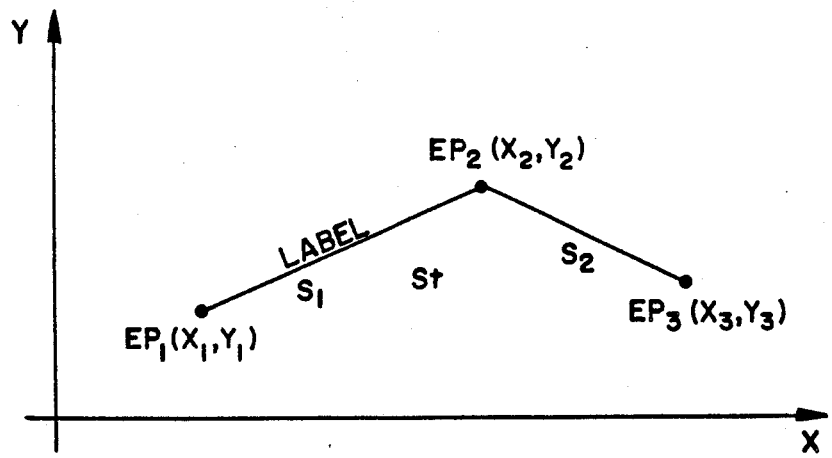
FIG _ 6A
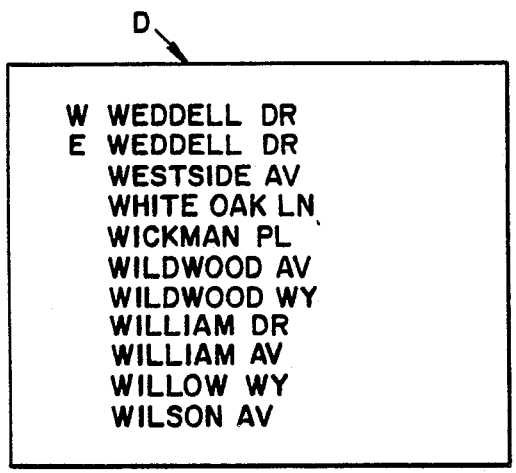
FIG _ 6B

TABLE 1

| STREET PRIORITY / SCALE LEVEL ($Z_j$) i = | 1 (FREEWAY) | 2 EXPRESSWAY | 3 ARTERIAL | 4 COLLECTOR | 5 RESIDENTIAL STREET | ... | RAMP |
|---|---|---|---|---|---|---|---|
| 0 | HIGH | HIGH | MEDIUM | MEDIUM | LOW | ... | LOW |
| 1 | HIGH | HIGH | MEDIUM | MEDIUM | LOW | ... | LOW |
| 2 | HIGH | MEDIUM | MEDIUM | LOW | — | ... | — |
| 3 | HIGH | MEDIUM | LOW | — | — | ... | — |
| 4 | HIGH | MEDIUM | — | — | — | ... | — |
| 5 | HIGH | — | — | — | — | ... | — |
| ... | | | | | | ... | |

FIG_6C

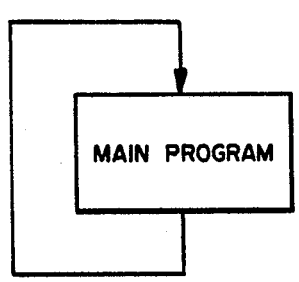
FIG _ 7A
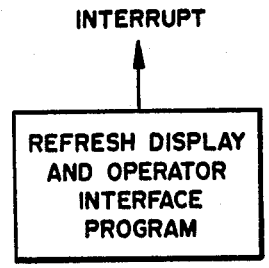
FIG _ 7B
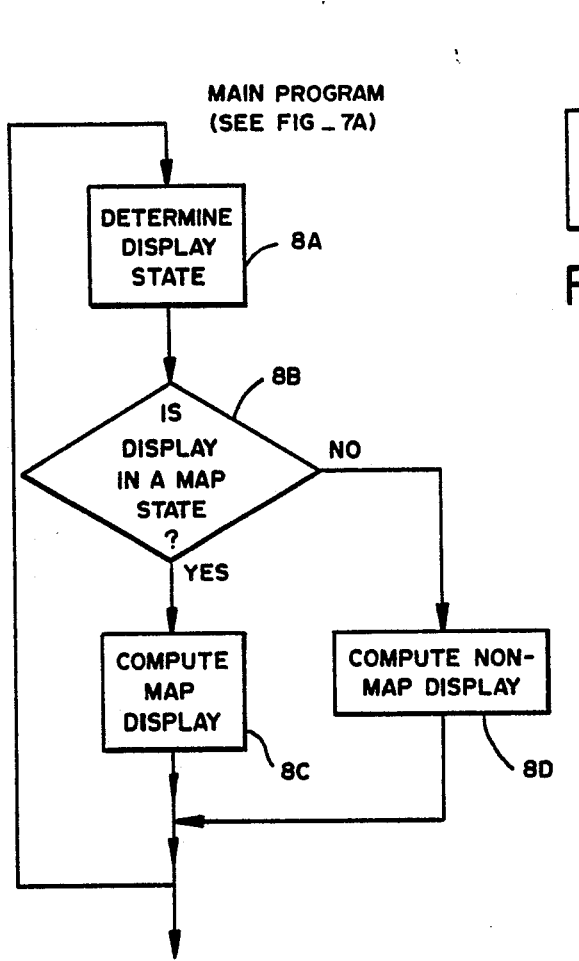
FIG _ 7C
FIG _ 8

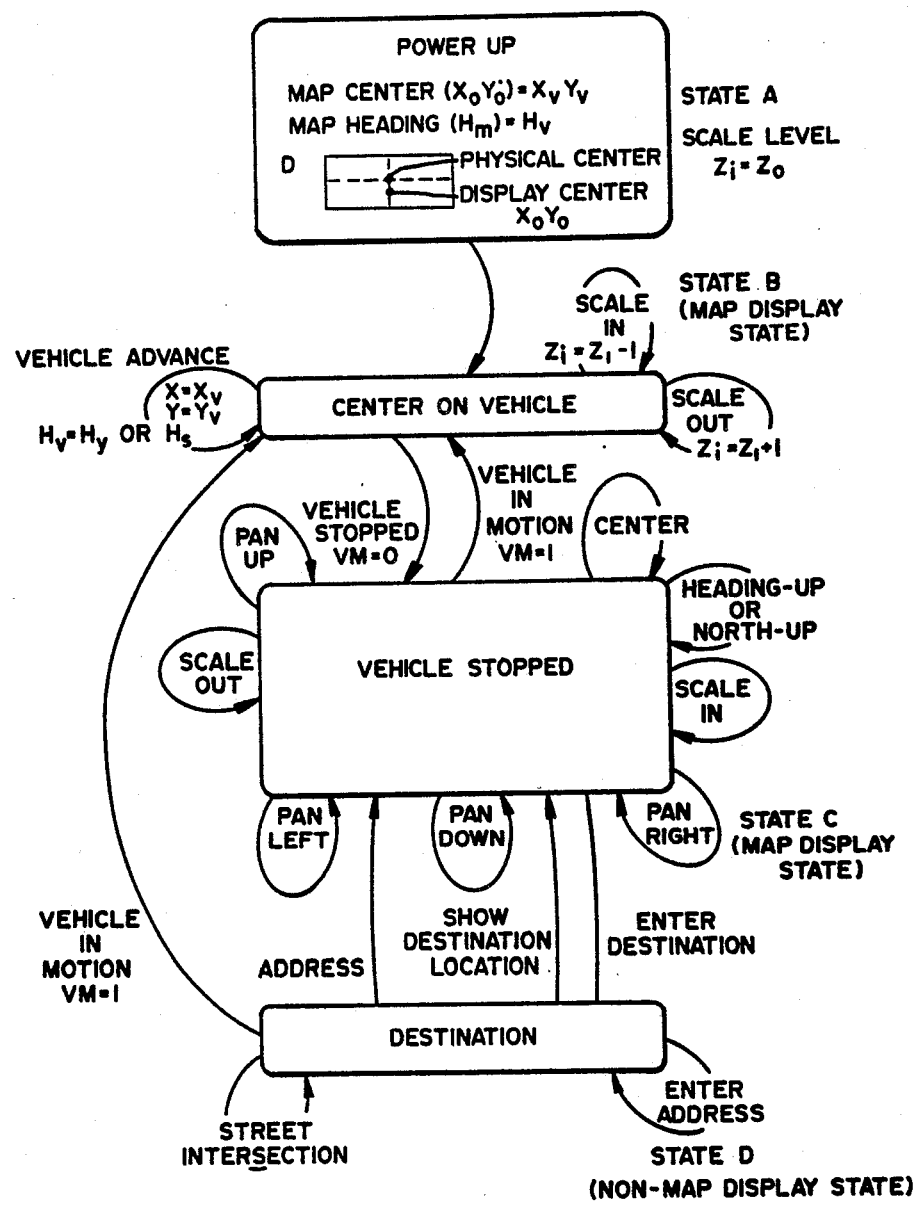
FIG _ 8A

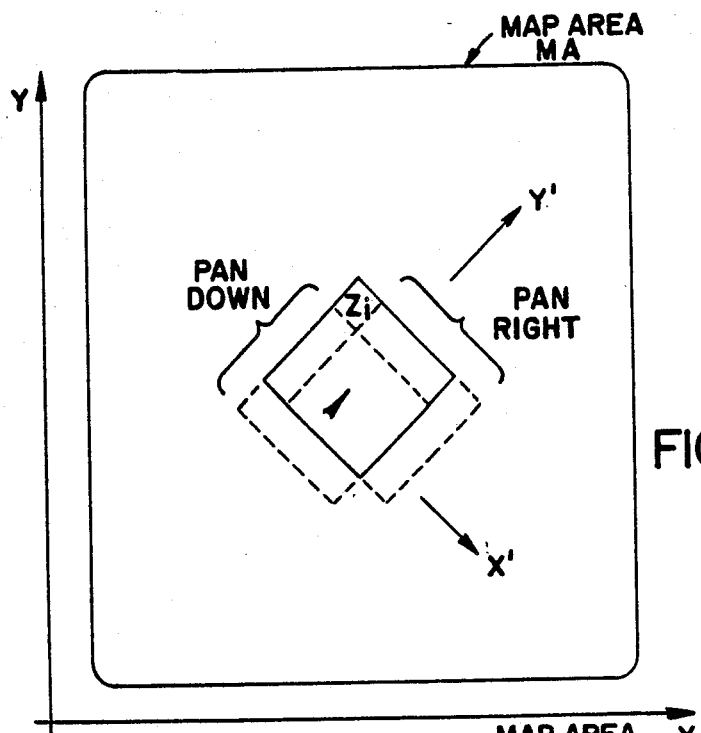
FIG _ 8A-1
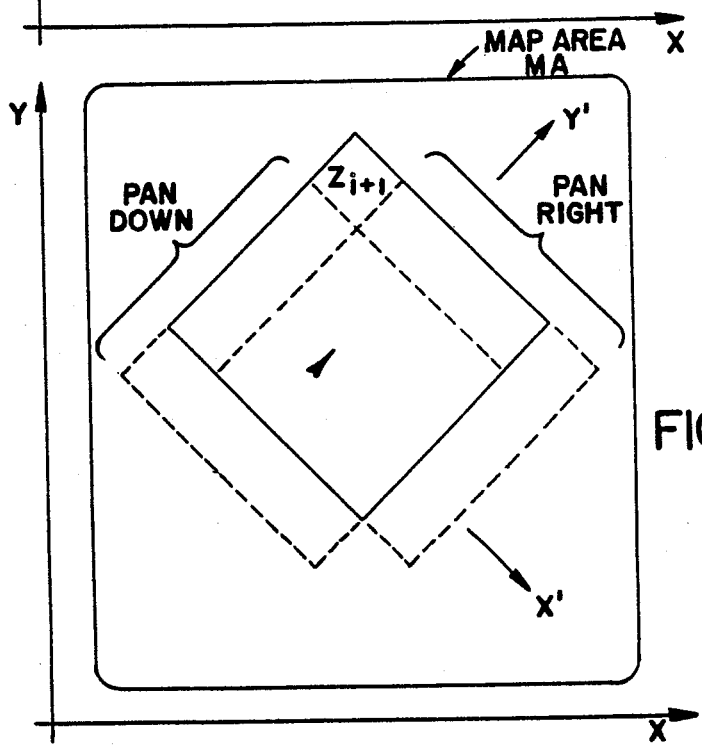
FIG _ 8A-2

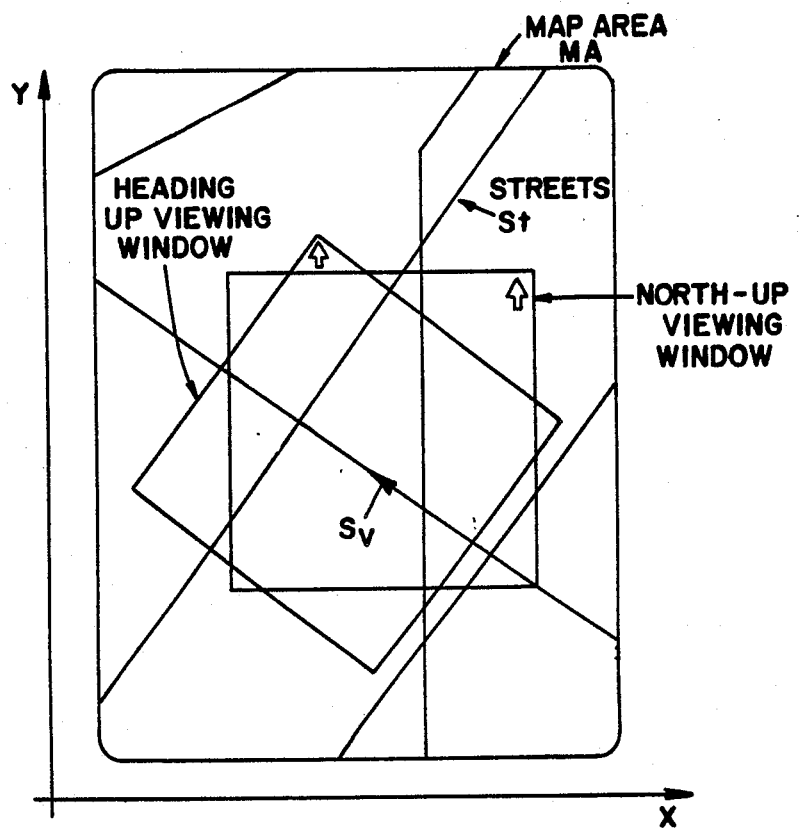
FIG _ 8B
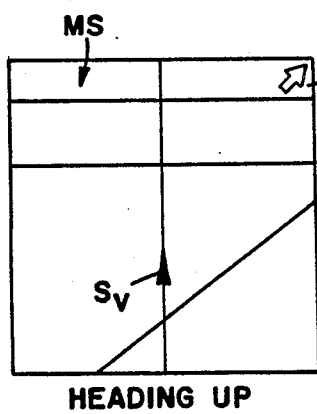
FIG _ 8B-1
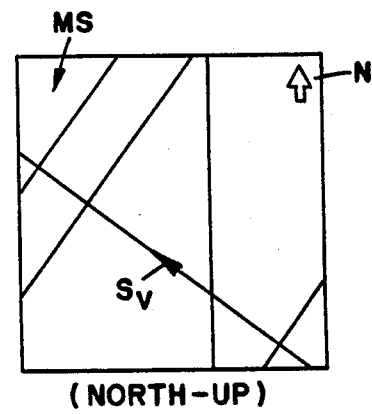
FIG _ 8B-2

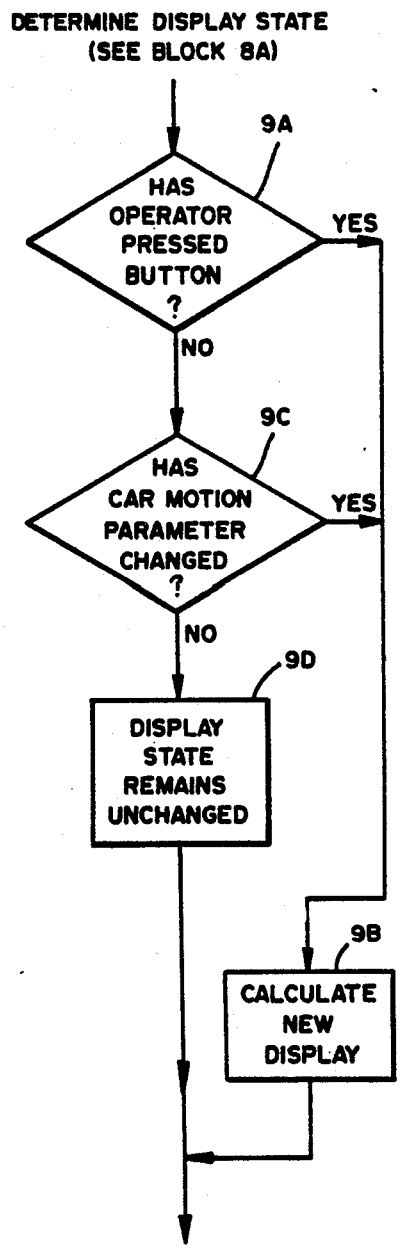
FIG _ 9
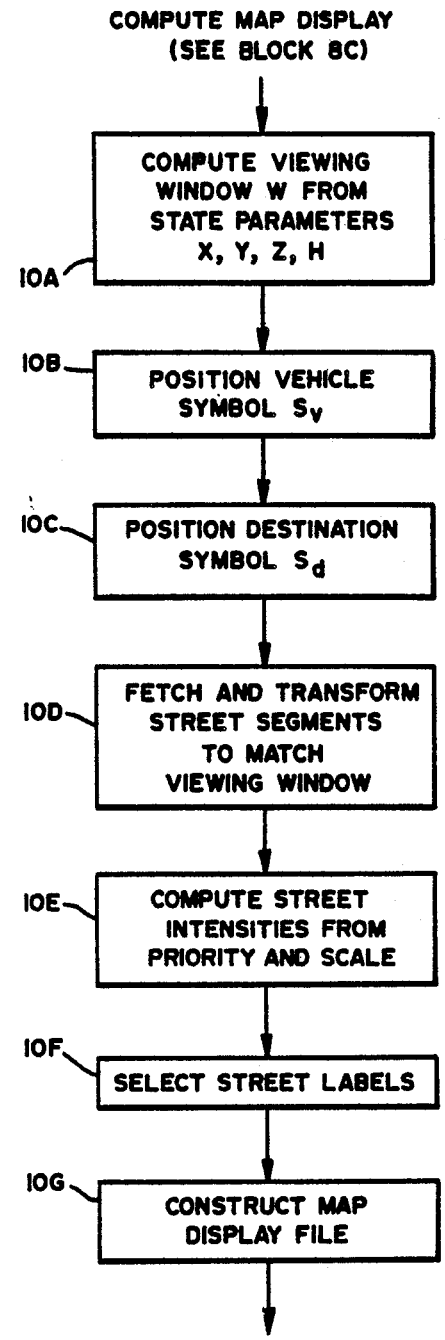
FIG _ 10

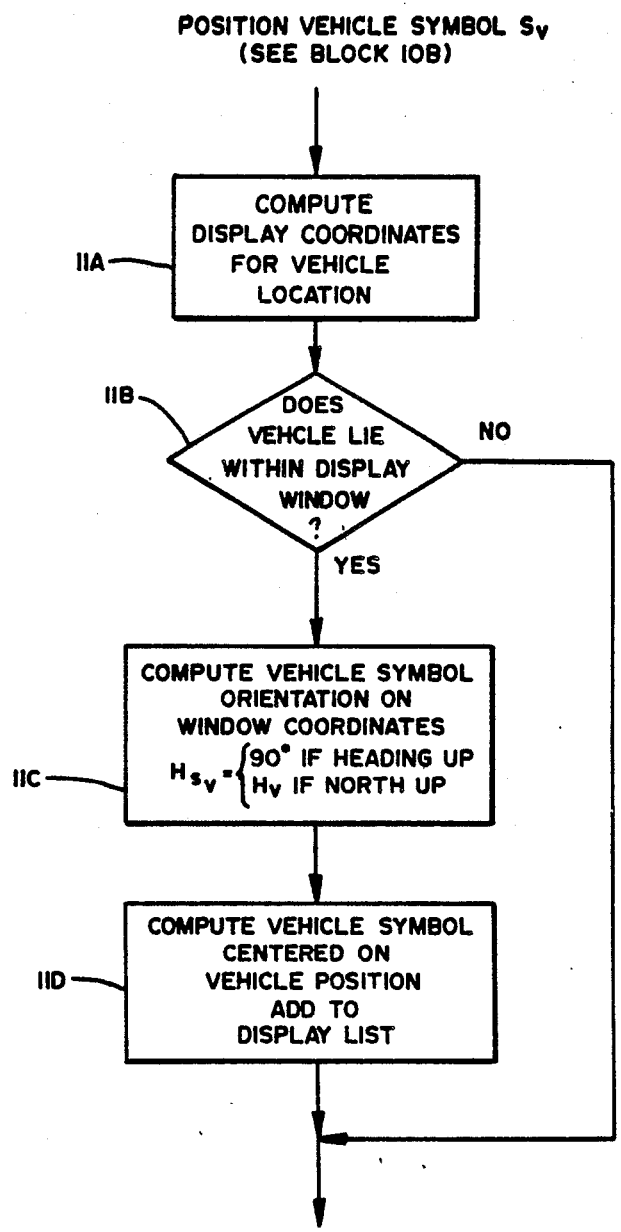
FIG _ 11

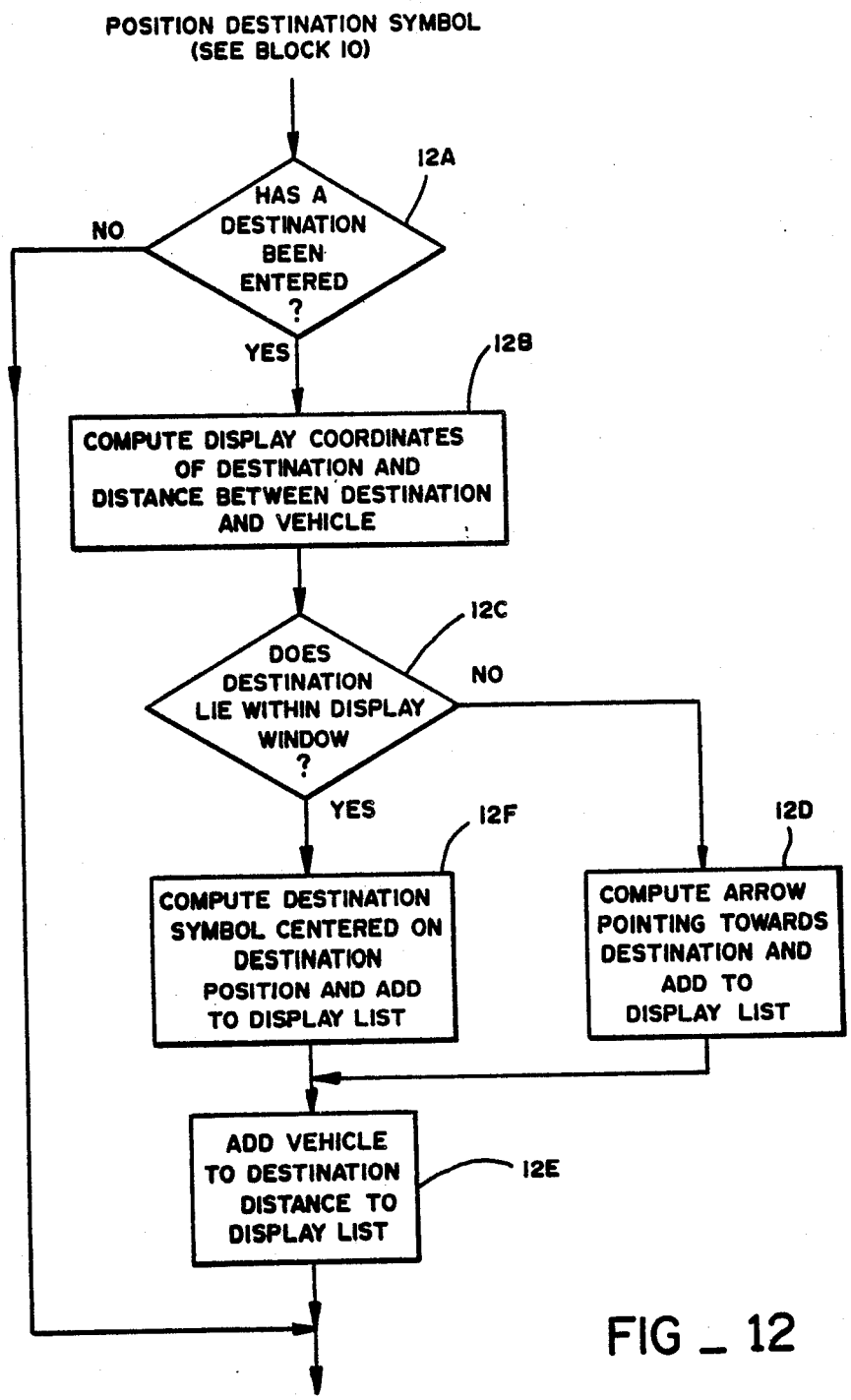
FIG _ 12

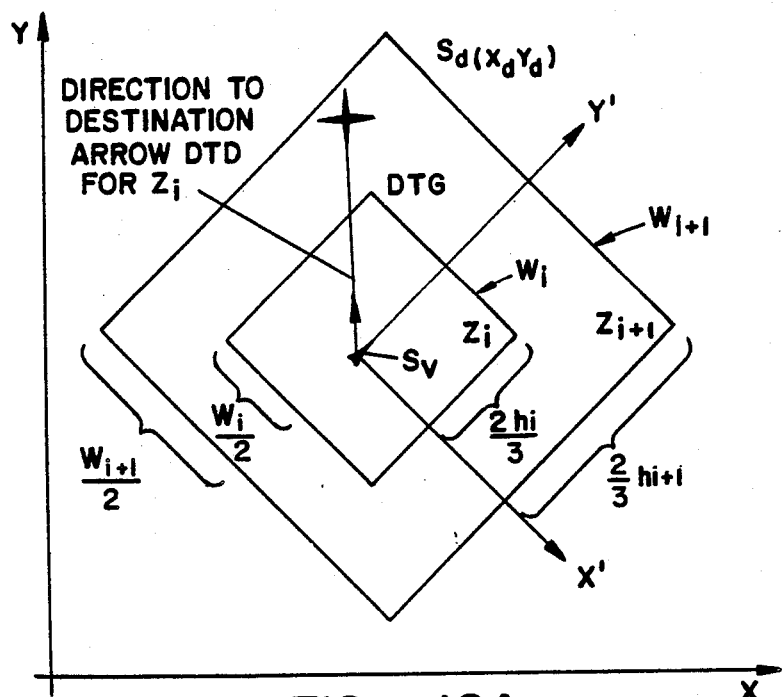
FIG _ 12A
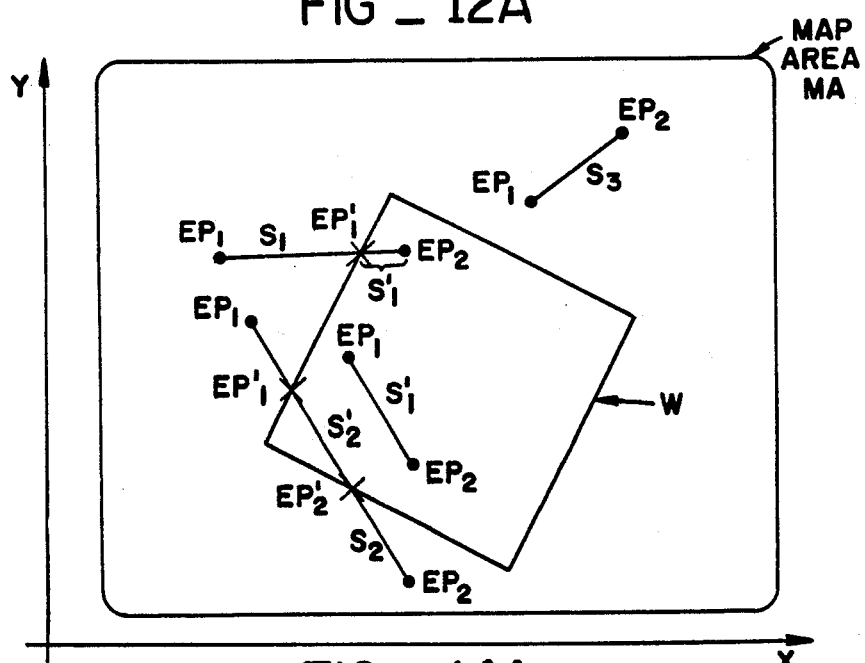
FIG _ 14A

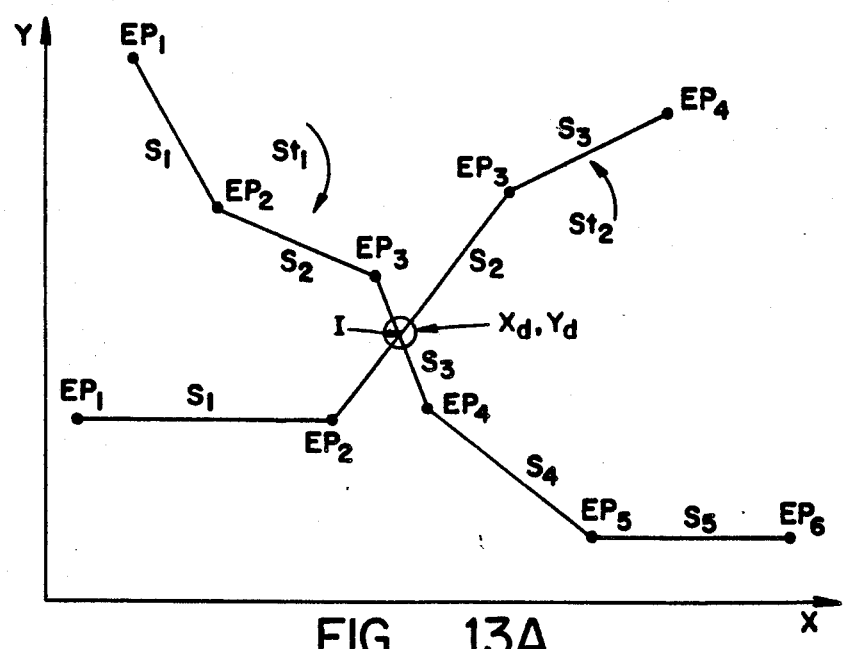
FIG_13A
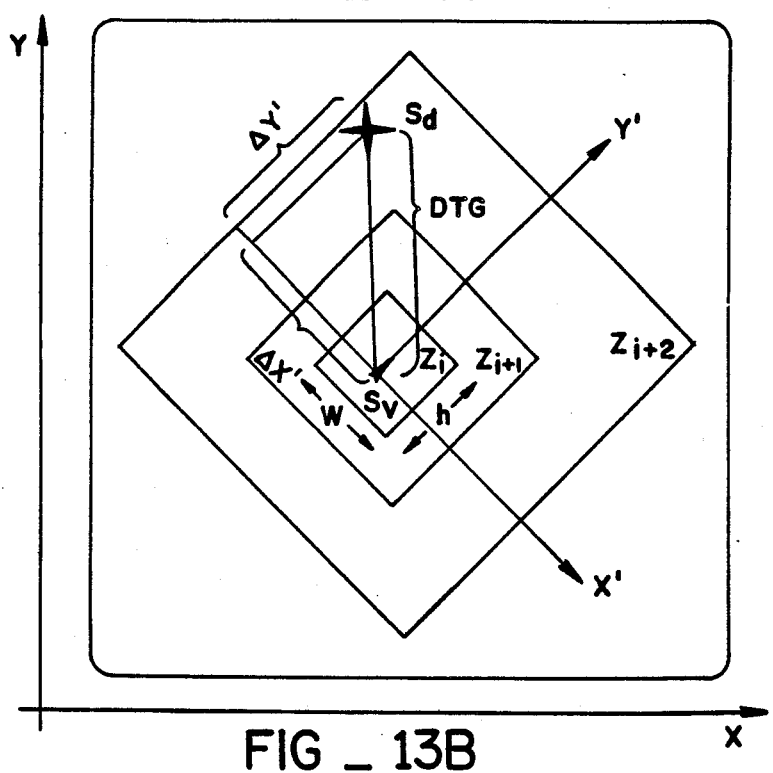
FIG_13B

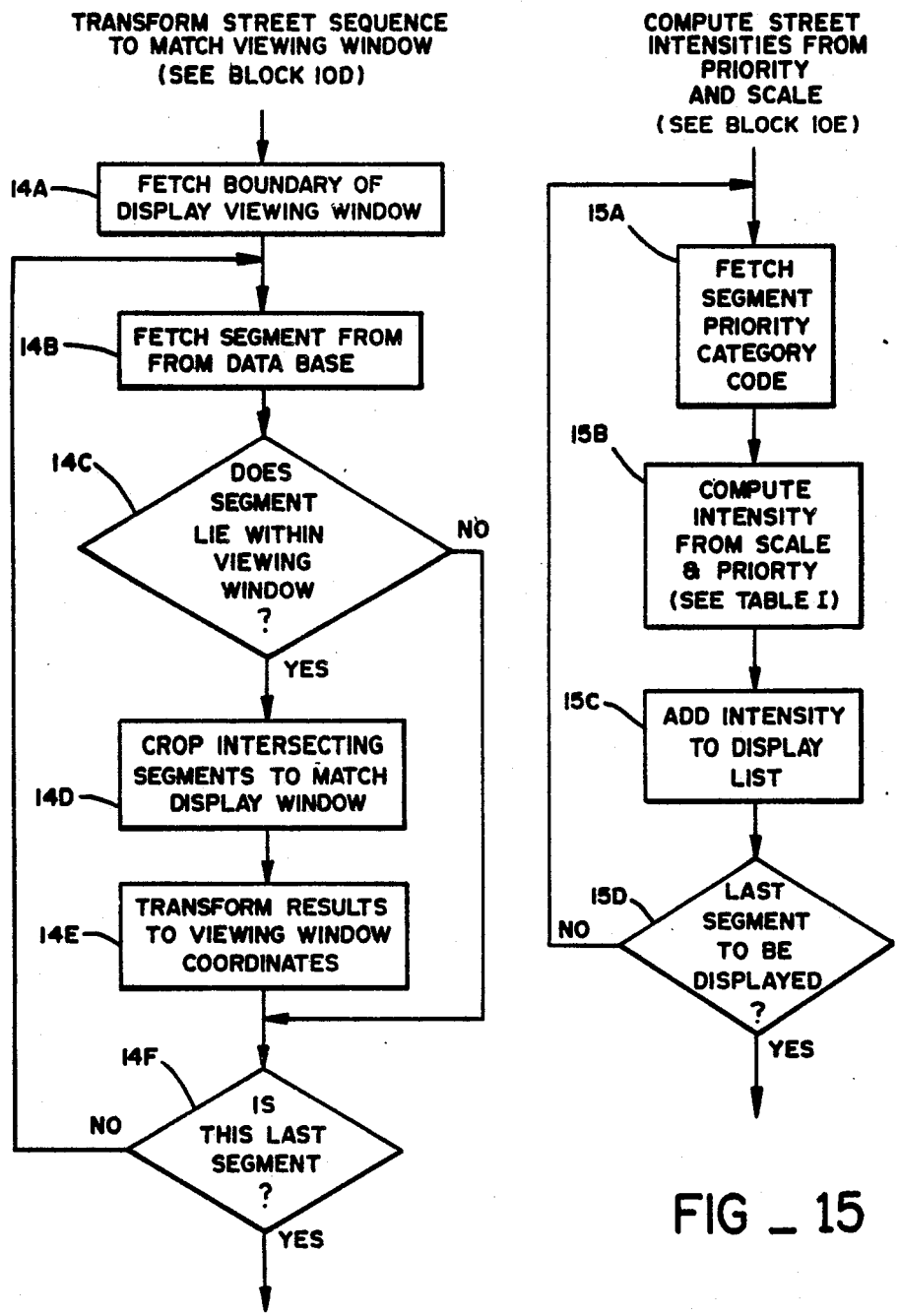
FIG _ 14
FIG _ 15

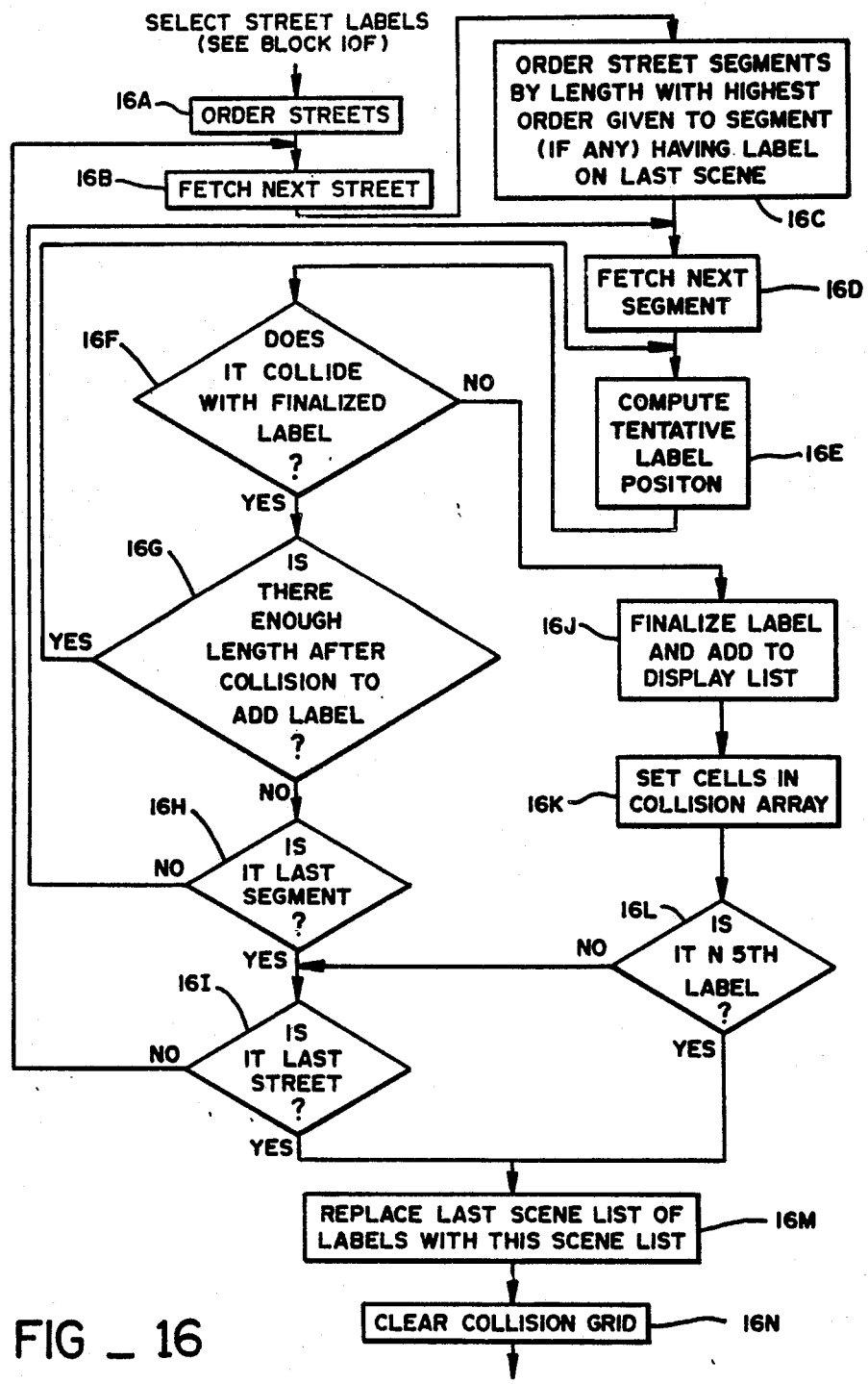
FIG _ 16

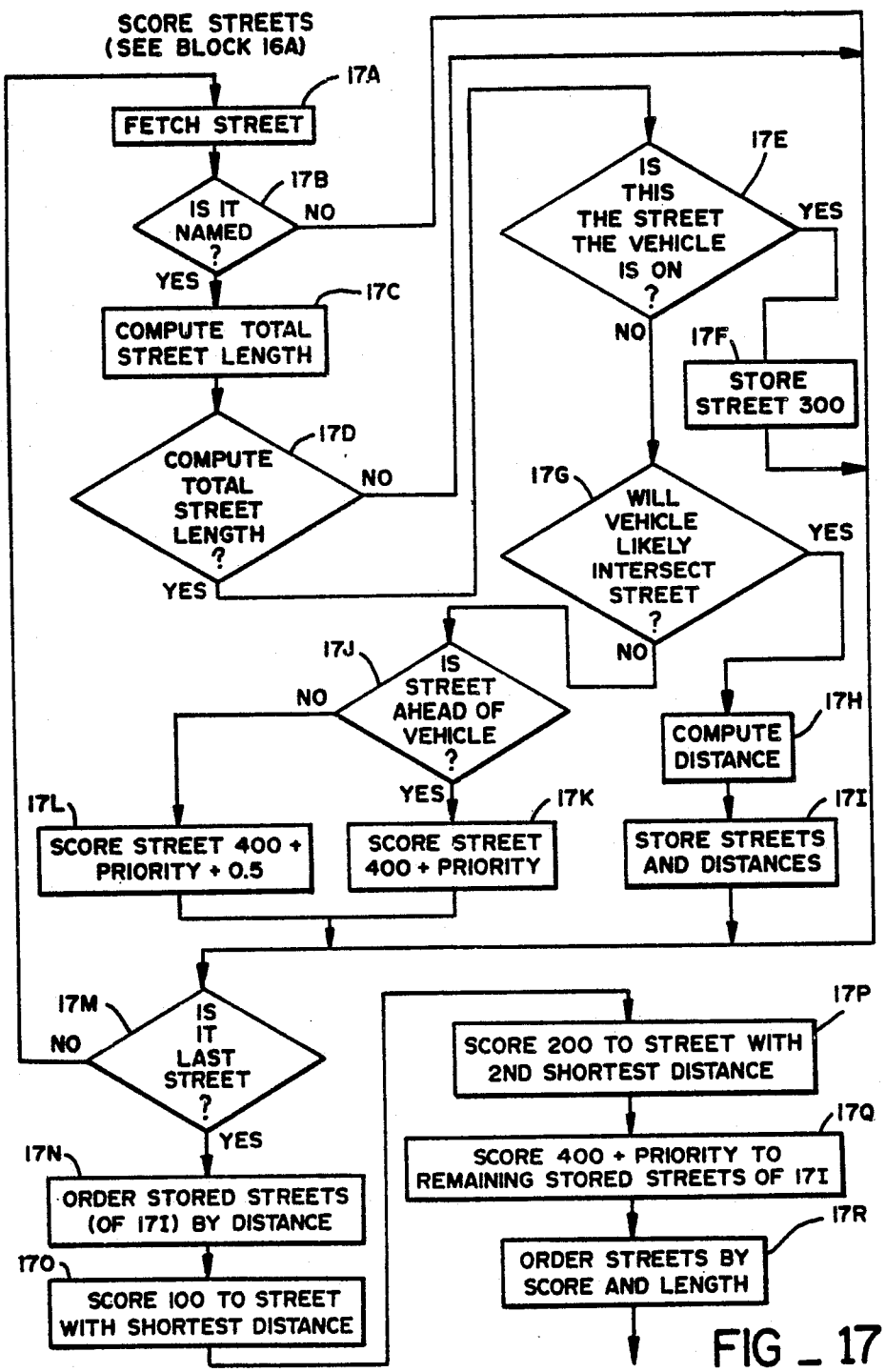
FIG_17

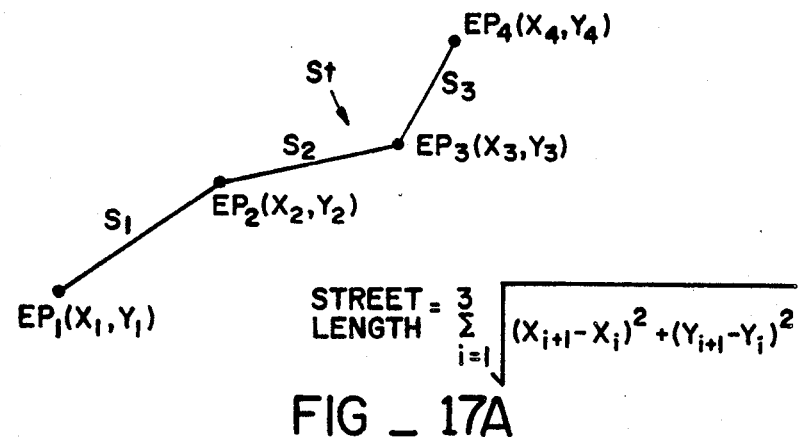
FIG _ 17A
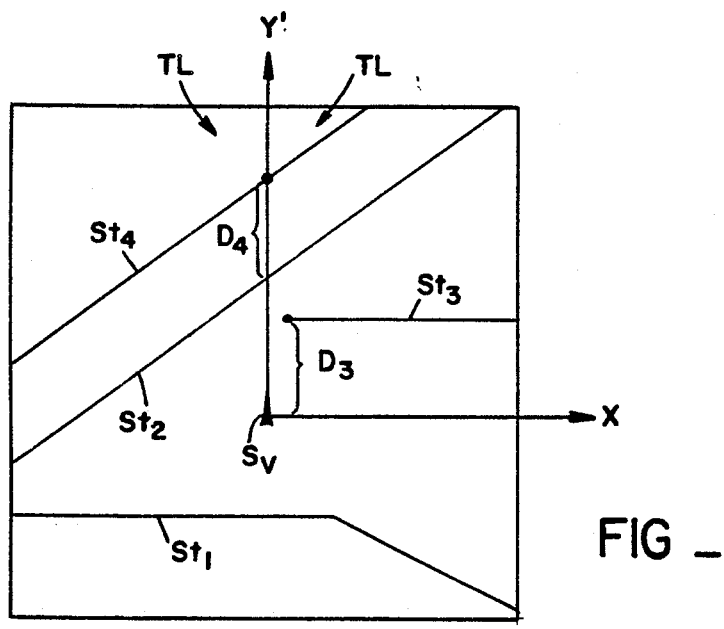
FIG _ 17B
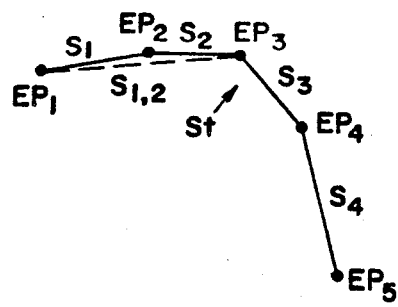
FIG _ 18A

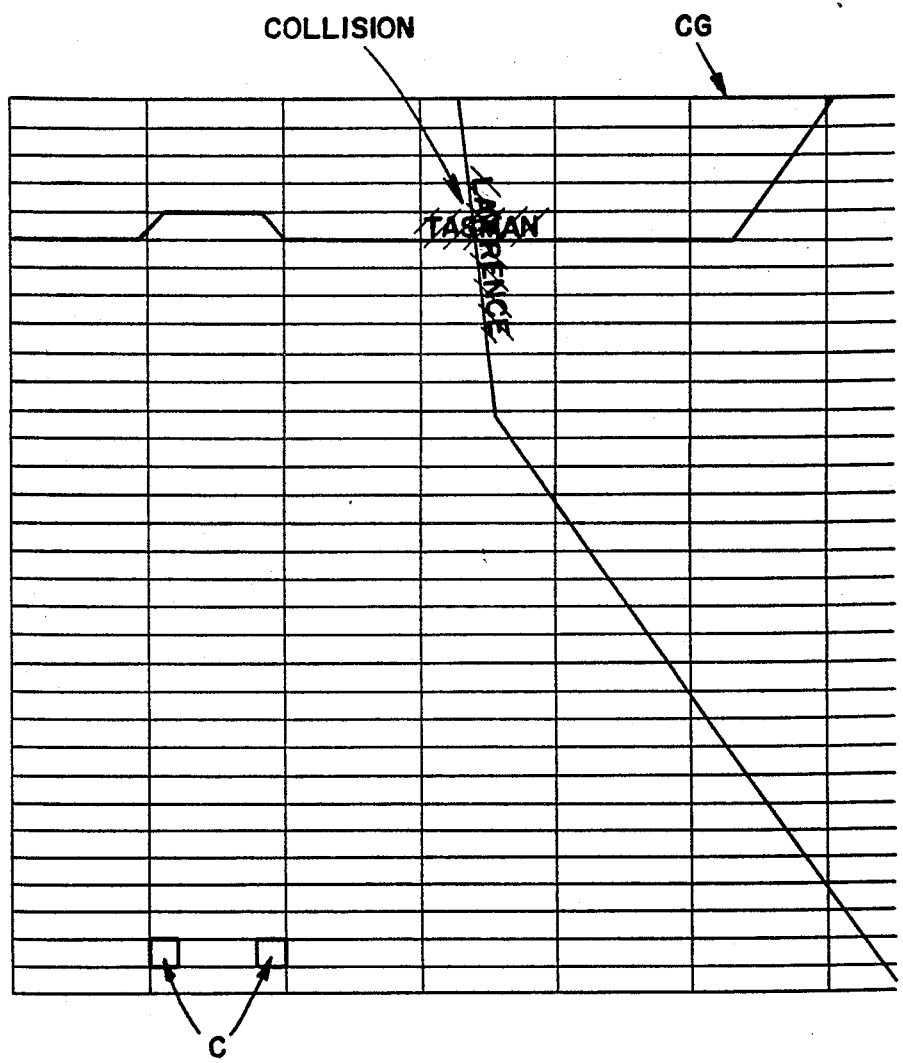
FIG _ 18B

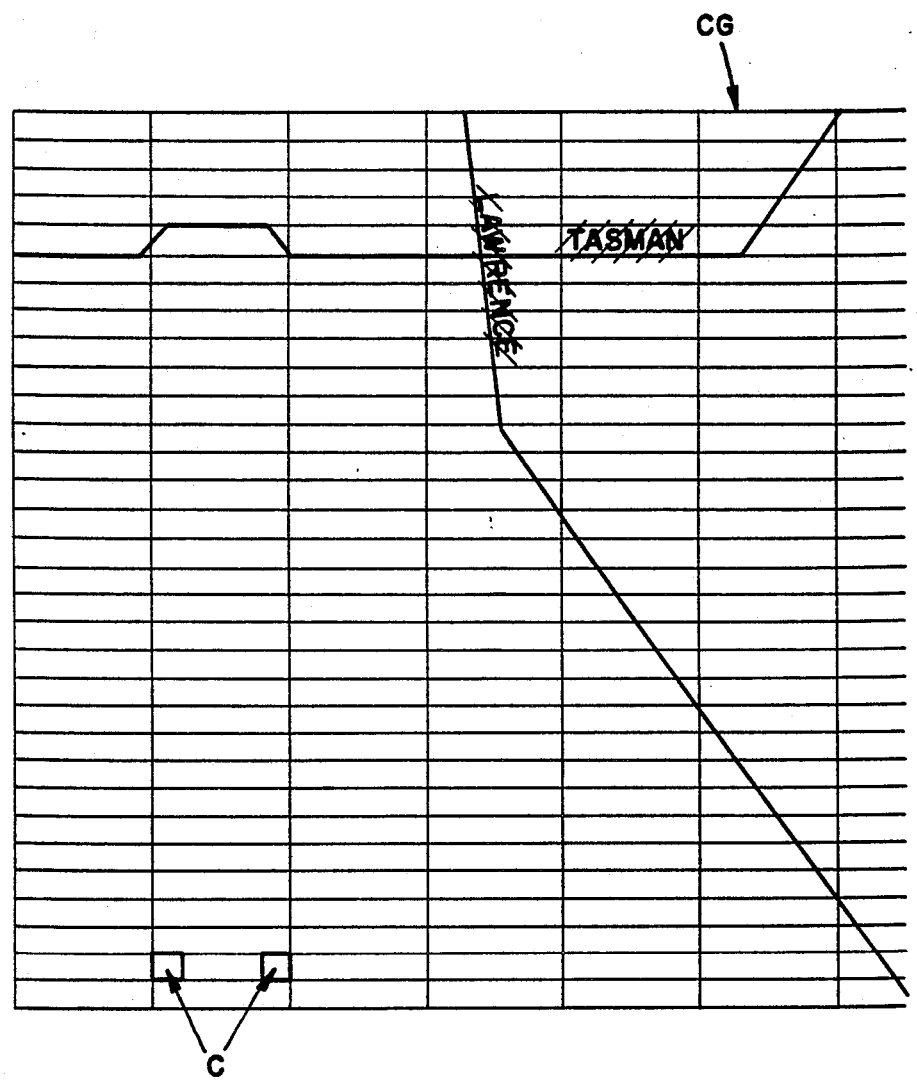
FIG _ 18C

APPARATUS AND METHOD FOR DISPLAYING A MAP

This is a continuation of U.S. Ser. No. 663,862, filed 10-22-84 now abandoned.

FIELD OF THE INVENTION

The present invention relates generally to an apparatus and method for displaying a map as a navigational aid in a vehicle movable over streets and, more particularly, to a computer system and method for controlling a digital map data base used for the map display.

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

Navigational aids are useful to assist the driver of a vehicle in locating his current position and for locating and moving to a desired destination. Typically, the navigational aid used by the driver is a conventional paper street map of a given area which is read to determine the present location of the vehicle relative to the desired location. Another navigational aid for the driver includes a transparency of a street map placed over a monitor which shows the approximate path of a vehicle. The map transparency is visually similar to the paper street map in that, for example, it shows the same detail of streets and landmarks and the same size of lettering of names or labels for the streets and landmarks. Yet another navigational aid is a video image of a map which appears on a monitor and accurately reproduces the image of a paper street map.

One problem with these prior navigational aids, either with the paper maps, the map transparencies or the map video image, is that they present the driver with more information than is necessary for navigating the vehicle. These maps are confusing and difficult to use because the driver may be able to take only short occasional glances at the map while engaged in the task of driving. For example, all streets and landmarks are depicted based on a priority scheme in which, for example, the streets are categorized and highlighted by interstate highways, state highways, major roads, access roads, local streets, etc. This detail of information, including also all the names of the streets and landmarks, is always presented to the driver even though the driver may need to read only the local streets to determine the route to his or her local destination. Alternatively, the driver may want to view only the major road network, but this may not be easily visible amid the clutter of the local streets and street names. Consequently, all the additional and unnecessary information that is on the map will be distracting for a given navigational purpose.

Furthermore, the details shown in the paper map or the map transparencies may not enable the driver to grasp quickly "the lay of the land" and get a feel for his or her location and orientation with respect to the street network and/or destination. For example, the driver may not easily perceive his current position or the current heading or direction of movement of the vehicle relative to surrounding streets or landmarks.

Also, it may be desireable to change the scale of the map display to study in detail, for example, a small geographical area or to gain perspective of a large geographical area. Paper maps and map transparencies require physically changing the map being viewed. For video images, scaling can be automatically accomplished on the monitor, but the street labels are displayed such that their size is dependent on the scale level. This is distracting, requiring the driver to adjust his vision to different sized labeling. And, if the video image is rotated to match vehicle heading, the fixed labels will create upside down writing.

SUMMARY OF THE INVENTION

It is an object of the present invention to provide a novel apparatus and method for providing a map display to a driver of a vehicle as a navigational aid.

It is another object of the present invention to provide the driver with a map display that is easy to read and does not present unnecessary information for the current navigation requirement.

Yet another object of the present invention is to provide a map display whose complexity is consistent with the needs of the driver for navigational purposes.

It is another object of the present invention to provide the driver with a map display that changes in accordance with the changing position of the vehicle to always show streets nearest such a position, and to always show the driver the current position and current heading of the vehicle.

Still another object of the present invention is to provide a map display that always has an orientation to facilitate easy understanding by the drive and to adjust the labels so that they appear predominantly upright independent of map orientation and to label streets of interest to the driver.

It is another object of the present invention to conveniently present on the display the geographical location of a desired destination entered by the driver.

The above and other objects are obtained in one aspect of the present invention which is an apparatus for displaying a map of streets corresponding to an area over which a vehicle may move to assist the driver to navigate, including a display; means for displaying the map on said display based on a scale-dependent, street prioritization scheme; means for providing on the display a vehicle position symbol indicating the current position and heading of the vehicle and a moving map as the vehicle moves, the moving map being movable in translation and rotation; means for selectively and dynamically labelling streets on the display as the vehicle moves; and means for providing a destination symbol on the display indicating a desired destination or the direction to a desired destination.

The above and other objects are obtained in another aspect of the present invention which is a method for displaying on a display a map of streets corresponding to an area over which a vehicle may move to assist the driver to navigate, including displaying the map on the display based on a scale-dependent, street prioritization scheme; providing on the display a vehicle position symbol indicating the current position and heading of the vehicle and a moving map as the vehicle moves, the moving map being movable in translation and rotation; selectively and dynamically labelling streets on the display as the vehicle moves; and providing a destination symbol on the display indicating a desired destination or the direction to a desired destination.

By providing a display of a map based on a scale-dependent priority scheme, the driver will always see a map of limited complexity since only selected streets are displayed that are dependent on a selected scale level. By providing the selective labelling, the driver will see only those labels that provide sufficient information for the current navigational need, and need not view all labels corresponding to the streets currently being displayed. By providing dynamic labelling the driver will not be presented with any label in an upside down orientation. By providing a destination symbol on the display, the driver will be above to determine easily the direction to, location of and route required to reach the desired destination. And, by providing a moving map display, the driver will view a changing map corresponding to the geographical area over which the vehicle is moving and one which is always oriented in a manner to provide ease of reading and understanding.

In another aspect, while the above-mentioned several means and steps of the apparatus and method are employed in combination, each of these means and steps may be implemented individually or in subcombinations to provide the driver with an advantageous map display navigational aid.

BRIEF DESCRIPTION OF THE DRAWINGS

FIG. 1 is a pictorial view of one example of a map display used to explain the principles of the present invention;

FIGS. 2-1 to 2-5B are pictorial illustrations used to explain a display map viewing window of the present invention and the concept of linear transformation.

FIGS. 3A-3J are pictorial illustrations of different frames of a map display in accordance with the principles of the present invention;

FIG. 4 illustrates, in part, the labelling feature of the present invention.

FIG. 5 is a block diagram of a hardware system for providing the map display of FIGS. 3A-3J;

FIG. 5A shows, pictorially, one possible location of the map display in a vehicle;

FIGS. 6A-6B are illustrations used to explain a map data base of the present invention;

FIG. 6C is a table used to explain the scale dependent, street prioritization scheme of the present invention;

FIGS. 7A-7C are block diagrams of an overall software program structure;

FIG. 8 is a flowchart of a main software program of the present invention;

FIG. 8A is a state diagram used to describe several map display states and a non-map display state of the present invention;

FIGS. 8A-1 to 8A-2 are pictorial illustrations used to explain other aspects of the present invention;

FIGS. 8B to 8B-2 are pictorial illustrations used to explain heading-up and north-up modes of the present invention; and FIGS. 9-18C are more detailed flow charts and other pictorial illustrations used to explain the software of the present invention.

DETAILED DESCRIPTION OF THE INVENTION

I. Introduction

Figure 5:
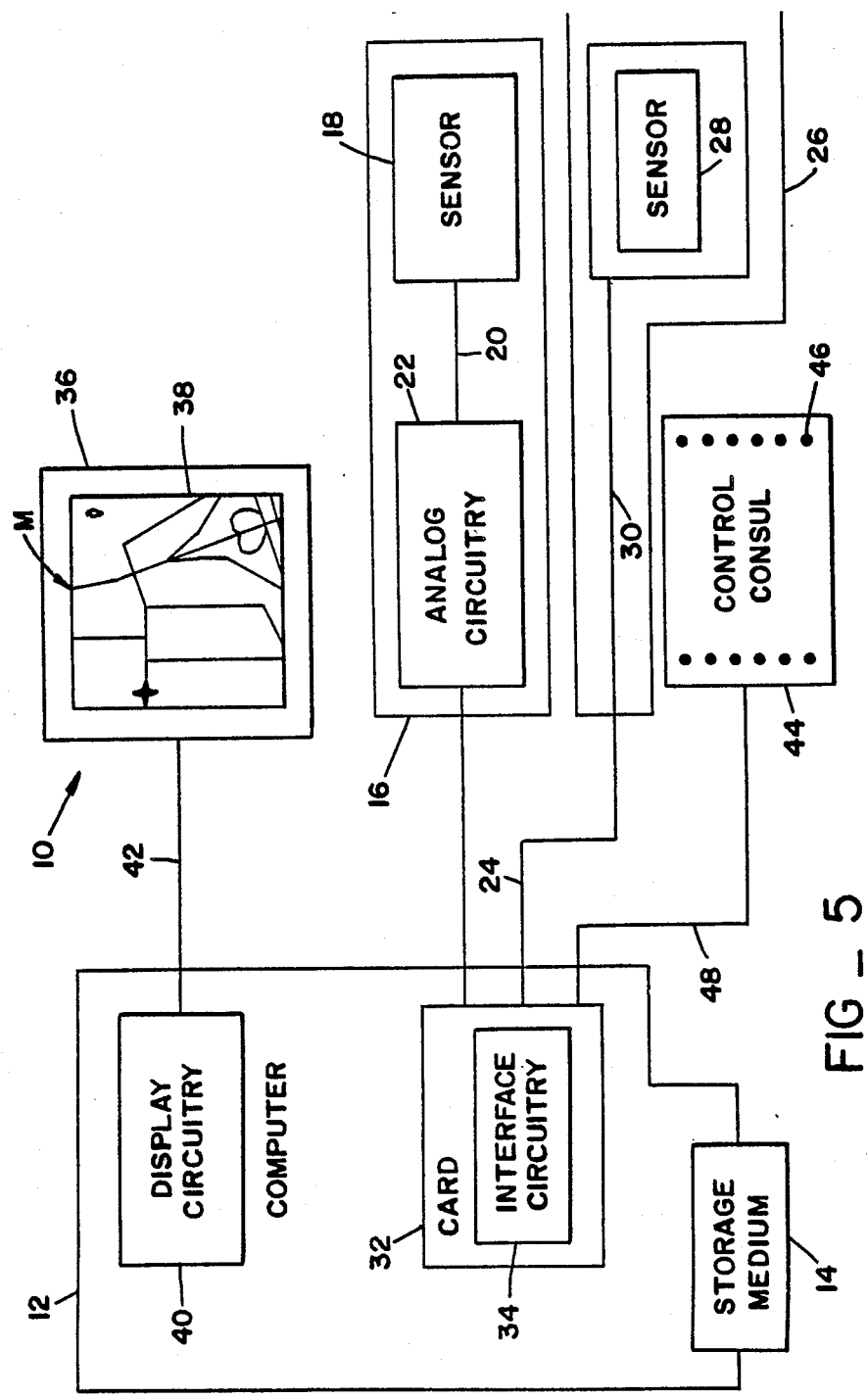

The present invention will be discussed specifically in relation to a map display used in a vehicle movable over streets to provide a navigational and other informational aid for the driver or passenger. The vehicle that will be discussed may be a motor vehicle such as a car, a recreational vehicle (RV), a motorcycle, a bus, a truck or other such type of vehicle primarily moveable over streets.

The principles of the present invention are applied to four map display features, any one or more of which may be incorporated in an overall map display system in the vehicle. These features are generally identified as (1) a moving map display, (2) a scale-dependent street prioritization scheme; (3) a selective and dynamic labelling scheme, and (4) an index/destination location technique.

FIG. 1 shows one frame of a map display M on, for example, a monitor screen MS that is used to explain generally the above-mentioned four features of the present invention. Illustrated on the monitor screen MS for a given map display M bounded by a changeable viewing window W, which is described more fully below, are a plurality of streets generally shown by reference symbol St and/or street labels, such as "ELKO" and "237". For example, "ELKO" may be a local street, while "237" may be a highway. In addition, the map display M shows a symbol $S_v$ representing the current location and heading of a vehicle V as the vehicle V moves over the actual streets St, a symbol $S_d$ indicating the location of a desired destination of the vehicle V and a distance-to-go (DTG) number indicating the distance between the current vehicle location and desired destination.

Generally, the moving-map display feature is indicated schematically by the fourheaded arrow $A_1$ and the doubleheaded arrow $A_2$. Arrow $A_1$ indicates that the map display M will move on the monitor screen MS in translation relative to the symbol $S_v$ as the vehicle V moves over the area depicted by the map display M along a street St, such as "LAWRENCE STATION". Arrow $A_2$ indicates that the map display M will rotate on the monitor screen MS about the symbol $S_v$, and, thereby, have an orientation or heading $H_M$ as the vehicle V changes direction or heading $H_v$. In particular, the symbol $S_v$ remains fixed where shown on the map display M as the vehicle V moves, with the map display M shifting in translation and/or rotation. Furthermore, as shown, the map display M is a "heading-up" map display M, in which the fixed symbol $S_v$ always is pointing upwardly. An arrow N is displayed in the upper right hand corner of the monitor screen MS to show the direction of true north. The arrow N rotates with the map display M to continually show the north direction as the vehicle V changes heading $H_v$. However, as will be further described, a "north-up" map display M can be provided, in which the orientation or heading $H_M$ of the map display M is set to true north and the vehicle symbol $S_v$ is rotated to correspond to the actual vehicle heading $H_v$.

The scale-dependent street prioritization scheme is only indicated in FIG. 1 by the fact that the map display M is at a given scale level $Z_i$. As will be further described, for a given scale level $Z_i$, only certain streets St within the geographical area of the map display M are shown with the intensity of these streets St being adjusted according to their scale-dependent priority category. The scale level $Z_i$ can be decreased to show a larger geographical area or increased to show a smaller geographical area on the monitor screen MS. At any scale level $Z_i$, the complexity of the map display M will be limited by presenting only streets St of the priority appropriate for that scale level $Z_i$.

The feature of selective and dynamic labelling of the streets St involves a number of factors. For a given frame of a map display M, only certain of the streets St are labelled. Furthermore, the street labels are positioned on the map display M so as not to interfere with other labels and otherwise be easily readable as the map display M moves in translation and/or rotation. Moreover, the size of the labels will remain constant independent of the scale level $Z_i$ of the map M. And, each label is placed close to and parallel to its corresponding street St and with an orientation closest to right side up.

The index/destination location feature is indicated in FIG. 1 by the destination symbol $S_d$, and by the distance-to-go DTG from the current vehicle position represented by symbol $S_v$ to the desired destination represented by symbol $S_d$, as shown. As will be further described, the vehicle operator or a passenger will have entered information such as an address corresponding to the desired destination, which may result in the appearance on the map display M of the symbol $S_d$ at the desired destination and a number on the map display M indicating the distance-to-go DTG in units of, for example, miles. If a desired destination is at a location beyond the currently displayed map M for the current map display viewing window W, then the destination symbol $S_d$ will not be displayed, but the direction to the desired destination will be displayed along with the distance-to-go DTG as a navigational aid, as will be further described.

II. The Map Display Features-Generally

A. Description of the Map Coordinate System

1. The Map Display Viewing Window W: FIG. 2-1 shown the outline of a generalized map area MA of a base map BM in a general coordinate system (X,Y) of a geographical area over which the vehicle V may move.

The map display M presented on the monitor screen MS as the vehicle V moves can be thought of as that part or area of the base map BM that is inside a changeable viewing window W as shown, for example, in FIG. 2-1 as the box labelled $W_1$ or the box labelled $W_2$. As described below, the viewing window W is defined by its four straight line boundaries. Generally, as the vehicle V changes heading $H_v$ and moves in the map area MA, in order for the map display M on monitor screen MS to remain centered on the position of the vehicle V and with a map orientation $H_M$ so as to place the heading $H_v$ of the vehicle V in the vertical direction ('heading-up' display), as shown in FIG. 1, the viewing window W must be correspondingly rotated and translated, as described below. Also, as the operator changes the map display scale level $Z_i$, the viewing window W will grow or shrink in size accordingly and more or less base map BM will be presented on the map display M, which also will be described below.

Symbol $S_{V1}$ of FIG. 2-1 indicates the position $(X_{V1}, Y_{V1})$ and heading $(H_{V1})$ of the vehicle V at time $t_1$. The position $(X_{V1}, Y_{V1})$ and heading $(H_{V1})$ are relative to the general coordinate system (X,Y). One viewing window $W_1$ shows a region of width w and height h around the vehicle V and oriented with its Y-axis along $H_{V1}$. The streets St (not shown) contained in the viewing window $W_1$ are part of the map display M on the monitor screen MS at time $t_1$.

Assume now that the vehicle V moves to a new position $(X_{V2}, Y_{V2})$ and new heading $(H_{V2})$ at a time $t_2$, as indicated by symbol $S_{V2}$. At this time, another viewing window $W_2$, of the same size as window $W_1$, shows a region of width w and height h around the vehicle V and oriented with its Y-axis along $H_{V2}$. The streets St (not shown) contained in the viewing window $W_2$ are part of the map display M on the monitor screen MS at time $t_2$.

2. Linear Transformation: As the vehicle V moves through the map area MA, the viewing window W will move by translation and rotation as depicted by the two viewing windows $W_1$ and $W_2$ of FIG. 2-1. In order to display on the stationary monitor screen MS in the moving vehicle V a map M defined by the viewing window W, as shown in FIG. 1, a computer 12 (see FIG. 5) performs a linear transformation on the coordinates of the streets St in the base map BM.

FIG. 2-2 shows the general concept of a linear transformation of coordinates from the base map BM (X,Y) coordinate system to a new viewing window coordinate system (X'Y') used to define the origin and orientation of the viewing window W. The new axes of the viewing window W are defined by a translation of the origin of the base map BM coordinate system to a point $(X_o, Y_o)$ and the rotation of the axes of the base map BM coordinate system by an angle $(H_M - 90°)$. The viewing window coordinates $(X'_E, Y'_E)$ of an end point EP (described more fully below) of a street St within the viewing window W can be computed from the coordinates of that end point EP in the base map coordinate system (i.e., $X_E, Y_E$), the translation of the origin of $(X_o, Y_o)$ and the rotation of the axes by $(H_M - 90°)$, as given by the linear transformation equations (1) and (2):

$$X'_E = (X_E - X_o) \cos(H_M - 90°) + (Y_E - Y_o) \sin(H_M - 90°) \quad (1)$$

$$Y'_E = -(X_E - X_o) \sin(H_M - 90°) + (Y_E - Y_o) \cos(H_M - 90°) \quad (2)$$

where
- $(X'_E, Y'_E)$ defines the end point coordinates in the viewing window coordinate system (X',Y')
- $(X_E, Y_E)$ defines the end point coordinates in the map base coordinate system (X,Y)
- $(X_o, Y_o)$ defines the origin of the viewing window coordinate system in the base map coordinate system, and
- $(H_M - 90°)$ define the orientation of the viewing window W with respect to the base map coordinate system.

This transformation can be demonstrated by the example of FIG. 2-3 which shows two vehicle positions $S_{V1}$ and $S_{V2}$ and two viewing windows $W_1$ and $W_2$, respectively, with respect to the base map coordinate system (X,Y). Here, the origin $(X_o, Y_o)$ of each window $W_1$ and $W_2$ is the vehicle position $(X_{V1}, Y_{V1})$ and $(X_{V2}, Y_{V2})$, respectively, and the map headings $H_M$ are the vehicle headings $H_{V1}$ and $H_{V2}$, respectively. Also shown is a street St made up of straight line segments $S_0$–$S_2$ defined by the XY coordinates of their end points EP, as will be described more fully below.

The monitor screen MS, as indicated above, remains upright and stationary in the moving vehicle V; however, the viewing window W changes as the vehicle V moves (as also illustrated in FIG. 2-1). Thus, for a heading-up map display M, as will be described, the position and orientation of the street St will change within the viewing window W and hence on the monitor screen MS as the vehicle V moves, i.e., as the viewing window W translates (shifts) and rotates from $W_1$ to $W_2$ as shown in FIG. 2-3. This change can be computed using the linear transformtion equations (1) and (2).

FIG. 2-3A shows how, after the linear transformation, the street St of FIG. 2-3 will appear on the monitor screen MS with respect to the viewing window $W_1$ of FIG. 2-3, while FIG. 2-3B shows how the same street St will appear on the monitor screen MS with respect to the viewing window $W_2$ of FIG. 2-3. As the vehicle V moves from its position $S_{V1}$ to $S_{V2}$ (and subsequent positions), its location on the map display M remains stationery, but the street St of the map display M on the monitor screen MS changes position with reference to the vehicle symbol $S_V$, causing the map display M to be a moving map display M. Because this motion reflects the motion of the vehicle V, the map display M gives current information on vehicle position and heading.

In summary, therefore, and as shown in FIG. 2-2, new coordinates $(X'_E, Y'_E)$ for an end point EP of a segment S of the street St can be calculated with reference to a given viewing window W when the base map coordinates $(X_E, Y_E)$ of the endpoints EP are known and the linear transformation parameters $(X_o, Y_o$ and $H_M)$ of the viewing window W are known. The axes of a given viewing window W are defined by its origin $(X_o, Y_o)$ which in general is the known vehicle position $(X_V, Y_V)$, i.e., the position of $S_V$, and its orientation $H_M$ which in general is the known vehicle heading $H_V - 90°$. Vehicle heading $H_V$ is defined by the angle between east (the X-axis of the base map coordinate system) and the direction of travel of the vehicle V, and is measured in a counter clockwise rotation (see FIG. 2-4). The subtraction of 90° in equations (1) and (2) is required because the heading-up display puts the heading $H_V$ at the vertical or 90° axis. Also, the arrow N in the upper right corner of each viewing window W (e.g., $W_1$ or $W_2$ of FIGS. 2-3A and 2-3B, respectively) shows the direction of true north and is calculated as $180° - H_V$ (see also FIG. 2-2).

The scale level $Z_i$ of the viewing window W defines how much of the base map BM can be seen at once on the monitor screen MS. FIG. 2-5 shows two viewing windows $W_1$ and $W_2$ at the same vehicle position $(X_V, Y_V)$ represented by $S_V$ and orientation $H_V$, but at two different scale levels $Z_1$ and $Z_2$, respectively.

Note that while the monitor screen MS physically remains the same size in the vehicle V, the two viewing windows $W_1$ and $W_2$ are two different sizes. Thus, to display the streets St at different scale levels $Z_i$, the scale of the map display M must be changed.

FIG. 2-5A shows how the street St of FIG. 2-5 will appear on the screen MS in the viewing window $W_1$ at scale level $Z_1$ and FIG. 2-5B shows how the same street St will appear on the screen MS in the large viewing window $W_2$ at scale level $Z_2$. This scale adjustment is part of the linear transformation as described below.

The equations (1) and (2) can be modified by a scale factor to adjust the map scale as given by the general linear transformation equations (3) and (4):

$$X'_E = [(X_E - X_o) \cos(H_M - 90°) + (Y_E - Y_o) \sin(H_M - 90°)] \cdot 2^{-i} \quad (3)$$

$$Y'_E = [-(X_E - X_o) \sin(H_M - 90°) + (Y_E - Y_o) \cos(H_M - 90°)] \cdot 2^{-i} \quad (4)$$

where $2^{-i}$ defines the ith power of 2 as the scale factor applied for the scale level Z and the remaining terms are as defined in equations (1) and (2)

The map data base is stored in the computer 12 in scale units defined here as the base map BM scale, $Z_o$. Likewise, the monitor screen MS has addressable locations which define its display coordinate system. Thus, to display the map M at scale level $Z_{i=o}$, a unity $(2°=1)$ scale factor is applied to the base map coordinates and equations (3) and (4) reduce to equations (1) and (2). For any other scale level, a scale factor adjustment has to be made as shown in equations (3) and (4). In this embodiment, i can be positive or negative integers, allowing the map display M to change scale by successive powers of 2. Other embodiments could use other fixed or variable scale factors.

Thus, in summary, the map viewing window W is the area of the base map BM that will be seen on the monitor screen MS. It is defined by the viewing window coordinate center $(X_o, Y_o)$ which is often the vehicle position $(X_V, Y_V)$, the viewing window coordinate orientation $H_M$ which is often the vehicle heading $H_V$, and the viewing window scale level $Z_i$ which is usually selected by the operator, as discussed more fully below. Given the addressable height and width of the monitor screen MS and the center, orientation and scale level of the viewing window W, the four straight line boundaries of the viewing window W can be defined. And the portion of the base map BM enclosed by the viewing window W can be translated, rotated and scaled according to the linear transformation equations (3) and (4) to present the map display M as on the monitor screen MS.

B. The Moving Map Display Feature

1. Translation of the map display M: FIGS. 3A-3D individually sow one frame of the map display M, but in sequence show the map translation as the vehicle V moves over a given street St. In particular, assume, as indicated by the symbol $S_V$, that the vehicle V is moving along the street St labelled as "LAWRENCE STATION" in a direction towards the street St labelled as "ELKO". As indicated collectively in FIGS. 3A-3D, as the vehicle V approaches "ELKO", the moving map display M will translate downwardly as shown by arrow $A_1$ with the symbol $S_V$ remaining fixed, so that another street St such as "TASMAN" comes into the map display viewing window W and is displayed on the monitor screen MS, while the street St labelled "237" moves out of the display viewing window W and hence off the monitor screen MS. Thus, the map display M is shifted in translation to reflect the changing positions of the vehicle V and moves as the vehicle V moves.

2. Rotation of the map display M: FIGS. 3E-3G individually show one frame of the map display M, but in sequence illustrate the rotation of the map display M as the vehicle V changes heading $H_V$. In particular, assume that the vehicle V is at the intersection of "LAWRENCE STATION" and "ELKO", as indicated by the symbol $S_V$ in FIG. 3E, and is making a left turn onto "ELKO". Accordingly, the map display M will rotate inthe direction shown by the arrow $A_2$ with the symbol $S_V$ remaining fixed. At the completion of the left turn onto "ELKO", the map display M appears as shown in FIG. 3G. Thereafter, as the vehicle V moves along "ELKO", the map display M will translate as was described in Section IIB1 above and illustrated in FIGS. 3A-3D.

The present invention, as indicated above and as will be further described, uses data identifying the heading $H_V$ of the vehicle V and data identifying the map orientation $H_M$ to accomplish this map rotation. Because the map display M can change orientation $H_M$ in correspondence with the vehicle orientation $H_V$, the present invention may continually display true north by the arrow N shown on the map display M, as previously mentioned, to assist the driver in understanding the current heading or movement of the vehicle V.

In another embodiment (not shown), an alphanumeric number could appear on the monitor screen MS giving the heading $H_V$ of the vehicle V in degrees or other units. This number could be shown alone or in addition to the arrow N or other compass symbol.

3. Linear Transformation: In general, as previously described, the vehicle V may move in a way which changes its position (translation) and heading (rotation) individually or simultaneously. The viewing window W and hence the moving map display M on the monitor screen MS will change according to the linear transformation. In addition, the scale level $Z_i$ may be different than the base scale level $Z_o$. The monitor screen MS will show a map display M of the viewing window W appropriately scaled according to equations (3) and (4).

C. The Scale-Dependent Street Prioritization Scheme

FIGS. 3H-3J illustrate individually one frame of the map display M with the vehicle V being at a given position indicated by the symbol $S_V$, but collectively illustrate a plurality of scale levels $Z_i$ of the map display M relative to the vehicle V being at the given position. Thus, FIG. 3H shows a scale level $Z_2$ in which the map display M shows a certain complexity of streets St. The different streets St are displayed with different intensities pursuant to their priority category described below and the scale level $Z_2$. FIG. 3I shows a map display M at a scale level $Z_3$ resulting in the display of a larger geographical area surrounding the symbol $S_V$. At this scale level $Z_3$, new streets St are now displayed because more area can be seen (i.e., the map display viewing window W is enlarged), but other low priority streets St such as the "accesss ramps" or "collectors" to "237" are no longer displayed as they were for scale level $Z_2$. In addition, the intensities of the streets St are adjusted in dependence on the street priority and scale level $Z_3$. By these means, the complexity of the map display M (in number of streets St shown and streets labeled) remains limited and does not grow proportional to area displayed, as can be seen by comparing the map displays M of FIG. 3H and FIG. 3I.

FIG. 3J shows yet another scale level $Z_4$, in which an even greater geographical area surrounding the symbol $S_V$ is shown relative to the map display M of FIG. 3H (i.e., the map display viewing window W is still further enlarged). Thus, a comparison of FIGS. 3H and 3J will show that in the latter, streets St such as "ELKO" are no longer displayed, and only more major streets St such as "CENTRAL EXPRESSWAY" and "FAIR OAKS" are displayed. Note that in FIG. 3J the street "LAWRENCE STATION" on which the vehicle V is moving is not even displayed. In addition, the intensities of the streets St are adjusted in dependence on the street priority category and scale level $Z_4$. Again, the complexity of this map display M remains limited and is substantially the same as the complexity of the map displays M at scale levels $Z_2$-$Z_3$.

The scale level $Z_i$ can be changed by the vehicle operator. The scale level $Z_i$ changes between FIGS. 3H ($Z_2$) and 3I ($Z_3$) and between FIGS. 3I ($Z_3$) and 3J ($Z_4$) by a scale factor $2^{i+1}/2^i = 2$. While only three scale levels $Z_2$-$Z_4$ are shown, the principles of the present invention can be applied to a greater number of scale levels $Z_i$.

D. Selective and Dynamic Labelling

FIGS. 3A-3J illustrate the feature of the present invention relating to the selective and dynamic labelling scheme. The overall result of this selective and dynamic labelling scheme is that street labels are displayed in a manner to enable the driver to quickly and easily find the navigational information that is being sought from the map display M. The several selective and dynamic labelling features that provide for this result are discussed below, but not in any order of priority.

As described in IIC above, only selected streets St are displayed for a given scale level $Z_i$. Thus, for example, as shown in FIG. 3J, for the scale level $Z_4$, only the major highways and a few lesser major roads are displayed; of these some are selected for labelling. When the map display M is at the scale level $Z_2$, as shown in FIG. 3H, only a few streets St are in the viewing window W and even minor streets St are shown and a subset of these streets St is selected for labelling.

In general, and as one example of many predetermined priority labelling schemes that may be embodied by the current invention, streets St will be selected for labelling in the following priority order of categories:

1. The next cross street St shown on the map display M. This cross street St is the closest street St ahead of the vehicle V crossing the path which the vehicle V is current driving.

2. The second next cross street St ahead of the vehicle V.

3. The street St on which the vehicle V is moving, if that street St is currently being displayed. This street St may not be displayed if, for example, the priority of that street St is low (see FIG. 3J).

4. Remaining streets having names in the map data base (discussed below), ordered by priority, whether or not they are ahead of the vehicle V, and lastly, by their length on the display screen MS.

Furthermore, as shown by all the FIGS. 3A-3J, irrespective of the movement of the map display M in translation and/or rotation, or the particular scale level $Z_i$ of the map display M, the labels are always positioned so that they are easy to read at a glance. In particular, the labels are always displayed along and parallel to a street St in a substantially upright orientation. This can be further explained by reference to FIG. 4 which shows various orientations A-G of the street St, and the label "ELKO" as may be displayed on monitor screen MS.

As shown in FIG. 4, the label "ELKO" is applied to several street segments S at different orientations, with each segment S having two endpoints EP1 and EP2. One endpoint is defined as the FROM node. The label "ELKO" is written slightly above and parallel to the segment S in the direction of the FROM node to the TO node which defines the other endpoint.

The FROM node is generally defined as the left end point (algebraic least X value) unless the slope of the segment S (given by $|(Y'_1-Y'_2)/(X'_1-X'_2)|$) is sufficiently large that the segment S is very close to vertical; see the vertical example in illustration D of FIG. 4. In this case, either node could be the FROM node and the determination is based upon which node was the FROM node on the last frame of the map display M.

The labels also are positioned on the monitor screen MS so that there is a minimum interference with other labels for the other streets St, as will be described below. Labelling continues according to the above example of a priority scheme until all selected streets St are labelled or a total of, for example, five streets St are labelled, whichever comes first.

Moreover, the size of the labels remains constant irrespective of the scale level $Z_i$ of the map display M. Thus, if the scale level $Z_2$ or the scale level $Z_3$ is selected, the size of the labels is the same for ease of reading. In other words, the size of the labels is not disproportionately large or small as a function of the scale level $Z_i$ of the map display M.

E. Index/Destination Location Scheme

As will be further described, to display the desired destination symbol $S_d$ (see FIG. 1), the driver of the vehicle V can specify a street address or select the intersection of two streets St from an index of streets St. In response, the desired destination location will be shown via the symbol $S_d$ on the map display M, with the scale level $Z_i$ automatically selected to show the least area for displaying both the vehicle symbol $S_V$ and the destination symbol $S_d$, as will be described later. If the driver subsequently changes the scale level $Z_i$ such that the desired destination location is beyond the viewing window W, the direction to that destination location is displayed by an arrow, together with the numeric distance-to-go (DTG) to that destination, as will be described below.

III. The System Hardware

FIG. 5 illustrates one embodiment of system hardware 10. The computer 12 accesses a data storage medium 14, such as a tape cassette or floppy or hard disk, which stores data including a map data base and software for processing the data in accordance with a map display algorithm, as will be described below. For example, the computer 12 can be an IBM personal computer (PC) currently and widely available in the marketplace, and executes program instructions disclosed below. Another example can be circuitry which executes the same instruction set (at the same clock rate) as the IBM PC.

System 10 also includes means 16 for sensing the distance traveled by the vehicle V. For example, the means 16 can constitute one or more wheel sensors 18 which sense the rotation of the non-driven wheels (not shown) respectively of the vehicle V and generate analog distance data over lines 20. Analog circuitry 22 receives and conditions the analog distance data on lines 20 in a conventional manner, and then outputs the processed data over a line 24.

System 10 also includes means 26 for sensing the heading $H_V$ of the vehicle V. For example, means 26 can constitute a conventional flux gate compass 28 which generates heading data over a line 30 for determining the vehicle heading $H_V$.

The computer 12 has installed in it an interface card 32 which receives the analog distance data from means 16 over line 24 and the analog heading data from means 26 over line 30. Interface circuitry 34 on the card 32 converts and conditions these analog data to digital data, identifying, respectively, the distance traveled by the vehicle V and heading $H_V$ of the vehicle V. For example, the interface card 32 may be the commercially available Tec-Mar Lab Tender Part No. 20028, manufactured by Tec-Mar, Solon, (Cleveland) Ohio. Another example is custom made circuitry which performs the above-described functions.

The system 10 also includes a display means 36, such as a CRT display or xyz monitor 38 (corresponding to monitor screen MS previously described), for displaying the map M, as well as non-map displays D such as the index of streets St, as will be further described. Display circuitry 40 is installed in the computer 12 and is coupled to and controls the display means 36 over lines 42, so as to display the map M, the symbol $S_V$, the movement of the map display M relative to the symbol $S_V$, the destination symbol $S_d$, the street labels and the other information previously described, as well as the non-map displays D. The display circuitry 40 responds to data processed and provided by the card 32 in the overall computer 12 in accordance with the display algorithm of the present invention to provide the map display M and the non-map displays D. As another example, the display means 36 and the display circuitry 40 may be one unit sold commercially by the Hewlett-Packard Company, Palo Alto, Calif. as model 1345A (instrumentation digital display) or may be circuitry designed especially for this function.

The system 10 also includes an operator-controlled console means 44 having buttons 46 by which the vehicle operator may enter command and other data to the system 10, such as a desired scale level $Z_i$, as will be further described below. Console means 44 communicates over a line 48 with the means 32 to input the data to the computer 12.

The system 10 may be installed in a car. For example, monitor 38 may be positioned in the interior of the car near the dashboard for viewing by the driver or front passenger. The driver will see on the monitor 38 the map display M and the other information described above. The console means 44 may be co-located with the monitor 38, as shown in FIG. 5A.

IV. Information Used to Provide the Display

A. The Base Map BM

1. Introduction

The base map BM is stored on the storage medium 14 as part of the map data base which is accessed by the computer 12. The viewing window W is defined principally by the vehicle position $(X_V, Y_V)$, orientation $H_V$ and scale level $Z_i$, as previously mentioned, as well as by any PAN offsets to be described below. Once the viewing window W is defined, street segments S within the viewing window W or intersecting the straight line boundaries of the viewing window W can be retrieved from the storage medium 14 along with other related data to be used to generate the map display M. Data in the map data base include, as will be further described, data identifying (1) a set of line segments {S} defining the set of streets {St}, (2) street names identifying the streets St and address fields identifying numeric addresses along the streets, and (3) a code identifying each street by priority category.

2. Set of Line Segments {S}

FIG. 6A is used to explain the data stored on medium 14 that identify a set of line segments {S} defining the set of streets {St}. Each such street St is stored on the medium 14 as an algebraic representation of the street St. Generally, each street St is stored as one or more arc segments, or, more particularly, as one or more straight line segments S. As shown in FIG. 6A, each line segment S has two end points, for example, $EP_1$, $EP_2$ for $S_1$ and $EP_2$, $EP_3$ and $S_2$, respectively, which are defined by coordinates $(X_1Y_1, X_2Y_2)$ and $(X_2Y_2, X_3Y_3)$ respectively, as previously mentioned, and it is these coordinate data that are stored on the medium 14 as part of the base map BM. These coordinate data are stored at a base map scale $Z_o$ where, for example, this scale may be such that 1 unit represents 5 feet.

3. Street Names and Addresses

Associated with almost every street St in the map data base is its name for labeling purposes, which is shown as "LABEL" in FIG. 6A. A numeric address is associated with some endpoints EP defining the street address at that point. Addresses are associated to end points EP in such a way that linear interpolation can be used to approximate the location of any real address along the street St. These aspects will be described more fully below.

4. Street Priority Categories

Each street St has a code associated with it which identifies the priority category of the street. These categories include, for example, freeways, expressways, arterial roads, collectors, residential streets, alleys, highway access ramps and non-driveable boundaries. This code is used in connection with the scale-dependent prioritization scheme described below. Thus, for example, a 4-bit code can be used to define 16 priority categories of streets St.

5. Listing of Street Names

The map data base also has an alphabetical listing or index of the labels or names of streets St. Parts of this index may be called on the monitor screen MS of monitor 38 by depressing the buttons 46. One or more of these streets St may then be selected to input the desired destination data for displaying the destination symbol $S_d$. FIG. 6B illustrates a portion of the index as it is displayed on the monitor 38. In addition to using two intersecting street names, one street name and a numeric address can be used to position the destination symbol $S_d$ along the street St on the map display M.

B. A Scale-Dependent Street Prioritization Table

FIG. 6C shows a lookup Table I that is stored on the storage medium 14 as part of the computer program of the present invention described below. The Table I shows the plurality of street priority categories versus a plurality of scale levels, e.g., levels $Z_0-Z_5$. For each scale level $Z_0-Z_5$, there are entries corresponding to the street priority. The entries are indicated as "—" or "low" or "medium" or "high". These, as will be further described, correspond to the relative brightness or intensity of the corresponding streets that are displayed or not displayed on the monitor 38 for a given scale level $Z_0-Z_{10}$. Where the Table I shows "—", the corresponding street St for the given scale level $Z_0-Z_{10}$ will not be displayed.

Thus, for example, at the scale level $Z_1$, a residential street St will be displayed with low intensity or brightness. However, for the scale level $Z_2$, the same residential street St will not be displayed at all. Similar variations of the display intensities in dependence on the scale levels $Z_0-Z_5$ can be seen by a review of the Table I.

Essentially, and as will be further described, if a street St is determined to be within the map display viewing window W of the vehicle V, then the priority category code associated with the given street St is read to determine the category of this street St. Then, a table lookup procedure is performed by the computer 12, whereby Table I is read for the current scale level $Z_i$ to determine the brightness for the given street St.

Table I is just one embodiment of a scale-dependent priority map display M designed to limit the complexity (and maximize driver utility) of the map display M in the vehicle V.

V. Software System A. Overall Computer Program Structure

FIGS. 7A-7C show three block diagrams which together constitute an overall computer program structure that is utilized by the system 10. FIG. 7A references a main program, with FIGS. 7B-7C referencing interrupt programs. The main program of FIG. 7A computes the map display M and non-map display D for the monitor 38, as will be described in more detail below. The interrupt program of FIG. 7B is used to refresh the monitor 38 and to provide an operator interface via the console means 46. The interrupt program of FIG. 7C is a program performing a vehicle navigation algorithm, one example of which is described in detail as part of a co-pending patent application Ser. No. 618,041, filed June 7, 1984, and assigned to the assignee of the present invention. The vehicle navigation program of FIG. 7C interrupts the main program of FIG. 7A about once per second and computes the current position of the vehicle V and other navigational parameters, as described in the co-pending patent application. The navigation program of FIG. 7C then provides the main program of FIG. 7A with input data identifying the current position $(X_VY_V)$ for the symbol $S_V$ and the heading $H_V$ of the vehicle V. These input data are used, as will be further described, to enable the main program of FIG. 7A to compute the map display M. While a detailed understanding of the vehicle navigation program is not believed to be essential for understanding the present invention, nevertheless the above-identified co-pending application Ser. No. 618,041 is, in its entirety, herein incorporated by reference.

Data about the heading $H_V$ of the vehicle V may be obtained from the reading of the sensor 28. However, if the navigation program of FIG. 7C determines that the vehicle V is on a street St, again as described in detail in the above-mentioned co-pending patent application, the identification or name of the street St and the XY coordinate data of the endpoints EP of the particular segment S (see FIG. 6A) of that street St on which the vehicle V is moving can be passed to the main program of FIG. 7A. The latter then may use this input data to compute a map orientation $H_M$ from the street heading $H_S$ derived from such XY coordinate data, where $H_S \simeq H_V$, such that small changes in the sensor reading from the sensor 18 that might change $H_V$ do not change the map orientation $H_M$.

The street heading $H_S$ can be derived from the segment coordinate data of $EP_1$ $(X_1Y_1)$ and $EP_2$ $(X_2Y_2)$ of the segment S as:

$$H_S = \arctan \frac{(Y_2 - Y_1)}{(X_2 - X_1)} \qquad (5)$$

where it has been determined that the vehicle V is moving in the direction from $EP_1$ to $EP_2$.

B. The Main Program

FIG. 8 is a flow chart of the overall main program of FIG. 7A. First, the computer 12 determines the DISPLAY STATE of the system 10 (Block 8A), as will be described in FIG. 8A. The DISPLAY STATE represents a sequence of vehicle conditions (moving or non-moving) or operator selections via console means 44, which define the display presentation on monitor 38. For example, the monitor 38 may be in one of two MAP DISPLAY STATES for displaying the map M or in a NON-MAP DISPLAY STATE for displaying alphanumeric data, such as the index of street names shown in FIG. 6B.

The computer 12 tests the DISPLAY STATE (Block 8B) to determine if the system 10 is in a MAP DISPLAY STATE. If in a MAP DISPLAY STATE, then the computer 12 computes the map display M (Block 8C) and a return is made to block 8A. If the system 10 is in a NON-MAP DISPLAY STATE, then the computer 12 computes the non-map display D (Block 8D), and the routine returns to Block 8A. These computations result in data which are used by the interrupt program of FIG. 7B to generate the display M or D.

FIG. 8A is used to explain the several DISPLAY STATES (see Block 8A of FIG. 8). When the system 10 is first turned on, the computer 12 causes a power-up STATE A (non-display), while computing initial map display parameters. There are three parameters which are (1) the X and Y map coordinates of the origin of the display viewing window W (i.e., $X_oY_o$), (2) the map orientation $H_M$ of the viewing window W and (3) the scale level $Z_i$ of the viewing window W. The display origin is not at the physical center of the monitor 38, but, as indicated in STATE A of FIG. 8A, at a point $(X_oY_o)$ centered in the X direction and, for example, ⅛ up the monitor 38 in the Y direction. The coordinates $(X_oY_o)$, as previously mentioned, define the point on the monitor 38 that is used as the origin for positioning the coordinate system of the display viewing window W. This position generally (but not always, such as for PAN commands described below) is coincident with the current position $(X_VY_V)$ of the vehicle V represented by the symbol $S_V$. The map orientation $H_M$ defines the compass direction that is vertically up on the monitor 38 with reference to the display viewing window W and defines the orientation of the north arrow N on the monitor 38. For example, the map orientation $H_M$ of a given frame of the map display M may be such that the compass direction southwest is pointing or heading up.

During power-up the main program of FIG. 7A determines the position $(X_VY_V)$ of the vehicle V and its heading $H_V$ from previous values stored prior to last power down. These data are used to position the viewing window W to the proper location and orientation for the map display M (i.e., $X_oY_o=X_VY_V$, and the map orientation, i.e., $H_M=H_V$). Additionally, an initial scale level $Z_i$ is selected to define the size of the viewing window W. These parameters are used directly in equations (3) and (4) to construct the map display M. The power-up STATE A is then automatically changed to a MAP DISPLAY STATE B termed a "center-on-vehicle" DISPLAY STATE B.

In DISPLAY STATE B, as shown in FIG. 8A, the display parameters (1)-(3) and, hence, the map display M, can change by motion of the vehicle V, as was illustrated in FIGS. 3A-3G, and by the vehicle driver selecting a scale level $Z_i$, as was shown in FIGS. 3H-3J. As the vehicle V moves, the navigation program of FIG. 7C computes a new position $(X_VY_V)$ which is used to define the parameters described above. The new heading $H_V$ of the vehicle V and which street St the vehicle V is on are combined to compute $H_M$, where:

$H_M=H_V$ if the vehicle V is not determined to be on any street St, as described in the above-mentioned co-pending application $H_M=H_S$ if the vehicle V is determined to be on a Street St; where $H_S$ is computed as the heading of street St and $H_S \approx H_V$; see equation (5)

Also, a scale level $Z_i$ can be changed by generating an appropriate SCALE COMMAND (IN or OUT) via the buttons on 46 on the console means 44.

The DISPLAY STATE B is automatically switched to a DISPLAY STATE C ("vehicle stopped") when the vehicle V is stopped, as may be determined, for example, from the navigation program of FIG. 7C which is calculating the distance traveled by the vehicle V. In MAP DISPLAY STATE C, in addition to the SCALE COMMANDS IN or OUT, the operator can enter commands via the buttons 46 to cause the map display M to PAN UP, PAN DOWN, PAN LEFT and PAN RIGHT. Each PAN command results in the computer 12 calculating a new origin $(X_oY_o)$ of a new display viewing window W pursuant to equations 6 below and with reference to FIG. 8A-1 which shows the results of a PAN RIGHT command (dashed lines) and a PAN DOWN command (dotted lines):

PAN RIGHT $$X_{o(new)} = X_{o(old)} + h_i/4 \cdot \cos(H_M - 90°) \qquad (6-1)$$

$$Y_{o(new)} = Y_{o(old)} + h_i/4 \cdot \sin(H_M - 90°)$$

PAN LEFT $$X_{o(new)} = X_{o(old)} - h_i/4 \cdot \cos(H_M - 90°) \qquad (6-2)$$

$$Y_{o(new)} = Y_{o(old)} - h_i/4 \cdot \sin(H_M - 90°)$$

PAN DOWN $$X_{o(new)} = X_{o(old)} + h_i/4 \cdot \sin(H_M - 90°) \qquad (6-3)$$

$$Y_{o(new)} = y_{o(old)} - h_i/4 \cdot \cos(H_M - 90°)$$

PAN UP $$X_{o(new)} = X_{o(old)} - h_i/4 \cdot \sin(H_M - 90°) \qquad (6-4)$$

$$Y_{o(new)} = Y_{o(old)} - h_i/4 \cdot \cos(H_M - 90°)$$

where $h_i$=height of viewing window $W_i$.

This results in shifting or translating the map display viewing window W in either X' or Y' by an amount proportional to the current scale level $Z_i$, as shown by comparing FIG. 8A-1 at scale level $Z_i$ and a comparable FIG. 8A-2 but at a scale level $Z_{i+1}$. Each press of a PAN button 46 will activate one of equations 6-1 to 6-4. Multiple PAN commands are allowed. In this example, each PAN command changes the viewing window W by 25 percent of the height dimension h. Other embodiments could used fixed or variable percentage amounts.

By sequential SCALE and PAN commands, the operator can view a window W of any part of the map area MA at any scale level $Z_i$. As a consequence of using the PAN commands, the vehicle symbol $S_V$ may no longer appear at the display center $(X_o, Y_o)$; see, for example, PAN RIGHT to FIG. 8A-2. However, the computer 10 stores the coordinates $(X_V Y_V)$ of the current vehicle position. Thus, by pressing another button 46 named, for example, CENTER, the display viewing window W will again be translated so that the vehicle symbol $S_V$ appears at the display center $(X_o, Y_o)$ by using $(X_V Y_V)$ in equations (3) and (4) to center the viewing window W on the vehicle position $(X_V Y_V)$.

In DISPLAY STATE C of FIG. 8A, a NORTH-UP command can be entered to select "north-up" map orientation $H_M$, which results in the setting of the map orientation $H_M$ to true north. In this north-up map orientation, $H_M = 90°$ or north and the vehicle symbol $S_V$ is rotated on the map display M corresponding to the vehicle heading $H_V$. The north-up map orientation $H_M$ can be reset to the heading-up map orientation $H_M$ by entering a HEADING-UP command by which the symbol $S_V$ points up, and the map display M rotates appropriately. The heading-up and north-up display viewing windows W are shown in FIG. 8B. The resulting map displays M are shown, respectively, in FIGS. 8B-1 and 8B-2. The computer 12 changes between heading-up and north-up map displays M by recomputing end points EP according to equations (3) and (4) and by changing $H_M$ to $H_V$ for heading up or to 90° for north up.

While in the DISPLAY STATE C, should the vehicle V move, the system 10 automatically reverts to the center-on-vehicle DISPLAY STATE B. This motion is determined if the distance between the current vehicle position $X_V, Y_V$ and the vehicle position $X_V, Y_V$ stored when STATE C was first entered, exceeds a threshold distance. Concommittantly, DISPLAY STATE C is entered if the vehicle V has not moved the threshold distance in a threshold period of time.

While in DISPLAY STATE C, the operator can call a DISPLAY STATE D for entering desired destination data, as described more fully below. In this DISPLAY STATE D, the operator will view on the monitor 38 and can index through by depressing appropriate buttons 46, the listing of street names of the map data base (see FIG. 6B). Once a desired destination is selected a new scale level $Z_i$ is automatically calculated. Then, the computer 12 will automatically return to DISPLAY STATE B with the current vehicle position $(X_V Y_V)$ and display heading $H_M$ to calculate the viewing window W so as to display both $S_d$ and $S_V$, position the destination symbol $S_d$ and calculate the distance-to-go DTG data.

Thus, with reference to FIG. 9, which is a flow chart used to determine the DISPLAY STATE (see Block 8A of FIG. 8), if the operator has pressed one of the buttons 46 (Block 9A), then the computer 12 calculates a new DISPLAY STATE (Block 9B). If the operator has not pressed a button 46 (Block 9A), but the parameters indicating motion of the vehicle V have changed (Block 9C), then the computer 12 calculates a new DISPLAY STATE (Block 9B). If such car motion parameters have not changed (Block 9C), then the computer 12 maintains the same DISPLAY STATE on the monitor 38 (Block 9D).

FIG. 10 is a flow chart used to explain the computing by the computer 12 of the map display M (See Block 8C). First, the computer 12 fetches the three state parameters (Block 10A) which, as previously mentioned, uniquely define the map display viewing window W to be displayed. From these parameters, the four straight lines defining the boundary of the viewing window W are computed. Then, the position of the vehicle symbol $S_V$ is determined (Block 10B), as will be further described in FIG. 11. Next, the position of the destination symbol $S_d$, if any, or a "direction-to-destination" DTD arrow (see FIG. 12A) is calculated along with the distance-to-go DTG data (Block 10C), as will be described in conjunction with FIG. 12. Next, the map segments S within the display viewing window W are fetched from the map data base (Block 10D), as will be described more fully in relation to FIG. 14. Next, as will be described in relation to FIG. 15, the computer 12, based on the scale-dependent prioritization scheme shown in Table I, computes the intensities of the streets St (Block 10E) that lie within the map display viewing window W, as found from Block 10D. Next, the computer 12 selects the labels for the streets St of the map display viewing window W (Block 10F), as will be described in relation to FIGS. 16-17. The main program of FIG. 7A then constructs a "map display file" (Block 10G) from the results of Blocks 10A-10F to be used by the refresh display program of FIG. 7B which outputs to the display hardware the map display M.

FIG. 11 is a flow chart used to explain the computation of the position and orientation on the map display M of the vehicle symbol $S_V$ (See Block 10B). First, the map coordinates $(X'_V Y'_V)$ for the symbol $S_V$ are computed from the base map coordinates $(X_V, Y_V)$ taken from the vehicle navigation algorithm of FIG. 7C and the linear transformation of the display viewing window W (Block 11A). These coordinates $(X_V Y_V)$ are normally used as the origin of the viewing window W (i.e., $X_o, Y_o = X_V, Y_V$) (see FIG. 8A-STATE A) and, so, $S_V$ is normally at the origin. The PAN commands can shift or translate the viewing window origin from the vehicle V, as described above. Hence, with PAN commands, the current vehicle position $(x'_V, y'_V)$, i.e., the symbol $S_V$, can be displaced from the display origin $(X_o, Y_o)$ and, possibly, outside the viewing window W, as previously mentioned.

Next, the computer 12 determines if the vehicle V lies within the map display viewing window W (Block 11B). The vehicle V lies within the viewing window W if:

$$-w/2 \cdot 2^{-i} < X'_V < +w/2 \cdot 2^{-i} \qquad (7)$$

and $$-1/3h \cdot 2^{-i} < Y'_V < +2/3h \cdot 2^{-i}$$

where:

$X_o, Y_o$ are the origin coordinates of the viewing window W $X'_V, Y'_V$ are the coordinates of vehicle V in the viewing window coordinate system w is the width of the monitor screen MS in base map scale units h is the height of the monitor screen MS in base map scale units, and $2^{-i}$ is the scale factor for the current map display scale level $Z_i$ If the vehicle V does not lie within the display viewing window W, the remaining routine of FIG. 11 is bypassed, otherwise, the orientation or heading $H_{SV}$ of the symbol $S_V$ is computed (Block 11C). This is towards the top of the monitor screen MS when the map display M is in the heading-up mode. However, if the map display M is in the north-up mode, the symbol $S_V$ will be oriented on the monitor screen MS at the appropriate true heading $H_V$ of the vehicle V. Then, the position of the symbol $S_V$, centered on the actual vehicle position, is computed and, together with the orientation data, used to define the vehicle symbol $S_V$ and added to the map display file (Block 11D).

FIG. 12 is a flow chart used to explain the calculation of the position of the destination symbol $S_d$ and distance-to-go DTG data (see Block 10C). First, the computer 12 determines if a destination location has been entered by the operator (Block 12A), as will be described in detail below with reference to FIG. 13 and FIG. 13A. If not, the remaining routine of FIG. 12 is bypassed.

If destination data have been entered, the computer 12 has determined the base map coordinates of the destination symbol $(X_d, Y_d)$, as will be explained below. Destination display coordinates $(X'_d, Y'_d)$ of the destination symbol $S_d$ are determined using equations (3) and (4). Distance-to-go (DTG) is computed as the distance between the desired destination and the current position of the vehicle V (Block 12B), as given by equation (8).

$$DTG = (X_V - X_d)^2 + (Y_V - Y_d)^2 \quad (8)$$

The computer 12 then determines if the position of the destination symbol $S_d$ lies within the map display viewing window W currently on the monitor 38 (Block 12C), the computations for which will be described below in relation of FIG. 12A. If not, the computer 12 computes a direction-to-destination arrow DTD (shown in FIG. 12A) pointing towards the desired destination and adds this to the map display file (Block 12D). Thereafter, the computer 12 adds to the map display file the distance-to-go DTG from the current position $(X_V, Y_V)$ of the vehicle V to the desired destination $(X_d, Y_d)$ (Block 12E). If the desired destination does lie within the map display viewing window W (Block 12C), then the computer 12 computes the position of the destination symbol $S_d$ (Block 12F) and DTG (Block 12E) and adds these data to the map display file.

FIG. 12A shows two viewing windows $W_i$ and $W_{i+1}$ with two respective scale levels $Z_i$ and $Z_{i+1}$, and illustrates the calculation for determining if $S_d$ is in the viewing window W and for determining DTG. Equation (7) is used to determine if $S_d$ is in the viewing window by replacing $(X'_V, Y'_V)$ with $(X'_d, Y'_d)$. In this case the test will fail for viewing window $W_i$ of scale level $Z_i$ (and hence the DTD arrow is shown) and will pass for viewing window $W_{i+1}$ of scale level $Z_{i+1}$.

Figure 13:
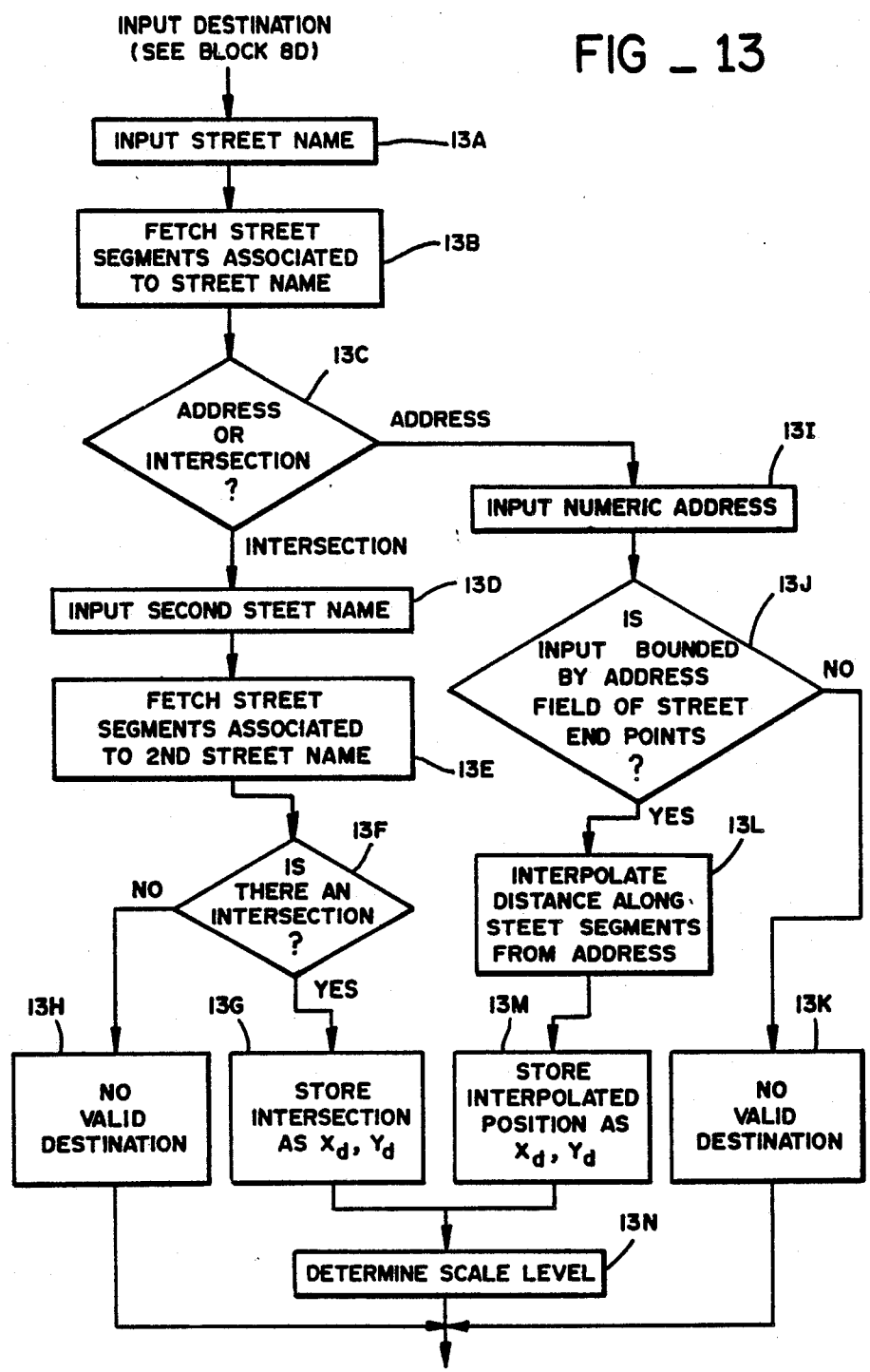

As previously mentioned, in NON-MAP DISPLAY STATE D, destination data can be displayed, as will now be described in relation to the flow chart of FIG. 13 and the illustration of FIG. 13A.

By using the buttons 46 to access the index partially shown in FIG. 6B and to select (i.e., enter) one name of the index as the desired street name (Block 13A), the segments S associated to that stree name are fetched from the map data base (Block 13B). Next, the computer 12 asks the driver to select which destination option he desires (destination by stree intersection or destination by street address) (Block 13C). If the driver selects destination by street intersection by depressing a button 46, the index controls are reset and the driver may input a second street name (Block 13D). The computer 12 then fetches from the map data base the segments S associated to that name (Block 13E). The computer 12 then tests each segment S from the first street St against each segment S of the second street St to determine if any pair of segments S intersect (Block 13F). For example, in FIG. 13A two streets St are shown as $St_1$ and $St_2$. $St_1$ has five segments $S_1$-$S_5$ and $St_2$ has three segments $S_1$-$S_3$. According to the routine of Block 13F, the computer 12 takes the first segment $S_1$ of Street $St_1$ and the first segment $S_1$ of Street $St_2$ and determines their intersection by solving for the intersection of two straight lines. If this line intersection lies between end points of both segments, then the two segments (and hence the two streets) intersect and the search is completed. If not, $S_1$ of $St_1$ is tested against successive segments of $St_2$. If still no segment intersection is found, $S_2$ of $St_1$ is tested against each segment S of $St_2$ and so on. In this case $S_3$ of $St_1$ and $S_2$ of $St_2$ intersect at I.

If an intersection I is found, the computer 12 stores the location of the intersection as the destination position $(X_d, Y_d)$ (Block 13G). If no intersection is found, then no destination is computed (Block 13H) and the routine exits without specifying a destination.

If the driver selects the address destination option (Block 13C) by depressing a button 46, he or she then will input a numeric address (Block 13I). This address is tested against the address field data associated with the named street to see if the address number lies within (i.e., is bounded by) two address numbers associated with two segment endpoints EP (Block 13J). If it does not, then no destination is computed (Block 13K) and the routine exits without specifying one. If it is bounded, then a distance along the street St between the bounding end points EP is computed as the linear interpolation (according to street path length) of the numeric address (Block 13L). This point is stored as the destination position $(X_d, Y_d)$ (Block 13M).

Once the position of the destination symbol $(X_d, Y_d)$ is stored (Block 13G or 13M), the computer 12 computes the scale level $Z_i$ (Block 13N) to show the least areas for displaying both the vehicle V centered on the monitor 38 and the destination symbol $S_d$. This is accomplished in the following manner with the aid of FIG. 13B. Here, the position of the vehicle $(X_V Y_V)$ and heading $H_V$ are used to specify the origin of the viewing window W and the orientation of its axes. This defines the display axes X' and Y'. The distance between $S_d$ and $S_V$ (the distance-to-go) can be broken into its orthogonal components $\Delta X'$ and $\Delta Y'$ as shown on FIG. 13B. The length $w/2 \cdot 2^{-i}$ defines the length from $S_V$ that can be seen in the viewing window W for the scale level $Z_i$. Starting with the smallest window $W_0$ (i.e., scale level $Z_0$), this length is computed and compared with $\Delta X'$ until the first scale level is found such that this length is greater than $\Delta X'$ (and hence in the viewing window W). Similarly, a height computation is compared with $\Delta Y'$ until a scale level is found such that the height value is greater than $\Delta Y'$. The minimum of the two scale levels thus computed will determine the appropriate scale level.

FIG. 14 is a flow chart used to explain the processing of the appropriate segments S (see Block 10D) to construct the map display M in the viewing window W.

First, the computer 12 fetches the straight line boundaries of the map display viewing window W computed in Block 10A based on the parameters (1)–(3) (Block 14A). Next, the computer 12 fetches a segment S of the map data base (Block 14B). The computer 12 then computes the XY display coordinates of each segment S and tests to see if the segment S wholly or partially lies within the viewing window W (Block 14C).

This latter test can be explained with the help of FIG. 14A. A viewing window W is shown (solid box of four boundary lines) in the map area MA and the base map coordinate system X, Y. As previously indicated, there are four straight lines defining the edges of the viewing window W. Also shown in FIG. 14A are segments $S_1$–$S_4$. Each is defined by its endpoints $EP_1$ and $EP_2$. Each straight line segment $S_1$–$S_4$ is tested to determine if it intersects any of the straight lines defining the window boundary, as follows.

For a segment S, the computer 12 computes the four intersections of the segment line and the four boundary lines (segment lines parallel to boundary lines have either two or an infinite number of intersections). If the segment S intersects one or more straight lines defining the boundary of window W then the segment S falls, in part, in the viewing window W and is kept for further processing. This is the case for segment $S_1$ with one such intersection, and segment $S_2$ with two such intersections.

Segments $S_3$ and $S_4$ do not intersect with any of the boundary lines of window W. For these cases a second test is made to see if both end points EP are on the same side of either set of parallel lines. If they are as in segment $S_3$, the segment is not in the viewing window W and is discarded. If they are not as in segment $S_4$, the segment is wholly within the viewing window W and is kept for further processing.

For those segments S which pass the viewing window test (Block 14C), the segments S are cropped, as described below, to match the viewing window boundary (Block 14D).

Segments S that lie wholly inside the viewing window W (e.g., $S_4$ of FIG. 14A), are used directly in constructing the map display file. For those segments S that intersect the boundary of the viewing window W (e.g., $S_1$ of FIG. 14A), a new end point ($EP'_1$) is computed at the intersection and the segment $S_1$ is cropped or shortened to $S'_1$ to match the window boundary. And for those segments S that intersect two boundaries of the viewing window W (e.g., $S_2$ of FIG. 14A), two new end points ($EP'_1, EP'_2$) are computed and $S_2$ is cropped to $S'_2$ to match the window boundary. The resulting XY display coordinates of the segments S are then linearly transformed using equations (3) and (4) (Block 14E) and used to prepare the map display file, as described below. After a segment S is either discarded (Block 14C) or transformed (Block 14E), a test is made to see if it was the last segment S (Block 14F). If not, another segment S is fetched (Block 14B), and the routine is repeated until all segments S are tested.

FIG. 15 is a flow chart for explaining the computation of the display intensities of the streets St pursuant to the scale dependent prioritization scheme summarized in Table I (see Block 10E). First, for a given segment S, the corresponding priority code is fetched from the map data base (Block 15A). Then, the intensity of the corresponding street St via the look-up procedure for the current scale level $Z_i$ is determined via the Table I (Block 15B). This intensity is added to the display file in such a way as to instruct the display means 36 to display that given street St at the selected intensity (Block 15C). Next, if this is not the last segment S whose display intensity is to be determined (Block 15D), a return is made to Block 15A. Otherwise, the routine is done.

FIG. 16 shows a flow chart for selecting the street labels (See Block 10F). First, the streets St within the map display viewing window W are placed in a certain order (Block 16A) in accordance with an ordering scheme. One example of an ordering scheme will now be described in conjunction with FIG. 17.

A street St in the viewing window W is fetched (Block 17A). That street St is tested to see if it is named (block 17B). Some streets St such as highway off-ramps are not named. If the fetched street St is not named it will not be labelled. The street St is not scored for ordering, as described below, and control is passed to fetching the next street St. If it is named (Block 17B) then the total street length within the viewing window W is computed (Block 17C) and as shown in FIG. 17A. If the fetched street St is not long enough for labelling (Block 17D), the street is not scored for ordering and control is passed to fetching the next street St.

If the fetched street St is long enough to warrant a label, it is tested to determine if this street St is the street the vehicle V is currently on (Block 17E) by, for example, comparing its name to that given by the navigation program of FIG. 7C. If it is, then the street St is given a score of 300 (Block 17F) and control is passed to fetching the next street St.

If the fetched street St is not the street the vehicle V is on, then it is tested to see if the vehicle V will likely intersect it if the vehicle V remains on its current heading (Block 17G). This test is explained below in relation to FIG. 17B.

FIG. 17B shows an example of a viewing window W, the streets St on its encompassed map display M, the vehicle symbol $S_V$ and the viewing window coordinate axes X'Y'. In addition two vertical test lines TL (dashed lines shown in FIG. 17B but not presented on the monitor screen MS) are drawn above the X' axis and on either side of the vehicle symbol $S_V$. If any segment S of a street St intersects either of these straight test lines TL, then it is determined that the vehicle V will likely intersect that street St as it moves. If the street St intersects only one test line TL, the Y' coordinate of that endpoint within the test lines TL is taken to calculate a distance (i.e., $D_3$ of FIG. 17B). If the street St intersects both test lines TL, then the Y' coordinate of the streets' intersection with the Y' axis is taken to calculate the distance (i.e., $D_4$ of FIG. 17B).

In the example of FIG. 17B, street $St_1$ does not intersect the vertical test lines TL. Street $St_2$ is ahead of the vehicle V but does not cross either test line TL. Street $St_3$ does intersect one test line TL and a distance $D_3$ will be computed. Street $St_4$ intersects twice and the distance $D_4$ will be computed.

If the street St is determined to intersect, then the distance between this intersection and the vehicle V is computed (Block 17H), as shown in FIG. 17B. A list of these streets St and such distances is kept (Block 17I) for later processing (see Blocks 17N, 17O, 17P, 17Q). Control is then passed to fetching the next street St.

Streets St not yet scored or disqualified are tested to determine if they are ahead of the vehicle V. This is done by testing if any end point EP is above the vehicle V, i.e., has a Y' value greater than zero for the heading-up display (Block 17J). If the street St is ahead of the vehicle V, the street St (Block 17K) is given a score of 400 plus the street priority. (A number from 1 to 16 defining street priority where 1 is the most major highway and 16 is the most minor street.) Control is then passed to fetching the next street. If it was determined that the street St is not ahead of the vehicle V, then the street St is given a score of 400 plus street priority plus 0.5 (Block 17L). Control is then passed to fetching the next street.

Each time control is passed to fetching the next street St, a test is made to determine if this is the last street (Block 17M). If it is not, then the next street St is etched (Block 17A). If it is the last street St, then the list of likely intersecting streets St (from Block 17I above) is ordered by distance (Block 17N). The street St closest the vehicle V is given a score of 100 (Block 17O), the second closest street St is given a score of 200 (Block 17P) and the remaining streets St on the intersection list are scored 400 plus the street priority category (Block 17Q). And finally, the list of all scored streets is ordered by numeric score with the lowest score receiving the highest order (Block 17R). If two or more streets St have the same numeric score, the highest order is given to the street St with the longest total street length as computed in Block 17C.

With reference again to FIG. 16, once so ordered, the streets St are individually fetched in sequence (next highest ordered street St) (Block 16B) to determine if the fetched street can be labelled on the monitor 38. Each street St is comprised of one or more straight line segments S, as described above,. These segments S are further reduced if two or more connecting segments S have a difference in orientations of less than a threshold (see FIG. 18A, e.g., $S_1$ and $S_2$). The resulting segments S are ordered according to their length with the longest segment S given the highest order (Block 16C). If this street St was labelled on the previous frame, the segment S which was lavelled is given the highest position in the order. All segments S shorter than a threshold length are too short to label and are dropped from the list.

For the current street St, the next highest ordered segment S is fetched (Block 16D). A tentative label position is computed (Block 16E) in the following way. First, if this segment S is labelled on the last frame the same label position relative to the endpoints EP of the segment S are used. If no label was on this segment S, a tentative position is determined by computing an offset from the FROM endpoint EP (See FIG. 4) and using the street heading $H_S$ to compute the label orientation.

The label is next tested to see if it collides with (writes over) a label already finalized or if it intersects with the boundary of the viewing window W (Block 16F). This collision test now will be explained with reference to FIG. 18B. A collision grid CG is a two-dimensional array of storage which divides the monitor 38 into cells C. At the start of the labelling routine all cells C are clear. When a label position is finalized, each cell C that contains part of the label is set (shown by shaded areas in FIG. 18B around the label "LAWRENCE"). When a tentative label position such as "TASMAN" is computed, the cells C it would occupy are tested. If any one of the cells C is set (already occupied) then a collision occurs and the tentative label position fails (Block 16F).

The routine then locks for the last possible collision cell C (Block 16G) and determines if the current segment S has sufficient length past this last collision cell C to place the label; see FIG. 18C. If the segment S cannot be labelled, a test is made to see if it is the last segment S (Block 16H). If not, the next ordered segment S is fetched (Block 16D). If it is the last segment S, that street is not labelled and a test is made to determine if that is the last ordered street St (Block 16I). If it is not the last, then the next ordered street St is fetched (Block 16B).

In this process, when a tentative label is found not to collide with any finalized labels (Block 16F), then this label itself is finalized. First the label, its position and its orientation are added to the display file (Block 16J). Next, the cells C which it occupies are set in the collision grid CG (Block 16K). Then a test is made to determine if this was the $N^{th}$ label finalized where, for example, $N=5$ (Block 16L). If it is not the $N^{th}$ label, then a test is made to determine if that was the last street St (Block 16I). If it was the $N^{th}$ label (Block 16L) or the ordered list of streets has been exhausted (Block 16I), then the routine finishes by recording the locations of the finalized labels for use in order segments S in the next scene (Block 16M) (as described in Block 16C) and finally the collision grid CG is cleared, ready to start the process over again (Block 16N).

The resulting map display file constructed through the various routines described above contains all the vector and intensity commands to allow the hardware vector generator card 40 to generate the map display M. Once the display file is complete, it is used by card 40 to continually refresh the monitor 38 through the software of FIG. 7B. At the same time the main program of FIG. 7A is creating a new and separate display file. Once it is complete it is used by the program of FIG. 7B to display a different frame thereby creating the changing or moving map display.

C. Program Code Listings

Assembly language code listings of significant aspects of the display invention, which may be executed on the IBM PC mentioned above, are included as part of this specification in the form of computer printout sheets. The title, operation and general content of these assembly language code listings are as follows:

(1) box_clip—This routine clips segments S at the display window boundary and determines if the segment S intersects the test lines TL.

(2) cal_cntr—This routine calculates the center ($X_o, Y_o$) of the map display M.

(3) col_test—This routine tests to see if a tentative position for a label collides with a label already finalised or if it intersects with the boundary of the viewing window W.

(4) cross_st—This routine computes the intersection of two streets St.

(5) dsp_blk—This routine computes the total length within the viewing window W of streets St and determines the two cross streets closest the vehicle V.

(6) dsp_map—This routine positions the vehicle symbol $S_v$ and destination symbol $S_d$, and computes the map display file.

(7) dsp_name—This routine adds a label to the display file, and updates the collision grid CG.

(8) dsp_strt—This routine processes the appropriate segments S of a street St to construct the map display M.

(9) get_pos—This routine fetches the three state parameters which define the map display viewing window W.

(10) index—This routine manipulates the index of streets St.

(11) lb_map—This routine selects the streets St to be labeled.

(12) lb_segmt—This routine positions a label for a street St along a segment S.

(13) lb$_{13}$strt—This routine labels a street St.

(14) map_rd—This routine determines if vehicle operator has entered commands via buttons 46 and calculates a new origin ($X_o,Y_o$) of a new display viewing window W when a PAN command is entered.

(15) prior_lb—This routine positions a label at the same relative position of the last frame.

(16) rt_vectr—This routine performs the rotation of an endpoint EP.

(17) selct$_{13}$st—This routine selects street names from the index and gets street segments S.

(18) set_zoom—This routine sets the display scale level $Z_i$ and computes the display viewing window W.

(19) art_strt—This routine orders segment S according to their length.

IV. Summary

The present invention presents a map and associated navigation information to a driver (or passenger) of a vehicle. This navigation aid enables the driver to extract information at a glance, thereby allowing him or her to navigate while attending to the function of driving. The invention allowing for this is composed of four features including a moving map display enabling the immediate vicinity of the vehicle to be displayed at an orientation which matches the vehicle's orientation, a scale-dependent street prioritization scheme which reduces the complexity of the map presentation enabling the driver to comprehend the map at a glance, a selective and dynamic labelling scheme which also simplifies extracting map information at a glance, and an index/destination location technique which enables the driver to quickly locate the position of a destination and to conveniently monitor his or her progress towards reaching that destination.

The above disclosure of the invention is but one embodiment of the invention. Many parameters and procedures described above could be chosen or performed differently while still embodying the present invention. Examples of alternative embodiments include:

(1) selecting and displaying more than one destination;

(2) other codes in Table I (priority categories);

(3) other fixed or variable scale factors;

(4) different hardware;

(5) different sensors such as inertial gyroscopes, fluidic turning rate sensors, or other means of navigation such as terestrial radio beacons or satellite beacons;

(6) other labelling schemes;

(7) more precise methods for computing the next cross-street;

(8) other PAN parameters;

(9) other destination data such as landmarks or other such special items in the map data base;

(10) other methods of structuring the data base for efficient data retrieval;

(11) other methods of performing the mathematics to gain computational efficiencies;

(12) use of color for the codes of Table I; and

(13) other DISPLAY STATES and division of functions in the DISPLAY STATES.

Copyright 1984 Etak, Inc.

```
;   box_clip(px1, py1, px2, py2, pcrs_dist)
;   int *px1, *py1, *px2, *py2, *pcrs_dist;

;   entry
;
;
;   exit
;
;
;
;
;
;
;

@DATAI          SEGMENT BYTE PUBLIC 'DATAI'
                        extrn   x_left:word, x_right:word
                        extrn   y_bot:word, y_top:word
        cen_width       equ     5
        x_from          dw
        y_from          dw
        x_to            dw
        y_to            dw
        x_max           dw
        x_min           dw
```

```
y_max           dw
y_min           dw
y_out           dw
ret_value       dw
dividend        dw
@DATAI          ENDS DGROUP          GROUP   @DATAI
@CODE           SEGMENT BYTE PUBLIC 'CODE'
                ASSUME  CS:@CODE, DS:DGROUP
                public  box_clip box_clip        proc    near
                push    bp
                mov     bp,sp
                mov     si,4[bp]
                mov     ax,[si]
                mov     x_from,ax
                mov     si,6[bp]
                mov     bx,[si]
                mov     y_from,bx
                call    in_box
                mov     si,8[bp]
                mov     ax,[si]
                mov     x_to,ax
                mov     si,10[bp]
                mov     bx,[si]
                mov     y_to,bx
                js      from_out
                call    in_box
                js      in_out
                mov     ret_value,4
                jmp     box_clip_ret in_out:         mov     dx,y_to
                mov     y_out,dx
                add     bp,8
                mov     ret_value,3
                jmp     one_xing from_out:       call    in_box
                js      two_xing
                mov     ax,x_from
                mov     dx,y_from
                mov     y_out,dx
                add     bp,4
                mov     ret_value,2
                jmp     one_xing one_xing:       mov     cx,1
                cmp     ax,x_left
                jge     one_xing_right
                mov     ax,x_left
                call    y_xing
                jb      one_xing_bot
                mov     bx,ax
                mov     ax,x_left
```

```
                    call    store_xing one_xing_right:     cmp     ax,x_right
                    jle     one_xing_bot
                    mov     ax,x_right
                    call    y_xing
                    jb      one_xing_bot
                    mov     bx,ax
                    mov     ax,x_right
                    call    store_xing one_xing_bot:       mov     ax,y_bot
                    cmp     ax,y_out
                    jle     one_xing_top
                    call    x_xing
                    mov     bx,y_bot
                    call    store_xing one_xing_top:       mov     ax,y_top
                    call    x_xing
                    mov     bx,y_top
                    call    store_xing two_xing:           add     bp,4
                    mov     ret_value,1
                    mov     cx,2
                    mov     y_max,bx
                    mov     dx,y_from
                    mov     y_min,dx
                    cmp     bx,y_from
                    jge     below_box
                    mov     dx,y_from
                    mov     y_max,dx
                    mov     dx,y_to
                    mov     y_min,dx
below_box:          mov     bx,y_max
                    cmp     bx,y_bot
                    jge     above_box
                    jmp     no_xing
above_box:          mov     bx,y_min
                    cmp     bx,y_top
                    jle     min_max_x
                    jmp     no_xing
min_max_x:          mov     x_max,ax
                    mov     dx,x_from
                    mov     x_min,dx
                    cmp     ax,x_from
                    jg      two_xing_left
                    jl      switch_x_max
                    cmp     ax,x_left
                    je      store_vert
                    cmp     ax,x_right
```

```
                jne         two_xing_left
store_vert:     mov         bx,y_bot
                call        store_xing
                mov         bx,y_top
                call        store_xing switch_x_max:   mov         dx,x_from
                mov         x_max,dx
                mov         dx,x_to
                mov         x_min,dx
two_xing_left:  mov         ax,x_left
                cmp         ax,x_max
                jle         cross_left
                jmp         no_xing
cross_left:     cmp         ax,x_min
                jle         two_xing_right
                call        y_xing
                jb          two_xing_right
                mov         bx,ax
                mov         ax,x_left
                call        store_xing
two_xing_right: mov         ax,x_right
                cmp         ax,x_min
                jge         cross_right
                jmp         no_xing
cross_right:    cmp         ax,x_max
                jge         two_xing_bot
                call        y_xing
                jb          two_xing_bot
                mov         bx,ax
                mov         ax,x_right
                call        store_xing
two_xing_bot:   mov         ax,y_bot
                cmp         ax,y_min
                jle         two_xing_top
                call        x_xing
                jb          two_xing_top
                mov         bx,y_bot
                call        store_xing
two_xing_top:   mov         ax,y_top
                cmp         ax,y_max
                jge         no_xing
                call        x_xing
                jb          no_xing
                mov         bx,y_top
                call        store_xing
no_xing:        mov         ax,0
                pop         bp
                ret
store_xing_ret: ret
store_xing:     mov         di,[bp]
                mov         [di],ax
                mov         di,2[bp]
                mov         [di],bx
                add         bp,4
                loop        store_xing_ret
                pop         dx
```

```
box_clip_ret:   mov     bp,sp
                mov     si,4[bp]
                mov     bx,[si]
                mov     di,bx
                mov     si,8[bp]
                mov     cx,[si]
                mov     si,cx
                cmp     bx,cx
                jl      test_right
                xchg    bx,cx
test_right:     mov     ax,y_bot
                cmp     bx,cen_width
                jg      cross_st_dist
                cmp     cx,-cen_width
                jl      cross_st_dist
test_slope:     xor     bx,bx
                mov     ax,x_from
                sub     ax,x_to
                cwd
                xor     dx,ax
                rol     ax,1
                adc     bx,dx
                mov     ax,y_from
                sub     ax,y_to
                cwd
                xor     dx,ax
                rol     ax,1
                adc     dx,0
                mov     ax,y_bot
                cmp     dx,bx
                jge     cross_st_dist
                mov     ax,di
                cwd
                xor     ax,dx
                rol     dx,1
                acc     ax,0
                cmp     ax,cen_width
                jg      test_x_to
                mov     si,6[bp]
                mov     ax,[si]
                jmp     cross_st_dist test_x_to:      mov     ax,si
                cwd
                xor     ax,dx
                rol     dx,1
                adc     ax,0
                cmp     ax,cen_width
                jg      cross_st_xing
                mov     si,10[bp]
                mov     ax,[si]
                jmp     cross_st_dist cross_st_xing:  xor     ax,ax
                call    y_xing
cross_st_dist:  sub     ax,y_bot
                mov     si,12[bp]
```

```
                    mov     [si],ax
                    mov     ax,ret_value
                    pop     bp
                    ret in_box:             cmp     ax,x_left
                    js      ret_box
                    cmp     x_right,ax
                    js      ret_box
                    cmp     bx,y_bot
                    js      ret_box
                    cmp     y_top,bx
ret_box:            ret
y_xing:             sub     ax,x_from
                    mov     bx,y_to
                    sub     bx,y_from
                    imul    bx
                    mov     dividend,dx
                    mov     bx,x_to
                    sub     bx,x_from
                    idiv    bx
                    add     ax,y_from
                    cmp     ax,y_bot
                    jl      y_xing_ns
                    jg      y_xing_top
                    call    test_rem
                    js      y_xing_ns
                    ret
y_xing_top:         cmp     ax,y_top
                    jg      y_xing_ns
                    je      y_xing_rem
                    clc
                    ret
y_xing_rem:         call    test_rem
                    js      y_xing_ret
                    jz      y_xing_ret
y_xing_ns:          stc
y_xing_ret:         ret x_xing:             sub     ax,y_from
                    mov     bx,x_to
                    sub     bx,x_from
                    imul    bx
                    mov     dividend,dx
                    mov     bx,y_to
                    sub     bx,y_from
                    idiv    bx
                    add     ax,x_from
                    cmp     ax, x_left
                    jl      x_xing_ns
                    jg      x_xing_right
                    call    test_rem
                    js      x_xing_ns
                    jz      x_xing_ns
                    ret
x_xing_right:       cmp     ax,x_right
                    jg      x_xing_ns
                    je      x_xing_rem
```

```
                clc
                ret
x_xing_rem:     call    test_rem
                jns     x_xing_ns
                ret
x_xing_ns:      stc
                ret
test_rem:       test    dividend,177777Q
                js      rem_neg
                xor     bx,dividend
                js      neg_rem
                jmp     test_rem_ret
rem_neg:        xor     bx,dividend
                js      test_rem_ret
neg_rem:        neg     dx
test_rem_ret:   test    dx,177777Q
                ret box_clip        endp
@CODE           ENDS
@BIGMODEL EQU   0
        include prologue.h public  CAL_CNTR
@CODE       ENDS
@DATAB      SEGMENT
        extrn   CAR_POS:word extrn   CEN_POS:word extrn   LCAR_X:word extrn   LCAR_Y:word extrn   LCEN_X:word extrn   LCEN_Y:word extrn   ZOOMF:word extrn   ZOOMF_PL:word extrn   ZOOMF_DB:word extrn   HOME:word extrn   NORTH:word extrn   CEN_OFF:word @DATAB      ENDS
@CODE       SEGMENT    BYTE PUBLIC 'CODE'
@CODE       ENDS
        extrn   ISMUL:near extrn   ICOS:near extrn   ISIN:near
```

```
@CODE      SEGMENT    BYTE PUBLIC 'CODE'

CAL_CNTR   PROC NEAR
@CODE      ENDS
    extrn       $LLSHIFT:near extrn       $LRSSHIFT:near
@CODE      SEGMENT    BYTE PUBLIC 'CODE'
.00:              ;4
    push BP
    mov  BP,SP
    mov  AX,NORTH
    or   AX,AX
    je   .014
    mov  AX,16384
    mov  CEN_POS+4,AX
    jmp  SHORT .024
.014:             ;12
    mov  AX,HOME
    or   AX,AX
    je   .024
    mov  AX,CAR_POS+4
    mov  CEN_POS+4,AX
.024:             ;14
    mov  AX,HOME
    or   AX,AX
    jne  ?1
    jmp  .0C1
?1:
    cmp  WORD PTR ZOOMF,0
    jl   .048
    mov  AX,64
    mov  DX,ZOOMF
    mov  CX,DX
    sar  AX,CL
    mov  CEN_OFF,AX
    jmp  SHORT .059
.048:             ;17
    mov  AX,64
    mov  DX,ZOOMF
    neg  DX
    mov  CX,DX
    shl  AX,CL
    mov  CEN_OFF,AX
.059:             ;18
    push WORD PTR CEN_POS+4
    call ICOS
    add  SP,2
    push AX
    push WORD PTR CEN_OFF
    call ISMUL
    add  SP,4
    cwd
    push DX
    push AX
    mov  AX,ZOOMF_DB
```

```
        cwd
        push DX
        push AX
        call $LLSHIFT
        pop  AX
        pop  DX
        add  AX,LCAR_X
        adc  DX,LCAR_X+2
        mov  LCEN_X,AX
        mov  LCEN_X+2,DX
        push WORD PTR CEN_POS+4
        call ISIN
        add  SP,2
        push AX
        push WORD PTR CEN_OFF
        call ISMUL
        add  SP,4
        cwd
        push DX
        push AX
        mov  AX,ZOOMF_DB
        cwd
        push DX
        push AX
        call $LLSHIFT
        pop  AX
        pop  DX
        add  AX,LCAR_Y
        adc  DX,LCAR_Y+2
        mov  LCEN_Y,AX
        mov  LCEN_Y+2,DX
.0C1:                      ;24
        mov  AX,LCEN_X
        mov  DX,LCEN_X+2
        push DX
        push AX
        mov  AX,ZOOMF_DB
        cwd
        push DX
        push AX
        call $LRSSHIFT
        pop  AX
        pop  DX
        mov  CEN_POS,AX
        mov  AX,LCEN_Y
        mov  DX,LCEN_Y+2
        push DX
        push AX
        mov  AX,ZOOMF_DB
        cwd
        push DX
        push AX
        call $LRSSHIFT
        pop  AX
        pop  DX
        mov  CEN_POS+2,AX
```

```
        mov     SP,BP
        pop     BP
        ret
CAL_CNTR ENDP

@CODE   ENDS
@CODE           SEGMENT   BYTE PUBLIC 'CODE'
        include epilogue.h
        end
@BIGMODEL EQU   0
        include prologue.h public  COL_TEST
@CODE   ENDS
@DATAB  SEGMENT
        extrn   STROKE:word extrn   COL_GRID:word public  BOX_TEST
        extrn   STRK_SET:word public  IN_BOX
        extrn   XPIX_MIN:word extrn   XPIX_MAX:word extrn   YPIX_MIN:word extrn   YPIX_MAX:word @DATAB  ENDS
@CODE           SEGMENT   BYTE PUBLIC 'CODE'
@CODE   ENDS
        extrn   CHAR_MNX:near extrn   RT_VECTR:near

@CODE           SEGMENT   BYTE PUBLIC 'CODE'

COL_TEST PROC NEAR
@CODE   ENDS
        extrn   $LRUSHIFT:near extrn   $LLSHIFT:near @CODE           SEGMENT   BYTE PUBLIC 'CODE'
.00:            ;7
    push BP
    mov  BP,SP
    sub  SP,22
    lea  SI,-16[BP]
    push SI
    lea  SI,-18[BP]
    push SI
    call CHAR_MNX
```

```
        add   SP,4
        lea   SI,-12[BP]
        push  SI
        lea   SI,-14[BP]
        push  SI
        lea   SI,STROKE
        push  SI
        mov   AX,0
        push  AX
        mov   BX,12
        mov   AX,+8[BP]
        imul  BX
        push  AX
        call  RT_VECTR
        add   SP,10
        mov   AX,-12[BP]
        add   AX,+6[BP]
        push  AX
        mov   AX,-14[BP]
        add   AX,+4[BP]
        push  AX
        push  WORD PTR +6[BP]
        push  WORD PTR +4[BP]
        call  BOX_TEST
        add   SP,8
        or    AX,AX
        je    .054
        jmp   SHORT .05B
.054:                        ;17
        mov   AX,0
        mov   SP,BP
        pop   BP
        ret
.05B:                        ;19
        mov   AX,+10[BP]
        or    AX,AX
        je    .069
        mov   AX,1
        mov   SP,BP
        pop   BP
        ret
.069:                        ;20
        mov   AX,-18[BP]
        add   AX,254
        mov   DX,+4[BP]
        add   DX,AX
        mov   +4[BP],DX
        mov   AX,-16[BP]
        add   AX,254
        mov   DX,+6[BP]
        add   DX,AX
        mov   +6[BP],DX
        lea   SI,COL_GRID
        mov   AX,+6[BP]
        mov   DX,4
        mov   CX,DX
```

```
        sar  AX,CL
        mov  -2[BP],AX
        shl  AX,1
        shl  AX,1
        add  SI,AX
        mov  AX,[SI]
        mov  DX,+2[SI]
        push DX
        push AX
        mov  AX,0
        mov  DX,-16384
        push DX
        push AX
        mov  AX,+4[BP]
        mov  DX,4
        mov  CX,DX
        sar  AX,CL
        xor  DX,DX
        push DX
        push AX
        call $LRUSHIFT
        pop  AX
        pop  DX
        mov  -22[BP],AX
        mov  -20[BP],DX
        pop  BX
        pop  CX
        and  BX,AX
        and  CX,DX
        or   CX,BX
        je   .0D2
        jmp  SHORT .0F1
.0D2:                       ;24
        lea  SI,COL_GRID
        mov  AX,-2[BP]
        add  AX,1
        shl  AX,1
        shl  AX,1
        add  SI,AX
        mov  AX,[SI]
        mov  DX,+2[SI]
        and  AX,-22[BP]
        and  DX,-20[BP]
        or   DX,AX
        je   .0F8
.0F1:                       ;24
        mov  AX,0
        mov  SP,BP
        pop  BP
        ret
.0F8:                       ;25
        mov  AX,+8[BP]
        push AX
        mov  AX,-14[BP]
        mov  DX,6
        mov  CX,DX
```

```
        shl   AX,CL
        pop   BX
        cwd
        idiv  BX
        mov   -14[BP],AX
        mov   AX,+8[BP]
        push  AX
        mov   AX,-12[BP]
        mov   DX,6
        shl   AX,CL
        pop   BX
        cwd
        idiv  BX
        mov   -12[BP],AX
        mov   AX,6
        mov   DX,+4[BP]
        mov   CX,AX
        shl   DX,CL
        mov   +4[BP],DX
        and   DX,-1024
        mov   -8[BP],DX
        mov   AX,6
        mov   DX,+6[BP]
        mov   CX,AX
        shl   DX,CL
        mov   +6[BP],DX
        and   DX,-1024
        mov   -6[BP],DX
        mov   AX,0
        mov   -10[BP],AX
.0150:                        ;30
        dec   WORD PTR +8[BP]
        mov   AX,+8[BP]
        or    AX,AX
        jne   ?1
        jmp   .0259
?1:
        mov   AX,-14[BP]
        mov   DX,+4[BP]
        add   DX,AX
        mov   +4[BP],DX
        and   DX,-1024
        sub   DX,-8[BP]
        mov   -4[BP],DX
        cmp   DX,0
        jle   .019C
        mov   AX,1
        mov   -10[BP],AX
        mov   DX,0
        mov   BX,-22[BP]
        mov   CX,-20[BP]
        push  CX
        push  BX
        push  DX
        push  AX
        call  $LRUSHIFT
```

```
        pop   AX
        pop   DX
        mov   -22[BP],AX
        mov   -20[BP],DX
        add   WORD PTR -8[BP],1024
        jmp   SHORT .01C6
.019C:                   ;37
        cmp   WORD PTR -4[BP],0
        jge   .01C6
        mov   AX,1
        mov   -10[BP],AX
        mov   DX,0
        mov   BX,-22[BP]
        mov   CX,-20[BP]
        push  CX
        push  BX
        push  DX
        push  AX
        call  $LLSHIFT
        pop   AX
        pop   DX
        mov   -22[BP],AX
        mov   -20[BP],DX
        sub   WORD PTR -8[BP],1024
.01C6:                   ;42
        mov   AX,-12[BP]
        mov   DX,+6[BP]
        add   DX,AX
        mov   +6[BP],DX
        and   DX,-1024
        sub   DX,-6[BP]
        mov   -4[BP],DX
        cmp   DX,0
        jle   .01F0
        mov   AX,1
        mov   -10[BP],AX
        inc   WORD PTR -2[BP]
        add   WORD PTR -6[BP],1024
        jmp   SHORT .0205
.01F0:                   ;48
        cmp   WORD PTR -4[BP],0
        jge   .0205
        mov   AX,1
        mov   -10[BP],AX
        dec   WORD PTR -2[BP]
        sub   WORD PTR -6[BP],1024
.0205:                   ;53
        mov   AX,-10[BP]
        or    AX,AX
        je    .0256
        lea   SI,COL_GRID
        mov   AX,-2[BP]
        shl   AX,1
        shl   AX,1
        add   SI,AX
        mov   AX,[SI]
```

```
        mov     DX,+2[SI]
        and     AX,-22[BP]
        and     DX,-20[BP]
        or      DX,AX
        je      .022A
        jmp     SHORT .0249
.022A:                          ;55
        lea     SI,COL_GRID
        mov     AX,-2[BP]
        add     AX,1
        shl     AX,1
        shl     AX,1
        add     SI,AX
        mov     AX,[SI]
        mov     DX,+2[SI]
        and     AX,-22[BP]
        and     DX,-20[BP]
        or      DX,AX
        je      .0250
.0249:                          ;55
        mov     AX,0
        mov     SP,BP
        pop     BP
        ret
.0250:                          ;56
        mov     AX,0
        mov     -10[BP],AX
.0256:                          ;58
        jmp     .0150
.0259:                          ;58
        mov     AX,1
        mov     SP,BP
        pop     BP
        ret
COL_TEST ENDP BOX_TEST PROC NEAR
.0260:                          ;64
        push    BP
        mov     BP,SP
        push    WORD PTR +6[BP]
        push    WORD PTR +4[BP]
        call    IN_BOX
        add     SP,4
        or      AX,AX
        je      .02D4
        push    WORD PTR +10[BP]
        push    WORD PTR +8[BP]
        call    IN_BOX
        add     SP,4
        or      AX,AX
        je      .02D4
        lea     SI,STRK_SET
        add     SI,30
        mov     AX,+4[SI]
        add     AX,+6[BP]
```

```
        push AX
        lea  SI,STRK_SET
        add  SI,30
        mov  AX,+2[SI]
        add  AX,+4[BP]
        push AX
        call IN_BOX
        add  SP,4
        or   AX,AX
        je   .02D4
        lea  SI,STRK_SET
        add  SI,30
        mov  AX,+4[SI]
        add  AX,+10[BP]
        push AX
        lea  SI,STRK_SET
        add  SI,30
        mov  AX,+2[SI]
        add  AX,+8[BP]
        push AX
        call IN_BOX
        add  SP,4
        or   AX,AX
        je   .02D4
        mov  AX,1
        jmp  SHORT .02D7
.02D4:                    ;71
        mov  AX,0
.02D7:                    ;71
        mov  SP,BP
        pop  BP
        ret
BOX_TEST ENDP IN_BOX   PROC NEAR
.02DB:                    ;77
        push BP
        mov  BP,SP
        mov  AX,+4[BP]
        cmp  AX,XPIX_MIN
        jl   .0307
        mov  AX,+4[BP]
        cmp  AX,XPIX_MAX
        jg   .0307
        mov  AX,+6[BP]
        cmp  AX,YPIX_MIN
        jl   .0307
        mov  AX,+6[BP]
        cmp  AX,YPIX_MAX
        jg   .0307
        mov  AX,1
        jmp  SHORT .030A
.0307:                    ;81
        mov  AX,0
```

```
.030A:                   ;81
    mov    SP,BP
    pop    BP
    ret
IN_BOX   ENDP @CODE    ENDS
@CODE        SEGMENT   BYTE PUBLIC 'CODE'
    include    epilogue.h
    end
@BIGMODEL EQU   0
    include    prologue.h public     CROSS_ST
@CODE    ENDS
    extrn      CVSITSF:near extrn      SFADD:near extrn      SFSUB:near extrn      SFMUL:near extrn      SFINTRST:near extrn      SFINCLSV:near extrn      SFCMP:near extrn      RSFTSI:near

@CODE       SEGMENT    BYTE PUBLIC 'CODE'

CROSS_ST    PROC NEAR
.00:                    ;10
    push   BP
    mov    BP,SP
    sub    SP,66
    mov    SI,+4[BP]
    mov    AX,[SI]
    mov    -12[BP],AX
    mov    SI,+4[BP]
    mov    AX,+2[SI]
    mov    -10[BP],AX
    mov    SI,+6[BP]
    sub    SI,12
    mov    AX,[SI]
    mov    -8[BP],AX
    mov    SI,+6[BP]
    sub    SI,12
    mov    AX,+2[SI]
    mov    -6[BP],AX
    mov    SI,+6[BP]
    mov    AX,[SI]
    mov    -4[BP],AX
```

```
        mov    SI,+6[BP]
        mov    AX,+2[SI]
        mov    -2[BP],AX
        mov    AX,-12[BP]
        cmp    AX,-8[BP]
        jne    .051
        mov    AX,-10[BP]
        cmp    AX,-6[BP]
        jne    .051
        jmp    SHORT .061
.04F:                        ;22
        mov    AX,-12[BP]
        cmp    AX,-4[BP]
        jne    .078
        mov    AX,-10[BP]
        cmp    AX,-2[BP]
        jne    .078
.061:                        ;22
        mov    SI,+8[BP]
        mov    [SI],AX
        mov    AX,-10[BP]
        mov    SI,+10[BP]
        mov    [SI],AX
        mov    AX,1
        mov    SP,BP
        pop    BP
        ret
.078:                        ;27
        mov    SI,+4[BP]
        sub    SI,12
        mov    AX,[SI]
        mov    -16[BP],AX
        mov    SI,+4[BP]
        sub    SI,12
        mov    AX,+2[SI]
        mov    -14[BP],AX
        mov    AX,-16[BP]
        cmp    AX,-8[BP]
        jne    .0A1
        mov    AX,-14[BP]
        cmp    AX,-6[BP]
        jne    .0A1
        jmp    SHORT .0B1
.0A1:                        ;29
        mov    AX,-16[BP]
        cmp    AX,-4[BP]
        jne    .0C8
        mov    AX,-14[BP]
        cmp    AX,-2[BP]
        jne    .0C3
.0B1:                        ;29
        mov    AX,-16[BP]
        mov    SI,+8[BP]
        mov    [SI],AX
        mov    AX,-14[BP]
        mov    SI,+10[BP]
```

```
        mov   [SI],AX
        mov   AX,1
        mov   SP,BP
        pop   BP
        ret
.0C8:                        ;34
        mov   AX,0
        push  AX
        call  CVSITSF
        add   SP,2
        mov   -62[BP],AX
        mov   -60[BP],DX
        mov   -66[BP],AX
        mov   -64[BP],DX
        mov   AX,-12[BP]
        sub   AX,-16[BP]
        push  AX
        call  CVSITSF
        add   SP,2
        mov   -58[BP],AX
        mov   -56[BP],DX
        mov   AX,-10[BP]
        sub   AX,-14[BP]
        push  AX
        call  CVSITSF
        add   SP,2
        mov   -54[BP],AX
        mov   AX,-8[BP]
        sub   AX,-16[BP]
        push  AX
        call  CVSITSF
        add   SP,2
        mov   -50[BP],AX
        mov   -48[BP],DX
        mov   AX,-6[BP]
        sub   AX,-14[BP]
        push  AX
        call  CVSITSF
        add   SP,2
        mov   -46[BP],AX
        mov   -44[BP],DX
        mov   AX,-4[BP]
        sub   AX,-16[BP]
        push  AX
        call  CVSITSF
        add   SP,2
        mov   -42[BP],AX
        mov   -40[BP],DX
        mov   AX,-2[BP]
        sub   AX,-14[BP]
        push  AX
        call  CVSITSF
        add   SP,2
        mov   -38[BP],AX
        mov   -36[BP],DX
        mov   AX,20
```

```
        push AX
        call CVSITSF
        add  SP,2
        mov  -26[BP],AX
        mov  -24[BP],DX
        lea  SI,-30[BP]
        push SI
        lea  SI,-34[BP]
        push SI
        push WORD PTR -36[BP]
        push WORD PTR -38[BP]
        push WORD PTR -44[BP]
        push WORD PTR -46[BP]
        push WORD PTR -52[BP]
        push WORD PTR -54[BP]
        push WORD PTR -60[BP]
        push WORD PTR -62[BP]
        push WORD PTR -40[BP]
        push WORD PTR -42[BP]
        push WORD PTR -48[BP]
        push WORD PTR -50[BP]
        push WORD PTR -56[BP]
        push WORD PTR -58[BP]
        push WORD PTR -64[BP]
        push WORD PTR -66[BP]
        call SFINTRST
        add  SP,36
        or   AX,AX
        je   .01A4
        jmp  SHORT .01AB
.01A4:                      ;42
        mov  AX,0
        mov  SP,BP
        pop  BP
        ret
.01AB:                      ;44
        push WORD PTR -28[BP]
        push WORD PTR -30[BP]
        push WORD PTR -52[BP]
        push WORD PTR -54[BP]
        push WORD PTR -60[BP]
        push WORD PTR -62[BP]
        push WORD PTR -32[BP]
        push WORD PTR -34[BP]
        push WORD PTR -56[BP]
        push WORD PTR -58[BP]
        push WORD PTR -64[BP]
        push WORD PTR -66[BP]
        call SFINCLSV
        add  SP,24
        mov  -22[BP],AX
        or   AX,AX
        je   .0216
        push WORD PTR -28[BP]
        push WORD PTR -30[BP]
        push WORD PTR -36[BP]
```

```
        push WORD PTR -38[BP]
        push WORD PTR -44[BP]
        push WORD PTR -46[BP]
        push WORD PTR -32[BP]
        push WORD PTR -34[BP]
        push WORD PTR -40[BP]
        push WORD PTR -42[BP]
        push WORD PTR -48[BP]
        push WORD PTR -50[BP]
        call SFINCLSV
        add  SP,24
        mov  -20[BP],AX
        or   AX,AX
        je   .0216
        mov  AX,1
        mov  -18[BP],AX
        jmp  .0426
.0216:                          ;46
        mov  AX,-22[BP]
        or   AX,AX
        je   .0220
        jmp  .0299
.0220:                          ;59
        push WORD PTR -24[BP]
        push WORD PTR -26[BP]
        push WORD PTR -28[BP]
        push WORD PTR -30[BP]
        push WORD PTR -60[BP]
        push WORD PTR -62[BP]
        call SFSUB
        add  SP,8
        push DX
        push AX
        push WORD PTR -28[BP]
        push WORD PTR -30[BP]
        push WORD PTR -60[BP]
        push WORD PTR -62[BP]
        call SFSUB
        add  SP,8
        push DX
        push AX
        call SFMUL
        add  SP,8
        push DX
        push AX
        push WORD PTR -32[BP]
        push WORD PTR -34[BP]
        push WORD PTR -64[BP]
        push WORD PTR -66[BP]
        call SFSUB
        add  SP,8
        push DX
        push AX
        push WORD PTR -32[BP]
        push WORD PTR -34[BP]
        push WORD PTR -64[BP]
```

```
        push WORD PTR -66[BP]
        call SFSUB
        add  SP,8
        push DX
        push AX
        call SFMUL
        add  SP,8
        push DX
        push AX
        call SFADD
        add  SP,8
        push DX
        push AX
        call SFCMP
        add  SP,8
        cmp  AX,0
        jge  .029C
.0299:                          ;59
        jmp  .0313
.029C:                          ;59
        push WORD PTR -24[BP]
        push WORD PTR -26[BP]
        push WORD PTR -28[BP]
        push WORD PTR -30[BP]
        push WORD PTR -52[BP]
        push WORD PTR -54[BP]
        call SFSUB
        add  SP,8
        push DX
        push AX
        push WORD PTR -28[BP]
        push WORD PTR -30[BP]
        push WORD PTR -52[BP]
        push WORD PTR -54[BP]
        call SFSUB
        add  SP,8
        push DX
        push AX
        call SFMUL
        add  SP,8
        push DX
        push AX
        push WORD PTR -32[BP]
        push WORD PTR -34[BP]
        push WORD PTR -56[BP]
        push WORD PTR -58[BP]
        call SFSUB
        add  SP,8
        push DX
        push AX
        push WORD PTR -32[BP]
        push WORD PTR -34[BP]
        push WORD PTR -56[BP]
        push WORD PTR -58[BP]
        call SFSUB
        add  SP,8
```

```
        push DX
        push AX
        call SFMUL
        add  SP,8
        push DX
        push AX
        call SFADD
        add  SP,8
        push DX
        push AX
        call SFCMP
        add  SP,8
        or   AX,AX
        jl   ?1
        jmp  .041F
?1:
.0318:                    ;59
        mov  AX,-20[BP]
        or   AX,AX
        je   .0322
        jmp  .039B
.0322:                    ;59
        push WORD PTR -24[BP]
        push WORD PTR -26[BP]
        push WORD PTR -28[BP]
        push WORD PTR -30[BP]
        push WORD PTR -44[BP]
        push WORD PTR -46[BP]
        call SFSUB
        add  SP,8
        push DX
        push AX
        push WORD PTR -28[BP]
        push WORD PTR -30[BP]
        push WORD PTR -44[BP]
        push WORD PTR -46[BP]
        call SFSUB
        add  SP,8
        push DX
        push AX
        call SFMUL
        add  SP,8
        push DX
        push AX
        push WORD PTR -32[BP]
        push WORD PTR -34[BP]
        push WORD PTR -48[BP]
        push WORD PTR -50[BP]
        call SFSUB
        add  SP,8
        push DX
        push AX
        push WORD PTR -32[BP]
        push WORD PTR -34[BP]
        push WORD PTR -48[BP]
        push WORD PTR -50[BP]
```

```
        call SFSUB
        add  SP,8
        push DX
        push AX
        call SFMUL
        add  SP,8
        push DX
        push AX
        call SFADD
        add  SP,8
        push DX
        push AX
        call SFCMP
        add  SP,8
        cmp  AX,0
        jge  .039E
.039B:                   ;59
        jmp  .0417
.039E:                   ;59
        push WORD PTR -24[BP]
        push WORD PTR -26[BP]
        push WORD PTR -28[BP]
        push WORD PTR -30[BP]
        push WORD PTR -36[BP]
        push WORD PTR -38[BP]
        call SFSUB
        add  SP,8
        push DX
        push AX
        push WORD PTR -28[BP]
        push WORD PTR -30[BP]
        push WORD PTR -36[BP]
        push WORD PTR -38[BP]
        call SFSUB
        add  SP,8
        push DX
        push AX
        call SFMUL
        add  SP,8
        push DX
        push AX
        push WORD PTR -32[BP]
        push WORD PTR -34[BP]
        push WORD PTR -40[BP]
        push WORD PTR -42[BP]
        call SFSUB
        add  SP,8
        push DX
        push AX
        push WORD PTR -32[BP]
        push WORD PTR -34[BP]
        push WORD PTR -40[BP]
        push WORD PTR -42[BP]
        call SFSUB
        add  SP,8
        push DX
```

```
        push AX
        call SFMUL
        add  SP,8
        push DX
        push AX
        call SFADD
        add  SP,8
        push DX
        push AX
        call SFCMP
        add  SP,8
        cmp  AX,0
        jge  .041F
.0417:                  ;59
        mov  AX,2
        mov  -18[BP],AX
        jmp  SHORT .0426
.041F:                  ;60
        mov  AX,0
        mov  SP,BP
        pop  BP
        ret
.0426:                  ;61
        push WORD PTR -32[BP]
        push WORD PTR -34[BP]
        call RSFTSI
        add  SP,4
        add  AX,-16[BP]
        mov  SI,+8[BP]
        mov  [SI],AX
        push WORD PTR -28[BP]
        push WORD PTR -30[BP]
        call RSFTSI
        add  SP,4
        add  AX,-14[BP]
        mov  SI,+10[BP]
        mov  [SI],AX
        mov  AX,-18[BP]
        mov  SP,BP
        pop  BP
        ret
CROSS_ST ENDP @CODE    ENDS
@CODE    SEGMENT  BYTE PUBLIC 'CODE'
        include  epilogue.h
        end
```

```
@BIGMODEL   EQU     0
        include     prologue.h

@CODE       ENDS
@DATAC      SEGMENT
db      84,79,79,32,77,65,78,89,32,82,79,65,68,83,0
@DATAC      ENDS
@CODE       SEGMENT BYTE PUBLIC 'CODE' public      DSP_BLK
@CODE       ENDS
@DATAB      SEGMENT
        extrn       ROADS:word extrn       MIN_DIST:word extrn       XS1_DIST:word extrn       XS2_DIST:word extrn       XS1_ID:word extrn       XS2_ID:word extrn       SEG_DS:word extrn       SEG_PLOT:word extrn       NAV_LINE:word extrn       INTEN:word extrn       BUF_DB:word extrn       ERR_MSG:word extrn       ZOOM_TBL:word extrn       ZOOMF_PL:word extrn       ZOOMF_DB:word @DATAB      ENDS
@CODE       SEGMENT BYTE PUBLIC 'CODE'
@CODE       ENDS
        extrn       DISABLE:near extrn       MOVBLOCK:near extrn       DSP_STRT:near extrn       SPRINTF:near extrn       ENABLE:near

@CODE       SEGMENT BYTE PUBLIC 'CODE'
```

```
DSP_BLK     PROC NEAR
.00:                    ;7
    push BP
    mov  BP,SP
    sub  SP,44
    lea  AX,ROADS
    add  AX,9
    mov  -22[BP],AX
    mov  SI,+4[BP]
    mov  AX,[SI]
    mov  -20[BP],AX
    mov  SI,+4[BP]
    mov  AX,+2[SI]
    mov  -8[BP],AX
    push WORD PTR NAV_LINE
    call DISABLE
    add  SP,2
    mov  SI,+4[BP]
    push WORD PTR +4[SI]
    push WORD PTR SEG_DS
    lea  AX,BUF_DB
    mov  -44[BP],AX
    push AX
    push WORD PTR SEG_PLOT
    mov  SI,+4[BP]
    push WORD PTR +6[SI]
    call MOVBLOCK
    add  SP,10
    mov  AX,-44[BP]
    mov  SI,-44[BP]
    add  AX,[SI]
    mov  -42[BP],AX
    mov  -40[BP],AX
    mov  AX,-40[BP]
    dec  WORD PTR -40[BP]
    mov  SI,-44[BP]
    add  AX,+10[SI]
    mov  -38[BP],AX
    mov  AX,-44[BP]
    mov  SI,-44[BP]
    add  AX,+2[SI]
    mov  -36[BP],AX
    mov  -34[BP],AX
    add  WORD PTR -34[BP],-8
    mov  SI,-44[BP]
    mov  DX,+12[SI]
    shl  DX,1
    shl  DX,1
    shl  DX,1
    add  AX,DX
    mov  -32[BP],AX
    mov  AX,-44[BP]
    mov  SI,-44[BP]
    add  AX,+4[SI]
    mov  -30[BP],AX
    mov  AX,-44[BP]
```

```
        mov   SI,-44[BP]
        add   AX,+6[SI]
        mov   -26[BP],AX
        mov   SI,-44[BP]
        mov   AL,+18[SI]
        and   AX,255
        or    AX,AX
        je    .0BE
        mov   AX,6
        jmp   SHORT .0C1
.0BE:                     ;40
        mov   AX,4
.0C1:                     ;40
        mov   -10[BP],AX
        mov   AX,-44[BP]
        mov   SI,-44[BP]
        add   AX,+8[SI]
        mov   -4[BP],AX
        mov   AX,0
        mov   -6[BP],AX
.0D6:                     ;43
        add   WORD PTR -34[BP],8
        mov   AX,-34[BP]
        cmp   AX,-32[BP]
        jb    ?1
        jmp   .02D6
?1:
        inc   WORD PTR -40[BP]
        lea   SI,INTEN
        mov   DI,-36[BP]
        mov   AL,+3[DI]
        and   AX,63
        add   SI,AX
        mov   AL,[SI]
        and   AX,255
        mov   -12[BP],AX
        je    .010B
        jmp   SHORT .0101D
.010B:                    ;45
        jmp   SHORT .0D6
.010D:                    ;46
        mov   AX,-40[BP]
        cmp   AX,-38[BP]
        jae   .0161
        mov   SI,-40[BP]
        mov   AL,[SI]
        and   AX,255
        or    AX,AX
        je    .0161
        mov   AX,-30[BP]
        push  AX
        mov   BX,14
        mov   SI,-40[BP]
        mov   AL,[SI]
        and   AX,255
        sub   AX,1
```

```
        mul   BX
        pop   SI
        add   SI,AX
        mov   -28[BP],SI
        mov   SI,-28[BP]
        mov   AX,[SI]
        cmp   AX,-20[BP]
        jae   .0149
        jmp   SHORT .015E
.0149:                    ;50
        mov   SI,-28[BP]
        mov   AX,[SI]
        cmp   AX,-20[BP]
        jne   .0161
        mov   SI,-28[BP]
        mov   AX,+2[SI]
        cmp   AX,-8[BP]
        jge   .0161
.015E:                    ;50
        jmp   SHORT .0D6
.0161:                    ;52
        push  WORD PTR -12[BP]
        mov   SI,-34[BP]
        mov   AL,+2[SI]
        and   AX,255
        push  AX
        push  WORD PTR -10[BP]
        mov   SI,-26[BP]
        mov   SI,-34[BP]
        add   AX,+4[SI]
        add   AX,+4[SI]
        push  AX
        call  DSP_START
        add   SP,8
        mov   -18[BP],AX
        or    AX,AX
        jne   .018B
        jmp   SHORT .018E
.018B:                    ;53
        jmp   .0D6
.018E:                    ;55
        mov   AX,32767
        and   AX,-18[BP]
        mov   DX,-6[BP]
        add   DX,AX
        mov   -6[BP],DX
        mov   AX,-4[BP]
        mov   SI,-34[BP]
        add   AX,+6[SI]
        mov   -2[BP],AX
        mov   SI,AX
        mov   AL,[SI]
        cbw
        or    AX,AX
        je    .01B3
        jmp   SHORT .01B5
```

```
.01B3:                     ;56
    jmp   SHORT .01C4
.01B5:                     ;56
    mov   SI,-2[BP]
    add   SI,1
    mov   AL,[SI]
    cbw
    or    AX,AX
    je    .01C4
    jmp   SHORT .01C7
.01C4:                     ;56
    jmp   SHORT .0D6
.01C7:                     ;58
    mov   SI,-34[BP]
    mov   AX,[SI]
    mov   -16[BP],AX
    sub   AX,5
    lea   AX,ROADS
    mov   -24[BP],AX
.01D9:                     ;60
    add   WORD PTR -24[BP],5
    mov   SI,-24[BP]
    mov   AX,[SI]
    mov   -14[BP],AX
    or    AX,AX
    je    .01F6
    mov   AX,-14[BP]
    cmp   AX,-16[BP]
    jne   .0F4
    jmp   SHORT .01F6
.01F4:                     ;62
    jmp   SHORT .01D9
.01F6:                     ;62
    or    AX,AX
    je    .01F
    jmp   SHORT .024A
.01FF:                     ;63
    mov   AX,-24[BP]
    cmp   AX,-22[BP]
    jb    .0219
    lea   AX@SW
    push  AX
    lea   AX,ERR_MSG
    push  AX
    call  SPRINTF
    add   SP,4
    jmp   SHORT .0248
.0219:                     ;66
    mov   AX,-16[BP]
    mov   SI,-24[BP]
    mov   [SI],AX
    mov   SI,-34[BP]
    mov   AL,+3[SI]
    and   AX,255
    and   AX,63
    mov   SI,-24[BP]
```

```
        mov    +2,[SI],AL
        mov    AX,-18[BP]
        mov    SI,-24[BP]
        mov    +3,[SI],AX
        mov    AX,0
        mov    SI,-24[BP]
        add    SI,5
        mov    [SI],AX
.0248:                      ;71
        jmp    SHORT .0275
.024A:                      ;73
        mov    AX,-18[BP]
        and    AX,32767
        mov    SI,-24[BP]
        mov    DX,+3[SI]
        add    DX,AX
        mov    +3[SI],DX
        mov    AX,-18[BP]
        and    AX,-32768
        or     AX,AX
        je     .0275
        mov    AX,-32768
        mov    SI,-24[BP]
        mov    DX,+3[SI]
        or     DX,AX
        mov    +3[SI],DX
.0275:                      ;76
        mov    AX,MIN_DIST
        cmp    AX,XS1_DIST
        ja     .02AD
        mov    SI,-34[BP]
        mov    AX,[SI]
        cmp    AX,XS1_ID
        je     .02A3
        mov    AX,XS1_DIST
        mov    XS2_DIST,AX
        mov    AX,XS1_ID
        mov    XS2_ID,AX
        mov    SI,-34[BP]
        mov    AX,[SI]
        mov    XS1_ID,AX
.02A3:                      ;83
        mov    AX,MIN_DIST
        mov    XS1_DIST,AX
        jmp    SHORT .02D3
.02AD:                      ;85
        mov    SI,-34[BP]
        mov    AX,[SI]
        cmp    AX,XS1_ID
        je     .02D3
        mov    AX,MIN_DIST
        cmp    AX,XS2_DIST
        jae    .02D3
        mov    AX,MIN_DIST
        mov    XS2_DIST,AX
        mov    SI,-34[BP]
```

```
        mov     AX,[SI]
        mov     XS2_ID,AX
.02DB:                          ;89
        jmp     .0D6
.02D6:                          ;89
        push    WORD PTR NAV_LINE
        call    ENABLE
        add     SP,2
        mov     AX,-6[BP]
        mov     SP,BP
        pop     BP
        ret
@CODE   ENDP ?DSP_BLK ENDS
@CODE       SEGMENT   BYTE PUBLIC 'CODE'
        include     epilogue.h
        end @BIGMODEL EQU   0
        include     prologue.h
@CODE       ENDS
@DATAC      SEGMENT
        db      6,0
        db      77,69,78,85,0
        db      84,82,65,75,0
        db      1,0
        db      7,0
@DATAC      ENDS
@CODE       SEGMENT BYTE PUBLIC 'CODE' public      DSP_MAP
@CODE       ENDS
@DATAB      SEGMENT
        extrn       CAR_POS:word extrn       CEN_POS:word extrn       PKEYS:word extrn       CRS:word extrn       STROKE:word extrn       REC_PTRS:word extrn       ROADS:word extrn       LCAR_X:word extrn       LCAR_Y:word extrn       LQEP_X:word extrn       LQEP_Y:word
```

```
        extrn   LMARK_Y:word extrn   CAR_DIST:word extrn   XS1_DIST:word extrn   XS2_DIST:word extrn   X_LEFT:word extrn   X_RIGHT:word extrn   Y_BOT:word extrn   Y_TOP:word extrn   BX_LEFT:word extrn   BX_RIGHT:word extrn   BX_BOT:word extrn   BX_TOP:word extrn   HOME:word extrn   NAV_MAP:word extrn   ON_STRT:word extrn   ZOOMF_PL:word extrn   DSP_QEP:word extrn   DSP_MSG:word extrn   ERR_MSG:word extrn   TAPE_MSG:word

@DATAB   ENDS
@CODE    SEGMENT   BYTE PUBLIC 'CODE'
@CODE    ENDS extrn   SET_ZOOM:near extrn   CAL_CNTR:near extrn   ISIN:near extrn   ICOS:near extrn   NAME:near extrn   DSP_KEY:near
```

```
        extrn     RT_VECTR:near extrn     BOX_CLIP:near extrn     ZM_NODE:near extrn     VCAL:near extrn     MIN2:near extrn     MAX2:near extrn     SRT_BLKS:near extrn     LB_MAP:near

@CODE     SEGMENT   BYTE PUBLIC 'CODE'

DSP_MAP   PROC NEAR
@CODE     ENDS
        extrn     $LRSSHIFT:near extrn     $ISWITCH:near @CODE     SEGMENT BYTE PUBLIC 'CODE'
.00:                ;6
        push BP
        mov  BP,SP
        sub  SP,46
        push WORD PTR ZOOMF_PL
        call SET_ZOOM
        add  SP,2
        call CAL_CNTR
        mov  AX,16384
        sub  AX,CEN_POS+4
        push AX
        call ISIN
        add  SP,2
        mov  CRS+2,AX
        mov  STROKE+2,AX
        mov  AX,16384
        sub  AX,CEN_POS+4
        push AX
        call ICOS
        add  SP,2
        mov  CRS+4,AX
        mov  STROKE+4,AX
        mov  AX,6
        push AX
        lea  AX,@SW
        push AX
        mov  AX,150
        push AX
        mov  AL,-23
```

```
        push AX
        call DSP_NAME
        add  SP,8
        mov  AX,NAV_MAP
        or   AX,AX
        je   .0BA
        mov  AX,PKEYS
        add  AX,18
        push AX
        mov  AX,7
        push AX
        mov  AL,0
        push AX
        lea  AX,@SW+2
        push AX
        mov  AX,25
        push AX
        mov  AX,-249
        push AX
        call DSP_KEY
        add  SP,12
        mov  AX,HOME
        or   AX,AX
        je   .089
        jmp  SHORT .0AC
.089:                       ;34
        mov  AX,PKEYS
        add  AX,24
        push AX
        mov  AX,7
        push AX
        mov  AL,0
        push AX
        mov  AL,0
        push AX
        lea  AX,@SW+7
        push AX
        mov  AX,-35
        push AX
        mov  AL,7
        push AX
        call DSP_KEY
        add  SP,12
        jmp  SHORT .0B8
.0AC:                       ;37
        mov  AX,0
        mov  SI,PKEYS
        add  SI,24
        mov  [SI],AX
.0B8:                       ;38
        jmp  SHORT .0D2
.0BA:                       ;40
        mov  AX,0
        mov  SI,PKEYS
        add  SI,18
        mov  [SI],AX
```

```
        mov   AX,0
        mov   SI,PKEYS
        add   SI,24
        mov   [SI],AX
.0D2:                          ;43
        lea   SI,-32[BP]
        push  SI
        lea   SI,-34[BP]
        push  SI
        lea   SI,CRS
        push  SI
        mov   AX,LCAR_Y
        mov   DX,LCAR_Y+2
        push  DX
        push  AX
        mov   AX,ZOOMF_DB
        cwd
        push  DX
        push  AX
        call  $LRSSHIFT
        pop   AX
        pop   DX
        sub   AX,CEN_POS+2
        push  AX
        mov   AX,LCAR_X
        mov   DX,LCAR_X+2
        push  DX
        push  AX
        mov   AX,ZOOMF_DB
        cwd
        push  DX
        push  AX
        call  $LRSSHIFT
        pop   AX
        pop   DX
        sub   AX,CEN_POS
        push  AX
        call  RT_VECTR
        add   SP,10
        mov   AX,0
        mov   XS2_DIST,AX
        mov   XS1_DIST,AX
        mov   CAR_DIST,AX
        mov   -36[BP],AX
        mov   -38[BP],AX
        lea   SI,-44[BP]
        push  SI
        lea   SI,-32[BP]
        push  SI
        lea   SI,-34[BP]
        push  SI
        lea   SI,-36[BP]
        push  SI
        lea   SI,-38[BP]
        push  SI
        call  BOX_CLIP
```

```
        add   SP,10
        cmp   AX,4
        jne   .01C1
        mov   AX,HOME
        or    AX,AX
        je    .0178
        mov   AX,ON_STRT
        or    AX,AX
        je    .0178
        mov   AX,-32[BP]
        sub   AX,Y_BOT
        sub   AX,5
        mov   CAR_DIST,AX
        mov   AX,-1
        mov   XS2_DIST,AX
        mov   XS1_DIST,AX
.0178:                      ;53
        mov   AX,CAR_POS+4
        sub   AX,CEN_POS+4
        push  AX
        call  ISIN
        add   SP,2
        mov   STROKE+2,AX
        mov   AX,CAR_POS+4
        sub   AX,CEN_POS+4
        push  AX
        call  ICOS
        add   SP,2
        mov   STROKE+4,AX
        lea   SI,-32[BP]
        push  SI
        lea   SI,-34[BP]
        push  SI
        call  ZM_NODE
        add   SP,4
        mov   AX,3
        push  AX
        lea   AX,@SW+12
        push  AX
        push  WORD PTR -32[BP]
        push  WORD PTR -34[BP]
        call  DSP_NAME
        add   SP,8
.01C1                       ;59
        mov   AX,DSP_QEP
        or    AX,AX
        jne   ?1
        jmp   .044B
?1:
        lea   SI,-44[BP]
        push  SI
        mov   AX,7
        push  AX
        mov   AL,0
        push  AX
        lea   AX,DSP_MSG
```

```
        push AX
        mov  AX,175
        push AX
        mov  AX,-255
        push AX
        call DSP_KEY
        add  SP,12
        lea  SI,-44[BP]
        push SI
        mov  AX,7
        push AX
        mov  AL,0
        push AX
        lea  AX,ERR_MSG
        push AX
        mov  AX,151
        push AX
        mov  AX,-191
        push AX
        call DSP_KEY
        add  SP,12
        lea  SI,-44[BP]
        push SI
        mov  AX,7
        push AX
        mov  AL,0
        push AX
        lea  AX,TAPE_MSG
        push SI
        lea  SI,-36[BP]
        push SI
        lea  SI,-38[BP]
        push SI
        call BOX_CLIP
        add  SP,10
        cmp  AX,4
        jne  .02C1
        lea  SI,-32[BP]
        push SI
        lea  SI,-34[BP]
        push SI
        call ZM_NODE
        add  SP,4
        lea  SI,-44[BP]
        push SI
        mov  AX,3
        push AX
        mov  AL,1
        push AX
        lea  AX,@SW+14
        push AX
        push WORD PTR -32[BP]
        push WORD PTR -34[BP]
        call DSP_KEY
        add  SP,12
```

```
.02C1:                       ;80
    lea  SI,-10[BP]
    push SI
    lea  SI,-12[BP]
    push SI
    lea  SI,CRS
    push SI
    lea  SI,LQEP_Y
    mov  AX,[SI]
    mov  DX,+2[SI]
    push DX
    push AX
    mov  AX,ZOOMF_DB
    cwd
    push DX
    push AX
    call $LRSSHIFT
    pop  AX
    pop  DX
    sub  AX,CEN_POS+2
    push AX
    lea  SI,LQEP_X
    push AX
    mov  AX,127
    push AX
    mov  AX,-191
    push AX
    call DSP_KEY
    add  SP,12
    lea  SI,-32[BP]
    push SI
    lea  SI,034[BP]
    push SI
    lea  SI,CRS
    push SI
    mov  AX,LMARK_Y
    mov  DX,LMARK_Y+2
    push DX
    push AX
    mov  AX,ZOOMF_DB
    cwd
    push DX
    push AX
    call $LRSSHIFT
    pop  AX
    pop  DX
    sub  AX,CEN_POS+2
    push AX
    mov  AX,LMARK_X
    mov  DX,LMARK_X+2
    push DX
    push AX
    mov  AX,ZOOMF_DB
    cwd
    push DX
    push AX
```

```
call $LRSSHIFT
pop  AX
pop  DX
sub  AX,CEN_POS
push AX
call RT_VECTR
add  SP,10
mov  AX,0
mov  -36[BP],AX
mov  -38[BP],AX
lea  SI,-44[BP]
push SI
lea  SI,-32[BP]
push SI
lea  SI,-34[BP]
mov  AX,[SI]
mov  DX,+2[SI]
push DX
push AX
mov  AX,ZOOMF_DB
cwd
push DX
push AX
call $LRSSHIFT
pop  AX
pop  DX
sub  AX,CEN_POS
push AX
call RT_VECTR
add  SP,10
mov  AX,-12[BP]
mov  -38[BP],AX
mov  AX,-10[BP]
mov  -36[BP],AX
mov  AX,0
mov  -32[BP],AX
mov  -34[BP],AX
lea  SI,-44[BP]
push SI
lea  SI,-32[BP]
push SI
lea  SI,-34[BP]
push SI
lea  SI,-36[BP]
push SI
lea  SI,-38[BP]
push SI
call BOX_CLIP
add  SP,10
cmp  AX,4
jne  .0350
mov  AX,4
push AX
push WORD PTR -10[BP]
push WORD PTR -12[BP]
call VCAL
add  SP,6
```

```
.0350:                    ;88
      mov   AX,1
      mov   -2[BP],AX
.0356:                    ;88
      cmp   WORD PTR -2[BP],5
      jl    ?2
      jmp   .044B
?2:
      mov   AX,4
      push  AX
      mov   AX,-2[BP]
      pop   BX
      cwd
      idiv  BX
      mov   -4[BP],DX
      lea   SI,-6[BP]
      push  SI
      lea   SI,-8[BP]
      push  SI
      lea   SI,CRS
      push  SI
      lea   SI,LQEP_Y
      mov   AX,-4[BP]
      shl   AX,1
      shl   AX,1
      add   SI,AX
      mov   AX,[SI]
      mov   DX,+2[SI]
      push  DX
      push  AX
      mov   AX,ZOOMF_DB
      cwd
      push  DX
      push  AX
      call  $LRSSHIFT
      pop   AX
      pop   DX
      sub   AX,CEN_POS+2
      push  AX
      lea   SI,LQEP_X
      mov   AX,-4[BP]
      shl   AX,1
      shl   AX,1
      add   SI,AX
      mov   AX,[SI]
      mov   DX,+2[SI]
      push  DX
      push  AX
      mov   AX,ZOOMF_DB
      cwd
      push  DX
      push  AX
      call  $LRSSHIFT
      pop   AX
      pop   DX
      sub   AX,CEN_POS
```

```
        push  AX
        call  RT_VECTR
        add   SP,10
        mov   AX,-12[BP]
        mov   -38[BP],AX
        mov   AX,-10[BP]
        mov   -36[BP],AX
        mov   AX,-8[BP]
        mov   -34[BP],AX
        mov   AX,-6[BP]
        mov   -32[BP],AX
        lea   SI,-44[BP]
        push  SI
        lea   SI,-32[BP]
        push  SI
        lea   SI,-34[BP]
        push  SI
        lea   SI,-36[BP]
        push  SI
        lea   SI,-38[BP]
        push  SI
        call  BOX_CLIP
        add   SP,10
        push  AX
        jmp   SHORT .0422
.0400:                      ;101
        mov   AX,4
        push  AX
        push  WORD PTR -36[BP]
        push  WORD PTR -38[BP]
        call  VCAL
        add   SP,6
        jmp   SHORT .0439
.0422:                      ;107
        call  $ISWITCH
        dw    4
        dw    4
        dw    3
        dw    2
        dw    1
        dw    .0439
        dw    .0410
        dw    .0410
        dw    .0400
        dw    .0400
.0439:                      ;107
        mov   AX,-8[BP]
        mov   -12[BP],AX
        mov   AX,-6[BP]
        mov   -10[BP],AX
.0445:                      ;110
        inc   WORD PTR -2[BP]
        jmp   .0356
.044B:                      ;113
        mov   AX,CRS+2
        neg   AX
```

```
        mov    STROKE+2,AX
        mov    AX,CRS+4
        mov    STROKE+4,AX
        lea    SI,-36[B§P]
        push   SI
        lea    SI,-38[BP]
        push   SI
        lea    SI,STROKE
        push   SI
        push   WORD PTR Y_TOP
        push   WORD PTR X_RIGHT
        call   RT_VECTR
        add    SP,10
        lea    SI,-32[BP]
        push   SI
        lea    SI,-34[BP]
        push   SI
        lea    SI,STROKE
        push   SI
        push   WORD PTR Y_TOP
        push   WORD PTR X_LEFT
        call   RT_VECTR
        add    SP,10
        lea    SI,-28[BP]
        push   SI
        lea    SI,-30[BP]
        push   SI
        lea    SI,STROKE
        push   SI
        push   WORD PTR Y_BOT
        push   WORD PTR X_LEFT
        call   RT_VECTR
        add    SP,10
        lea    SI,-24[BP]
        push   SI
        lea    SI,-26[BP]
        push   SI
        lea    SI,STROKE
        push   SI
        push   WORD PTR Y_BOT
        push   WORD PTR X_RIGHT
        call   RT_VECTR
        add    SP,10
        push   WORD PTR -26[BP]
        push   WORD PTR -30[BP]
        call   MIN2
        add    SP,4
        push   AX
        push   WORD PTR -34[BP]
        push   WORD PTR -38[BP]
        call   MIN2
        add    SP,4
        push   AX
        call   MIN2
        add    SP,4
        push   AX
```

```
        call MIN2
        add  SP,4
        mov  BX_LEFT,AX
        push WORD PTR -26[BP]
        push WORD PTR -30[BP]
        call MAX2
        add  SP,4
        push AX
        push WORD PTR -34[BP]
        push WORD PTR -38[BP]
        call MAX2
        add  SP,4
        push AX
        call MAX2
        add  SP,4
        mov  BX_RIGHT,AX
        push WORD PTR -24[BP]
        push WORD PTR -28[BP]
        call MIN2
        add  SP,4
        push AX
        push WORD PTR -32[BP]
        push WORD PTR -36[BP]
        call MIN2
        add  SP,4
        push AX
        call MIN2
        add  SP,4
        mov  BX_BOT,AX
        push WORD PTR -24[BP]
        push WORD PTR -28[BP]
        call MAX2
        add  SP,4
        push AX
        push WORD PTR -32[BP]
        push WORD PTR -36[BP]
        call MAX2
        add  SP,4
        push AX
        call MAX2
        add  SP,4
        mov  BX_TOP,AX
        push WORD PTR +4[BP]
        call SRT_BLKS
        add  SP,2
        mov  AX,-1
        lea  SI,ROADS
        mov  +2[SI],AL
        mov  AX,0
        lea  SI,ROADS
        mov  [SI],AX
        mov  AX,0
        mov  -20[BP],AX
        lea  AX,REC_PTRS
        mov  -14[BP],AX
        mov  -16[BP],AX
```

```
.0585:                    ;128
    mov   SI,-16[BP]
    add   WORD PTR -16[BP],2
    mov   AX,[SI]
    mov   -46[BP],AX
    or    AX,AX
    je    .05BB
    push  WORD PTR -46[BP]
    call  DSP_BLK
    add   SP,2
    mov   -18[BP],AX
    or    AX,AX
    je    .05B9
    mov   AX,-18[BP]
    add   -20[BP],AX
    mov   AX,-46[BP]
    mov   SI,-14[BP]
    add   WORD PTR -14[BP],2
    mov   [SI],AX
.05B9:                    ;133
    jmp   SHORT .0585
.05BB:                    ;133
    mov   AX,0
    mov   SI,-14[BP]
    mov   [SI],AX
    call  LB_MAP
    mov   AX,128
    push  AX
    mov   AL,0
    push  AX
    push  AX
    call  VCAL
    add   SP,6
    mov   AX,-20[BP]
    mov   SP,BP
    pop   BP
    ret
DSP_MAP   ENDP @CODE     ENDS
@CODE     SEGMENT   BYTE PUBLIC 'CODE'
    include   epilogue.h
    end
@BIGMODEL EQU   0
    include   prologue.h public    DSP_NAME
@CODE     ENDS
@DATAB    SEGMENT
    extrn     PCHR_SET:word extrn     STRK_SET:word extrn     STROKE:word extrn     COL_GRID:word
```

```
        extrn       BEAM_X:word extrn       BEAM_Y:word extrn       RESET_CT:word
@DATAB      ENDS
@CODE       SEGMENT     BYTE PUBLIC 'CODE'
@CODE       ENDS
        extrn       SET_PIN:far extrn       CHAR_MNX:far extrn       VCAL:far extrn       RT_VECTR:far extrn       V_STUFF:far extrn       CLR_PIN:far

@CODE       SEGMENT     BYTE PUBLIC 'CODE'

DSP_NAME    PROC NEAR
@CODE       ENDS
        extrn       $LRUSHIFT:near extrn       $LLSHIFT:near @CODE       SEGMENT     BYTE PUBLIC 'CODE'
.00:                    ;7
    push BP
    mov  BP,SP
    sub  SP,32
    mov  AX,9
    push AX
    call SET_PIN
    add  SP,2
    lea  SI,-12[BP]
    push SI
    lea  SI,-14[BP]
    push SI
    call CHAR_MNX
    add  SP,4
    add  WORD PTR -14[BP],254
    add  WORD PTR -12[BP],254
    mov  AX,STRK_SET
    add  AX,40
    mov  -30[BP],AX
.032:                   ;27
    mov  SI,-30[BP]
    mov  AX,[SI]
    cmp  AX,-1
    je   .04B
    mov  AX,0
    mov  SI,-30[BP]
```

```
        add     WORD PTR -30[BP],10
        mov     [SI],AX
        jmp     SHORT .032
.04B:                           ;28
        mov     AX,0
        mov     DX,-16384
        push    DX
        push    AX
        mov     AX,-14[BP]
        add     AX,+4[BP]
        and     AX,-16
        mov     -10[BP],AX
        mov     DX,4
        mov     CX,DX
        sar     AX,CL
        xor     DX,DX
        push    DX
        push    AX
        call    $LRUSHIFT
        pop     AX
        pop     DX
        mov     -28[BP],AX
        mov     -26[BP],DX
        mov     AX,16
        push    AX
        mov     AL,0
        push    AX
        push    AX
        call    VCAL
        add     SP,6
        mov     AX,-12
        mov     -16[BP],AX
.089:                           ;33
        mov     SI,+8[BP]
        inc     WORD PTR +8[BP]
        mov     AL,[SI]
        and     AX,255
        mov     -2[BP],AX
        or      AX,AX
        jne     ?1
        jmp     .0254
?1:
        lea     SI,-18[BP]
        push    SI
        lea     SI,-20[BP]
        push    SI
        lea     SI,STROKE
        push    SI
        mov     AX,0
        push    AX
        mov     AL,12
        mov     DX,-16[BP]
        add     DX,AX
        mov     -16[BP],DX
        push    DX
        call    RT_VECTR
        add     SP,10
```

```
        mov     AX,-18[BP]
        add     AX,+6[BP]
        mov     -22[BP],AX
        sub     AX,BEAM_Y
        push    AX
        mov     AX,-20[BP]
        add     AX,+4[BP]
        mov     -24[BP],AX
        sub     AX,BEAM_X
        push    AX
        mov     AX,4
        push    AX
        call    V_STUFF
        add     SP,6
        mov     AX,-14[BP]
        add     AX,-24[BP]
        and     AX,-16
        sub     AX,-10[BP]
        mov     -8[BP],AX
        cmp     AX,0
        jle     .011D
        mov     AX,1
        mov     DX,0
        mov     BX,-28[BP]
        mov     CX,-26[BP]
        push    CX
        push    BX
        push    DX
        push    AX
        call    $LRUSHIFT
        pop     AX
        pop     DX
        mov     -28[BP],AX
        mov     -26[BP],DX
        add     WORD PTR -10[BP],16
        jmp     SHORT .0144
.011D:                          ;41
        cmp     WORD PTR -8[BP],0
        jge     .0144
        mov     AX,1
        mov     DX,0
        mov     BX,-28[BP]
        mov     CX,-26[BP]
        push    CX
        push    BX
        push    DX
        push    AX
        call    $LLSHIFT
        pop     AX
        pop     DX
        mov     -28[BP],AX
        mov     -26[BP],DX
        sub     WORD PTR -10[BP],16
.0144:                          ;45
        mov     AX,-28[BP]
        mov     DX,-26[BP]
```

```
        lea     SI,COL_GRID
        mov     BX,-12[BP]
        add     BX,-22[BP]
        mov     CX,4
        sar     BX,CL
        mov     -6[BP],BX
        shl     BX,1
        shl     BX,1
        add     SI,BX
        mov     BX,[SI]
        mov     CX,+2[SI]
        or      BX,AX
        or      CX,DX
        mov     [SI],BX
        mov     +2[SI],CX
        mov     AX,-28[BP]
        mov     DX,-26[BP]
        lea     SI,COL_GRID
        mov     BX,-6[BP]
        add     BX,1
        shl     BX,1
        shl     BX,1
        add     SI,BX
        mov     BX,[SI]
        mov     CX,+2[SI]
        or      BX,AX
        or      CX,DX
        mov     [SI],BX
        mov     +2[SI],CX
        mov     SI,offset PCHR_SET
        mov     AX,-2[BP]
        shl     AX,1
        add     SI,AX
        mov     SI,[SI]
        mov     -32[BP],SI
.01A4:                          ;48
        mov     SI,-32[BP]
        mov     AX,[SI]
        mov     -4[BP],AX
        cmp     AX,0
        jge     ?2
        jmp     .0251
?2:
        mov     SI,-32[BP]
        mov     SI,+2[SI]
        mov     -30[BP],SI
        mov     SI,-30[BP]
        mov     AX,[SI]
        or      AX,AX
        je      .01C8
        jmp     SHORT .1F5
.01C8:                          ;50
        mov     AX,-30[BP]
        add     AX,4
        push    AX
        mov     AX,-30[BP]
```

```
        add   AX,2
        push  AX
        lea   SI,STROKE
        push  SI
        mov   SI,-30[BP]
        push  WORD PTR +8[SI]
        mov   SI,-30[BP]
        push  WORD PTR +6[SI]
        call  RT_VECTR
        add   SP,10
        mov   AX,1
        mov   SI,-30[BP]
        mov   [SI],AX
.01F5:                      ;55
        mov   AX,-4[BP]
        or    AX,AX
        je    .0223
        mov   SI,-30[BP]
        mov   AX,+4[SI]
        add   AX,-22[BP]
        sub   AX,BEAM_Y
        push  AX
        mov   SI,-30[BP]
        mov   AX,+2[SI]
        add   AX,-24[BP]
        sub   AX,BEAM_X
        push  AX
        push  WORD PTR +10[BP]
        call  V_STUFF
        add   SP,6
        jmp   SHORT .0249
.0223:                      ;58
        mov   SI,-30[BP]
        mov   AX,+4[SI]
        add   AX,-22[BP]
        sub   AX,BEAM_Y
        push  AX
        mov   SI,-30[BP]
        mov   AX,+2[SI]
        add   AX,-24[BP]
        sub   AX,BEAM_X
        push  AX
        mov   AX,4
        push  AX
        call  V_STUFF
        add   SP,6
.0249:                      ;60
        add   WORD PTR -32[BP],4
        jmp   .01A4
.0251:                      ;62
        jmp   .089
.0254:                      ;63
        mov   AX,513
        mov   RESET_CT,AX
        mov   AX,9
        push  AX
```

```
        call    CLR_PIN
        add     SP,2
        mov     SP,BP
        pop     BP
        ret
DSP_NAME    ENDP @CODE       ENDS
@CODE       SEGMENT BYTE PUBLIC 'CODE'
        include epilogue.h
        end
@BIGMODEL EQU  0
        include prologue.h public  DSP_STRT
@CODE       ENDS
@DATAB      SEGMENT
        extrn   CEN_POS:word extrn   CRS:word extrn   CAR_DIST:word extrn   MIN_DIST:word extrn   BX_LEFT:word extrn   BX_RIGHT:word extrn   BX_BOT:word extrn   BX_TOP:word extrn   CEN_OFF:word @DATAB      ENDS
@CODE       SEGMENT BYTE PUBLIC 'CODE'
@CODE       ENDS
        extrn   RT_VECTR:near extrn   BOX_CLIP:near extrn   VCAL:near extrn   MAX2:near extrn   MIN2:near

@CODE       SEGMENT BYTE PUBLIC 'CODE'

DSP_STRT    PROC NEAR
.00:                    ;7
        push    BP
        mov     BP,SP
        sub     SP,32
```

```
        mov     AX,-1
        mov     MIN_DIST,AX
        mov     AX,0
        mov     -2[BP],AX
        mov     -22[BP],AX
        lea     SI,-18[BP]
        push    SI
        lea     SI,-20[BP]
        lea     SI,CRS
        push    SI
        mov     SI,+4[BP]
        mov     AX,+2[SI]
        sub     AX,CEN_POS+2
        mov     -28[BP],AX
        push    AX
        mov     SI,+4[BP]
        mov     AX,[SI]
        sub     AX,CEN_POS
        mov     -30[BP],AX
        push    AX
        call    RT_NODE
        add     SP,10
        mov     AX,-20[BP]
        mov     -12[BP],AX
        mov     AX,-18[BP]
        mov     -10[BP],AX
        mov     AX,0
        mov     -6[BP],AX
        mov     -8[BP],AX
        lea     SI,-32[BP]
        push    SI
        lea     SI,-6[BP]
        push    SI
        lea     SI,-8[BP]
        push    SI
        lea     SI,-10[BP]
        push    SI
        lea     SI,-12[BP]
        push    SI
        call    BOX_CLIP
        add     SP,10
        cmp     AX,4
        jne     .099
        mov     AX,4
        push    AX
        push    WORD PTR -10[BP]
        push    WORD PTR -14[BP]
        call    VCAL
        add     SP,6
        mov     AX,CEN_OFF
        neg     AX
        cmp     AX,-10[BP]
        jge     .099
        mov     AX,-32768
        mov     -2[BP],AX
.099:                           ;32
```

```
        dec   WORD PTR +8[BP]
        mov   AX,+8[BP]
        or    AX,AX
        jne   ?1
        jmp   .0219
?1:
        mov   AX,+4[BP]
        add   AX,+6[BP]
        mov   +4[BP],AX
        mov   SI,+4[BP]
        mov   AX,[SI]
        sub   AX,CEN_POS
        mov   -26[BP],AX
        mov   SI,+4[BP]
        mov   AX,+2[SI]
        sub   AX,CEN_POS+2
        mov   -24[BP],AX
        push  WORD PTR -26[BP]
        push  WORD PTR -30[BP]
        call  MAX2
        add   SP,4
        cmp   AX,BX_LEFT
        jge   .0DC
        jmp   SHORT .0EE
.0DC:                       ;37
        push  WORD PTR -26[BP]
        push  WORD PTR -30[BP]
        call  MIN2
        add   SP,4
        cmp   AX,BX_RIGHT
        jle   .0F0
.0EE:                       ;37
        jmp   SHORT .0102
.0F0:                       ;37
        push  WORD PTR -24[BP]
        push  WORD PTR -28[BP]
        call  MAX2
        add   SP,4
        cmp   AX,BX_BOT
        jge   .0104
.0102:                      ;37
        jmp   SHORT .0116
.0104:                      ;37
        push  WORD PTR -24[BP]
        push  WORD PTR -28[BP]
        call  MIN2
        add   SP,4
        cmp   AX,BX_TOP
        jle   .011F
.0116:                      ;37
        mov   AX,1
        mov   -22[BP],AX
        jmp   .020A
.011F:                      ;39
        mov   AX,-22[BP]
        or    AX,AX
        je    .0145
```

```
        lea   SI,-18[BP]
        push  SI
        lea   SI,CRS
        push  SI
        push  WORD PTR -28[BP]
        push  WORD PTR -30[BP]
        call  RT_NODE
        add   SP,10
        mov   AX,0
        mov   -22[BP],AX
.0145:                      ;44
        lea   SI,-14[BP]
        push  SI
        lea   SI,-16[BP]
        push  SI
        lea   SI,CRS
        push  SI
        push  WORD PTR -24[BP]
        push  WORD PTR -26[BP]
        call  VECTR
        add   SP,10
        mov   AX,-20[BP]
        mov   -12[BP],AX
        mov   AX,-18[BP]
        mov   -10[BP],AX
        mov   AX,-16[BP]
        mov   -8[BP],AX
        mov   AX,-14[BP]
        mov   -6[BP],AX
        lea   SI,-32[BP]
        push  SI
        lea   SI,-6[BP]
        push  SI
        lea   SI,-8[BP]
        push  SI
        lea   SI,-10[BP]
        push  SI
        lea   SI,-12[BP]
        push  SI
        call  BOX_CLIP
        add   SP,10
        mov   -4[BP],AX
        or    AX,AX
        je    .01FE
        cmp   WORD PTR -4[BP],2
        jg    .01BE
        mov   AX,4
        push  AX
        push  WORD PTR -10[BP]
        push  WORD PTR -12[BP]
        call  VCAL
        add   SP,6
        mov   AX,CEN_OFF
        neg   AX
        cmp   AX,-10[BP]
        jge   .01BE
        or    WORD PTR -2[BP],-32768
```

```
.01BE:                        ;56
    push WORD PTR +10[BP]
    push WORD PTR -6[BP]
    push WORD PTR -8[BP]
    call VCAL
    add  SP,6
    mov  DX,-2[BP]
    add  AX
    mov  -2[BP],DX
    mov  AX,CEN_OFF
    neg  AX
    cmp  AX,-6[BP]
    jge  .01E5
    or   WORD PTR -2[BP],-32768
.01E5:                        ;58
    mov  AX,-32[BP]
    cmp  AX,CAR_DIST
    jbe  .01FE
    mov  AX,-32[BP]
    cmp  AX,MIN_DIST
    jae  .01FE
    mov  AX,-32[BP]
    mov  MIN_DIST,AX
.01FE:                        ;61
    mov  AX,-16[BP]
    mov  -20[BP],AX
    mov  AX,-14[BP]
    mov  -18[BP],AX
.020A:                        ;63
    mov  AX,-26[BP]
    mov  -30[BP],AX
    mov  AX,-24[BP]
    mov  -28[BP],AX
    jmp  .099
.0219:                        ;66
    mov  AX,-2[BP]
    mov  SP,BP
    pop  BP
    ret
DSP_STRT    ENDP @CODE       ENDS
@CODE       SEGMENT    BYTE PUBLIC 'CODE'
    include  epilogue.h
    end
@BIGMODEL EQU  0
    include  prologue.h public   GET_POS
@CODE       ENDS
@DATAB      SEGMENT
    extrn        DRPX:word extrn        DRPY:word extrn        PSEGUPDT:word
```

```
        extrn       CAR_POS:word
        extrn       LCAR_X:word
        extrn       LCAR_Y:word
        extrn       IQEPX:word
        extrn       IQEPY:word
        extrn       LQEP_X:word
        extrn       LQEP_Y:word
        extrn       MXDEVDIR:word
        extrn       ICOURSE:word
        extrn       ST_WIDTH:word
        extrn       ON_STRT:word
        extrn       NAV_LINE:word
        extrn       PNAV_MSG:word
        extrn       DSP_MSG:word
@DATAB    ENDS
@CODE     SEGMENT    BYTE PUBLIC 'CODE'
@CODE     ENDS
        extrn       CK_VARS:near
        extrn       DISABLE:near
        extrn       SET_PIN:near
        extrn       IATAN2:near
        extrn       IMUL:near
        extrn       PRIORITY
        extrn       CLR_PIN:near
        extrn       ENABLE:near
        extrn       ISMUL:near
        extrn       ISIN:near
        extrn       ICOS:near
@CODE     SEGMENT    BYTE PUBLIC 'CODE'
```

```
?GET_POS  PROC NEAR
@CODE     ENDS
     extrn      $LRSSHIFT:near

@CODE     SEGMENT    BYTE PUBLIC 'CODE'
.00:                 ;5
     push BP
     mov  BP,SP
     sub  SP,6
     call CK_VARS
     push WORD PTR NAV_LINE
     call far ptr DISABLE
     add  SP,2
     mov  AX,3
     push AX
     call SET_PIN
     add  SP,2
     mov  AX,DRPX+2
     mov  DX,DRPX+4
     mov  LCAR_X,AX
     mov  LCAR_X+2,DX
     mov  AX,DRPY+2
     mov  DX,DRPY+4
     mov  LCAR_Y,AX
     mov  LCAR_Y+2,DX
     mov  AX,ICOURSE
     mov  CAR_POS+4,AX
     mov  AX,0
     mov  ON_STRT,AX
     mov  AX,PSEGUPDT
     or   AX,AX
     jne  ?1
     jmp  .0123
?1:
     mov  SI,PSEGUPDT
     mov  AX,+4[SI]
     mov  SI,PSEGUPDT
     sub  AX,[SI]
     push AX
     mov  SI,PSEGUPDT
     mov  AX,+6[SI]
     mov  SI,PSEGUPDT
     sub  AX,+2[SI]
     push AX
     call IATAN2
     add  SP,4
     mov  -6[BP],AX
     mov  -4[BP],AX
     mov  AX,-6[BP]
     sub  AX,CAR_POS+4
     xor  DX,DX
     cmp  DX,0
     jb   09E
     jne  .096
     cmp  AX,-32768
     jbe  .09E
```

```
.096:                     ;34
     mov   AX,-4[BP]
     neg   AX
     mov   -4[BP],AX
.09E:                     ;36
     mov   AX,-4[BP]
     cmp   AX,MXDEVDIR
     jae   .0CE
     mov   SI,PSEGUPDT
     mov   AL,+8[SI]
     cbw
     push  AX
     call  PRIORITY
     add   SP,2
     mov   ST_WIDTH,AX
     mov   AX,-6[BP]
     mov   CAR_POS+4,AX
     mov   SI,PSEGUPDT
     mov   AX,+9[SI]
     mov   ON_STRT,AX
     jmp   SHORT .0123
.0CE:                     ;41
     mov   AX,-4[BP]
     xor   DX,DX
     push  DX
     push  AX
     mov   AX,-32768
     mov   DX,0
     push  DX
     push  AX
     mov   AX,MXDEVDIR
     xor   DX,DX
     pop   BX
     pop   CX
     sub   BX,AX
     sbb   CX,DX
     pop   AX
     pop   DX
     cmp   CX,DX
     ja    .0123
     jne   .0F5
     cmp   BX,AX
     jae   .0123
.0F5:                     ;41
     mov   SI,PSEGUPDT
     mov   AL,+8[SI]
     cbw
     push  AX
     call  PRIORITY
     add   SP,2
     mov   ST_WIDTH,AX
     mov   AX,-6[BP]
     xor   DX,DX
     add   AX,-32768
     adc   DX,0
```

```
        mov  CAR_POS+4,AX
        mov  SI,PSEGUPDT
        mov  AX,+9[SI]
        mov  ON_STRT,AX
.0123:                    ;48
        mov  AX,0
        mov  -2[BP],AX
.0129:                    ;48
        cmp  WORD PTR -2[BP],4
        jl   ?2
        jmp  .01AF
?2:
        lea  SI,IQEPX
        mov  AX,-2[BP]
        shl  AX,1
        shl  AX,1
        add  SI,AX
        mov  AX,[SI]
        mov  DX,+2[SI]
        push DX
        push AX
        mov  AX,16
        mov  DX,0
        push DX
        push AX
        call $LRSSHIFT
        pop  AX
        pop  DX
        add  AX,LCAR_X
        adc  DX,LCAR_X+2
        lea  SI,LQEP_X
        mov  BX,-2[BP]
        shl  BX,1
        shl  BX,1
        add  SI,BX
        mov  [SI],AX
        mov  +2[SI],DX
        lea  SI,IQEPY
        mov  AX,-2[BP]
        shl  AX,1
        shl  AX,1
        add  SI,AX
        mov  AX,[SI]
        mov  DX,+2[SI]
        push DX
        push AX
        mov  AX,16
        mov  DX,0
        push DX
        push AX
        call $LRSSHIFT
        pop  AX
        pop  DX
        add  AX,LCAR_Y
        adc  DX,LCAR_Y+2
        lea  SI,LQEP_Y
        mov  BX,-2[BP]
```

```
        shl   BX,1
        shl   BX,1
        add   SI,BX
        mov   [SI],AX
        mov   +2[SI],DX
.01A9:                    ;51
        inc   WORD PTR -2[BP]
        jmp   .0129
.01AF:                    ;51
        mov   AX,0
        mov   -2[BP],AX
.01B5:                    ;53
        cmp   WORD PTR -2[BP],35
        jge   .01DD
        lea   SI,PNAV_MSG
        add   SI,-2[BP]
        mov   AL,[SI]
        cbw
        lea   SI,DSP_MSG
        add   SI,-2[BP]
        mov   [SI],AL
        cbw
        or    AX,AX
        je    .01D6
        jmp   SHORT .01D8
.01D6:                    ;54
        jmp   SHORT .01DD
.01D8:                    ;55
        inc   WORD PTR -2[BP]
        jmp   SHORT .01B5
.01DD:                    ;55
        mov   AX,0
        lea   SI,DSP_MSG
        add   SI,-2[BP]
        mov   [SI],AL
        mov   AX,3
        push  AX
        call  CLR_PIN
        add   SP,2
        push  WORD PTR NAV_LINE
        call  ENABLE
        add   SP,2
        push  WORD PTR CAR_POS+4
        call  ISIN
        add   SP,2
        push  AX
        push  WORD PTR ST_WIDTH
        call  ISMUL
        add   SP,4
        cwd
        mov   BX,LCAR_X
        mov   CX,LCAR_X+2
        sub   BX,AX
        sbb   CX,DX
        mov   LCAR_X,BX
        mov   LCAR_X+2,CX
```

```
        mov   CAR_POS,BX
        push  WORD PTR CAR_POS+4
        call  ICOS
        add   SP,2
        push  AX
        push  WORD PTR ST_WIDTH
        call  ISMUL
        add   SP,4
        cwd
        mov   BX,LCAR_Y
        mov   CX,LCAR_Y+2
        add   BX,AX
        adc   CX,DX
        mov   LCAR_Y,BX
        mov   LCAR_Y+2,CX
        mov   CAR_POS+2,BX
        mov   SP,BP
        pop   BP
        ret
GET_POS  ENDP @CODE    ENDS
@CODE    SEGMENT   BYTE PUBLIC 'CODE'
     include   epilogue.h
     end
@BIGMODEL EQU  0
     include   prologue.h public    INDEX
@CODE    ENDS
@DATAB   SEGMENT
     extrn     STREETS:word @DATAB   ENDS
@CODE    SEGMENT   BYTE PUBLIC 'CODE'
@CODE    ENDS
     extrn     SELCT_ST:near extrn     SEG_MNMX:near extrn     CROSS_ST:near

@CODE    SEGMENT   BYTE PUBLIC 'CODE'

INDEX    PROC NEAR
@CODE    ENDS
     extrn     $ISWITCH:near
@CODE    SEGMENT   BYTE PUBLIC 'CODE'
.00:              ;7
     push BP
     mov  BP,SP
     sub  SP,22
     mov  AX,0
     mov  -2[BP],AX
     push WORD PTR +10[BP]
```

```
        call SELCT_ST
        add  SP,2
        mov  -16[BP],AX
        or   AX,AX
        jne  ?1
        jmp  .01EE
?1:
        mov  AX,+4[BP]
        mov  -22[BP],AX
        lea  AX,STREETS
        mov  -14[BP],AX
        mov  SI,-16[BP]
        mov  AX,+6[SI]
        shl  AX,1
        mov  DX,-14[BP]
        add  DX,AX
        mov  -14[BP],DX
        mov  AX,-14[BP]
        mov  SI,-16[BP]
        mov  DL,+4[SI]
        and  DX,255
        mov  BX,1
        mov  CX,BX
        shl  DX,CL
        shl  DX,1
        add  AX,DX
        mov  -12[BP],AX
.057:                        ;22
        mov  AX,-14[BP]
        cmp  AX,-12[BP]
        jae  .085
        mov  SI,-14[BP]
        add  WORD PTR -14[BP],2
        mov  AX,[SI]
        mov  SI,+4[BP]
        mov  [SI],AX
        mov  SI,-14[BP]
        add  WORD PTR -14[BP],2
        mov  AX,[SI]
        mov  SI,+4[BP]
        add  WORD PTR +4[BP],12
        mov  +2[SI],AX
        jmp  SHORT .057
.085:                        ;25
        push WORD PTR +10[BP]
        call SELCT_ST
        add  SP,2
        mov  -16[BP],AX
        or   AX,AX
        jne  ?2
        jmp  .01EE
?2:
        mov  AX,+4[BP]
        mov  -20[BP],AX
        lea  AX,STREETS
        mov  -14[BP],AX
        mov  SI,-16[BP]
```

```
        mov   AX,+6[SI]
        shl   AX,1
        mov   DX,-14[BP]
        add   DX,AX
        mov   -14[BP],DX
        mov   AX,-14[BP]
        mov   SI,-16[BP]
        mov   DL,+4[SI]
        and   DX,255
        mov   BX,1
        mov   CX,BX
        shl   DX,CL
        shl   DX,1
        add   AX,DX
        mov   -12[BP],AX
.0D0:                      ;31
        mov   AX,-14[BP]
        cmp   AX,-12[BP]
        jae   .0FE
        mov   SI,-14[BP]
        add   WORD PTR -14[BP],2
        mov   AX,[SI]
        mov   SI,+4[BP]
        mov   [SI],AX
        mov   SI,-14[BP]
        add   WORD PTR -14[BP],2
        mov   AX,[SI]
        mov   SI,+4[BP]
        add   WORD PTR +4[BP],12
        mov   +2[SI],AX
        jmp   SHORT .0D0
.0FE:                      ;34
        mov   AX,+4[BP]
        mov   -18[BP],AX
        mov   AX,-20[BP]
        mov   +4[BP],AX
.010A:                     ;37
        add   WORD PTR +4[BP],12
        mov   AX,+4[BP]
        cmp   AX,-18[BP]
        jae   .0122
        push  WORD PTR +4[BP]
        call  SEG_MNMX
        add   SP,2
        jmp   SHORT .010A
.0122:                     ;39
        add   WORD PTR -22[BP],12
        mov   AX,-22[BP]
        cmp   AX,-20[BP]
        jb    ?3
        jmp   .01EE
?3:
        push  WORD PTR -22[BP]
        call  SEG_MNMX
        add   SP,2
        mov   SI,-22[BP]
        mov   AX,+4[SI]
```

```
        mov   -10[BP],AX
        mov   SI,-22[BP]
        mov   AX,+6[SI]
        mov   -8[BP],AX
        mov   SI,-22[BP]
        mov   AX,+8[SI]
        mov   -6[BP],AX
        mov   SI,-22[BP]
        mov   AX,+10[SI]
        mov   -4[BP],AX
        mov   AX,-20[BP]
        mov   +4[BP],AX
.0165:                    ;46
        add   WORD PTR +4[BP],12
        mov   AX,+4[BP]
        cmp   AX,-18[BP]
        jae   .01E2
        mov   SI,+4[BP]
        mov   AX,+4[SI]
        cmp   AX,-8[BP]
        jle   .017E
        jmp   SHORT .018A
.017F:                    ;50
        mov   SI,+4[BP]
        mov   AX,+6[SI]
        cmp   AX,-10[BP]
        jge   .018C
.018A:                    ;50
        jmp   SHORT .0197
.018C:                    ;50
        mov   SI,+4[BP]
        mov   AX,+8[SI]
        cmp   AX,-4[BP]
        jle   .0199
.0197:                    ;50
        jmp   SHORT .01A4
.0199:                    ;50
        mov   SI,+4[BP]
        mov   AX,+10[SI]
        cmp   AX,-6[BP]
        jge   .01A6
.01A4:                    ;50
        jmp   SHORT .0165
.01A7:                    ;51
        push  WORD PTR +8[BP]
        push  WORD PTR +6[BP]
        push  WORD PTR +4[BP]
        push  WORD PTR -22[BP]
        call  CROSS_ST
        add   SP,8
        push  AX
        jmp   SHORT .01CD
.01BB:                    ;53
        jmp   SHORT .0165
.01BD:                    ;55
        mov   AX,1
```

```
        mov     -2[BP],AX
        jmp     SHORT .01E0
.01C5:                  ;58
        mov     AX,2
        mov     -2[BP],AX
        jmp     SHORT .0165
.01CD:                  ;61
        call    $ISWITCH
        dw      3
        dw      2
        dw      2
        dw      0
        dw      .01E0
        dw      .01C5
        dw      .01BD
        dw      .01BB
.01E0:                  ;61
        jmp     SHORT .01E2
.01E2:                  ;63
        cmp     WORD PTR -2[BP],1
        jne     .01EB
        jmp     SHORT .01EE
.01EB:                  ;65
        jmp     .0122
.01EE:                  ;68
        mov     AX,-2[BP]
        mov     SP,BP
        pop     BP
        ret
INDEX   ENDP @CODE   ENDS
@CODE           SEGMENT   BYTE PUBLIC 'CODE'
        include epilogue.h
        end
@BIGMODEL EQU   0
        include prologue.h public  LB_MAP
@CODE   ENDS
@DATAB  SEGMENT
        extrn   ROADS:word public  NX_ROAD
        public  FND_RD
        extrn   LB_SAV1:word extrn   LB_SAV2:word extrn   POLD_LBS:word public  NX_LABEL
        extrn   COL_GRID:word extrn   XS1_ID:word extrn   XS2_ID:word
```

```
        extrn       XS1_DIST:word extrn       XS2_DIST:word extrn       HOME:word extrn       ON_STRT:word extrn       LB_ADDED:word public      LB_ROAD
        public      FND_LB
@DATAB  ENDS
@CODE       SEGMENT     BYTE PUBLIC 'CODE'
@CODE       ENDS
        extrn       LB_STRT:near extrn       PRIOR_LB:near extrn       MOVMEM:near

@CODE       SEGMENT     BYTE PUBLIC 'CODE'

LB_MAP      PROC NEAR
.00:                    ;5
    push BP
    mov  BP,SP
    sub  SP,20
    mov  AX,0
    mov  -4[BP],AX
.0C:                    ;18
    cmp  WORD PTR -4[BP],32
    jge  .030
.013:                   ;19
    mov  AX,0
    mov  DX,0
    lea  SI,COL_GRID
    mov  BX,-4[BP]
    inc  WORD PTR -4[BP]
    shl  BX,1
    shl  BX,1
    add  SI,BX
    mov  [SI],AX
    mov  +2[SI],DX
    jmp  SHORT .0C
.030:                   ;19
    mov  AX,0
    mov  LB_ADDED,AX
    lea  AX,LB_SAV1
    mov  DX,POLD_LBS
    cmp  DX,AX
    jne  .049
    lea  AX,LB_SAV2
    jmp  SHORT .04D
.049:                   ;21
    lea  AX,LB_SAV1
```

```
.04D:                   ;21
    mov  -16[BP],AX
    mov  -14[BP],AX
    mov  AX,-16[BP]
    add  AX,315
    mov  -12[BP],AX
    push WORD PTR -14[BP]
    push WORD PTR POLD_LBS
    push WORD PTR XS1_ID
    call LB_ROAD
    add  SP,7
    or   AX,AX
    je   .070
    add  WORD PTR -14[BP],63
.077:                   ;24
    push WORD PTR -14[BP]
    push WORD PTR POLD_LBS
    push WORD PTR XS2_ID
    call LB_ROAD
    add  SP,6
    or   AX,AX
    je   .091
    add  WORD PTR -14[BP],63
.091:                   ;25
    lea  AX,ROADS
    sub  AX,5
    mov  -20[BP],AX
.09B:                   ;26
    add  WORD PTR -20[BP],5
    mov  SI,-20[BP]
    mov  AX,[SI]
    mov  -8[BP],AX
    or   AX,AX
    je   .0E2
    mov  SI,-20[BP]
    mov  AX,+3[SI]
    cmp  AX,-32704
    jae  .0BA
    jmp  SHORT .0C3
.0BA:                   ;28
    mov  AX,-8[BP]
    cmp  AX,XS1_ID
    jne  .0C5
.0C3:                   ;28
    jmp  SHORT .0CE
.0C5:                   ;28
    mov  AX,-8[BP]
    cmp  AX,XS2_ID
    jne  .0E0
.0CE:                   ;28
    mov  AX,-1
    mov  SI,-20[BP]
    mov  +2[SI],AL
    mov  AX,0
    mov  SI,-20[BP]
    mov  +3[SI],AX
```

```
.0E0:                    ;32
    jmp  SHORT .09B
.0E2:                    ;32
    mov  AX,6
    mov  -6[BP],AX
    call NX_ROAD
    mov  -18[BP],AX
    mov  SI,AX
    mov  AL,+2[SI]
    and  AX,255
    mov  -2[BP],AL
    push WORD PTR POLD_LBS
    call NX_LABEL
    add  SP,2
    mov  -10[BP],AX
    mov  SI,AX
    mov  AL,+2[SI]
    and  AX,255
    mov  -1[BP],AL
.0113:                   ;36
    mov  AX,-6[BP]
    or   AX,AX
    jne  ?1
    jmp  .0244
?1:
    mov  AX,-14[BP]
    cmp  AX,-12[BP]
    jb   ?2
    jmp  .0244
?2:
    mov  AL,-1[BP]
    and  AX,255
    and  AX,255
    mov  DL,-2[BP]
    and  DX,255
    and  DX,255
    cmp  DX,AX
    jae  .0183
    dec  WORD PTR -6[BP]
    push WORD PTR -14[BP]
    mov  SI,-18[BP]
    push WORD PTR [SI]
    call LB_STRT
    add  SP,4
    or   AX,AX
    je   .015C
    add  WORD PTR -14[BP],63
.015C:                   ;40
    mov  AX,-1
    mov  SI,-18[BP]
    mov  +2[SI],AL
    mov  AX,0
    mov  SI,-18[BP]
    mov  +3[SI],AX
    call NX_ROAD
    mov  -18[BP],AX
```

```
        mov   SI,AX
        mov   AL,+2[SI]
        and   AX,255
        mov   -2[BP],AL
        jmp   .0241
.0183:                      ;44
        mov   AL,-1[BP]
        and   AX,255
        and   AX,255
        cmp   AX,255
        jne   .0197
        jmp   .0244
.0197:                      ;46
        push  WORD PTR -10[BP]
        call  PRIOR_LB
        add   SP,2
        or    AX,AX
        je    .0217
        mov   AX,63
        push  AX
        mov   AX,-14[BP]
        add   WORD PTR -14[BP],63
        push  AX
        push  WORD PTR -10[BP]
        call  MOVMEM
        add   SP,6
        and   AX,255
        and   AX,255
        mov   DL,-2[BP]
        and   DX,255
        and   DX,255
        cmp   DX,AX
        jne   .0217
        mov   SI,-10[BP]
        push  WORD PTR [SI]
        lea   AX,ROADS
        push  AX
        call  FND_RD
        add   SP,4
        mov   -20[BP],AX
        or    AX,AX
        je    .0217
        mov   AX,-1
        mov   SI,-20[BP]
        mov   +2[SI],AL
        mov   AX,0
        mov   SI,-20[BP]
        mov   +3[SI],AX
        mov   AX,-20[BP]
        cmp   AX,-18[BP]
        jne   .0217
        call  NX_ROAD
        mov   -18[BP],AX
        mov   SI,AX
        mov   AL,+2[SI]
        and   AX,255
        mov   -2[BP],AL
```

```
.0217:                    ;56
        mov    AX,-1
        mov    SI,-10[BP]
        mov    +2[SI],AL
        mov    AX,0
        mov    SI,-10[BP]
        mov    [SI],AX
        push   WORD PTR POLD_LBS
        call   far ptr NX_LABEL
        add    SP,2
        mov    -10[BP],AX
        mov    SI,AX
        mov    AL,+2[SI]
        and    AX,255
        mov    -1[BP],AL
.0241:                    ;59
        jmp    .0113
.0244:                    ;61
        mov    AX,-14[BP]
        cmp    AX,-12[BP]
        jb     ?3
        jmp    .02CB
        mov    AL,-1[BP]
        and    AX,255
        cmp    AX,255
        je     .02AF
        push   WORD PTR -10[BP]
        call   PRIOR_LB
        add    SP,2
        or     AX,AX
        je     .0283
        mov    AX,63
        push   AX
        mov    AX,-14[BP]
        add    WORD PTR -14[BP],63
        push   AX
        push   WORD PTR -10[BP]
        call   MOVMEM
        add    SP,6
.0283:                    ;65
        mov    AX,-1
        mov    SI,-10[BP]
        mov    +2[SI],AL
        mov    AX,0
        mov    SI,-10[BP]
        mov    [SI],AX
        push   WORD PTR POLD_LBS
        call   NX_LABEL
        add    SP,2
        mov    -10[BP],AX
        mov    SI,AX
        mov    AL,+2[SI]
        and    AX,255
        mov    -1[BP],AL
        jmp    SHORT .02C5
.02AF:                    ;69
```

```
        mov     AX,-1
        mov     SI,-14[BP]
        mov     +2[SI],AL
        mov     AX,0
        mov     SI,-14[BP]
        add     WORD PTR -14[BP],63
        mov     [SI],AX
.02C5:                          ;72
        jmp     SHORT .0244
.02C8:                          ;73
        mov     AX,-16[BP]
        mov     POLD_LBS,AX
        mov     SP,BP
        pop     BP
        ret
LB_MAP  ENDP NX_ROAD PROC NEAR
.02D3:                          ;79
        push    BP
        mov     BP,SP
        sub     SP,8
        mov     AX,ROADS
        mov     -8[BP],AX
        mov     -6[BP],AX
        mov     SI,AX
        mov     AX,+3[SI]
        mov     -4[BP],AX
        mov     SI,-6[BP]
        mov     AL,+2[SI]
        and     AX,255
        mov     -2[BP],AL
.02F8:                          ;88
        add     WORD PTR -8[BP],5
        mov     SI,-8[BP]
        mov     AX,[SI]
        or      AX,AX
        je      .036D
        mov     AL,-2[BP]
        and     AX,255
        mov     SI,-8[BP]
        mov     DL,+2[SI]
        and     DX,255
        mov     -1[BP],DL
        and     DX,255
        cmp     DX,AX
        jbe     .0328
        jmp     SHORT .034D
.0328:                          ;90
        mov     AL,-2[BP]
        and     AX,255
        and     DX,255
        mov     DL,-1[BP]
        and     DX,255
        and     DX,255
        cmp     DX,AX
```

```
        jne     .03FA
        mov     SI,-8[BP]
        mov     AX,+3[SI]
        cmp     AX,-4[BP]
        ja      .02FA
.034D:                          ;90
        jmp     SHORT .02F8
.03FA:                          ;92
        mov     AX,-8[BP]
        mov     -6[BP],AX
        mov     SI,AX
        mov     AX,+3[SI]
        mov     -4[BP],AX
        mov     AL,-1[BP]
        and     AX,255
        and     AX,255
        mov     -2[BP],AL
        jmp     SHORT .02F8
.0360:                          ;94
        mov     AX,-6[BP]
        mov     SP,BP
        pop     BP
        ret
NX_ROAD ENDP FND_RD  PROC NEAR
.0374:                          ;101
        push    BP
        mov     BP,SP
        add     WORD PTR +4[BP],-5
.037C:                          ;103
        add     WORD PTR +4[BP],5
        mov     SI,+6[BP]
        mov     AX,[SI]
        or      AX,AX
        je      .0396
        mov     SI,+4[BP]
        mov     AX,[SI]
        cmp     AX,+6[BP]
        je      .0396
        jmp     SHORT .037C
.0396:                          ;104
        mov     SI,+4[BP]
        mov     AX,[SI]
        or      AX,AX
        je      .03A6
        mov     AX,+4[BP]
        mov     SP,BP
        pop     BP
        ret
.03A6:                          ;107
        mov     AX,0
        mov     SP,BP
        pop     BP
        ret
.03AD:                          ;108
```

```
            mov     SP,BP
            pop     BP
            ret
FND_RD      ENDP LB_ROAD     PROC NEAR
.03B1:                          ;114
            push    BP
            mov     BP,SP
            sub     SP,4
            push    WORD PTR +4[BP]
            push    WORD PTR +6[BP]
            call    FND_LB
            add     SP,4
            mov     -2[BP],AX
            or      AX,AX
            je      .0410
            push    WORD PTR -2[BP]
            call    PRIOR_LB
            add     SP,2
            or      AX,AX
            je      .03FF
            mov     AX,63
            push    AX
            push    WORD PTR +8[BP]
            push    WORD PTR -2[BP]
            call    MOVMEM
            add     SP,6
            mov     AX,-1
            mov     SI,-2[BP]
            mov     +2[SI],AL
            mov     AX,0
            mov     SI,-2[BP]
            mov     [SI],AX
            mov     AX,1
            mov     SP,BP
            pop     BP
            ret
.03FF:                          ;126
            mov     AX,-1
            mov     SI,-2[BP]
            mov     +2[SI],AL
            mov     AX,0
            mov     SI,-2[BP]
            mov     [SI],AX
            push    WORD PTR +8[BP]
            push    WORD PTR +4[BP]
            call    LB_STRT
            add     SP,4
            mov     SP,BP
            pop     BP
            ret
LB_ROAD     ENDP

NX_LABEL    PROC NEAR
.0420:                          ;136
```

```
        push BP
        mov  BP,SP
        sub  SP,6
        mov  AX,+6[BP]
        mov  -6[BP],AX
        mov  SI,AX
        mov  AL,+2[SI]
        and  AX,255
        mov  -2[BP],AL
        mov  AX,5
        mov  -4[BP],AX
.043E:                    ;143
        dec  WORD PTR -4[BP]
        mov  AX,-4[BP]
        or   AX,AX
        je   .047C
        mov  AL,-2[BP]
        and  AX,255
        and  AX,255
        add  WORD PTR +4[BP],63
        mov  SI,+4[BP]
        mov  DL,+2[SI]
        and  DX,255
        cmp  DX,AX
        jb   .0468
        jmp  SHORT .043E
.0468:                    ;145
        mov  AX,+6[BP]
        mov  -6[BP],AX
        mov  SI,AX
        mov  AL,+2[SI]
        and  AX,255
        mov  -2[BP],AL
        jmp  SHORT .043F
.047C:                    ;146
        mov  AX,-6[BP]
        mov  SP,BP
        pop  BP
        ret
NX_LABEL ENDP FND_LB  PROC NEAR
.0483:                    ;153
        push BP
        mov  BP,SP
        sub  SP,2
        mov  AX,+6[BP]
        or   AX,AX
        je   .0492
        jmp  SHORT .0499
.0492:                    ;156
        mov  AX,0
        mov  SP,BP
        pop  BP
        ret
.0499:                    ;157
```

```
        mov     AX,6
        mov     -2[BP],AX
.049F:                  ;158
        dec     WORD PTR -2[BP]
        mov     AX,-2[BP]
        or      AX,AX
        je      .04BC
        mov     SI,+4[BP]
        add     WORD PTR +6[BP],63
        mov     AX,[SI]
        cmp     AX,+6[BP]
        jne     .04BA
        jmp     SHORT .04BC
.04BA:                  ;160
        jmp     SHORT .049F
.04BC:                  ;160
        mov     AX,-2[BP]
        or      AX,AX
        je      .04CD
        mov     AX,+6[BP]
        sub     AX,63
        mov     SP,BP
        pop     BP
        ret
.04CD:                  ;163
        mov     AX,0
        mov     SP,BP
        pop     BP
        ret
.04D4:                  ;164
        mov     SP,BP
        pop     BP
        ret
FND_LB  ENDP @CODE   ENDS
@CODE   SEGMENT  BYTE PUBLIC 'CODE'
        include epilogue.h
        end
@BIGMODEL EQU   0
        include prologue.h public  LB_SEGMT
@CODE   ENDS
@DATAB  SEGMENT
        extrn   STROKE:word extrn   LB_ADDED:word @DATAB  ENDS
@CODE   SEGMENT  BYTE PUBLIC 'CODE'
@CODE   ENDS
        extrn   IATAN2:near extrn   ISIN:near extrn   ICOS:near
```

```
        extrn    ZM_NODE:near extrn    RT_VECTR:near extrn    COL_TEST:near extrn    DSP_NAME:near

@CODE   SEGMENT  BYTE PUBLIC 'CODE'

LB_SEGMT  PROC NEAR
.00:              ;6
    push BP
    mov  BP,SP
    sub  SP,14
    mov  AX,+8[BP]
    sub  AX,+4[BP]
    push AX
    mov  AX,+10[BP]
    sub  AX,+6[BP]
    push AX
    call IATAN2
    add  SP,4
    mov  -14[BP],AX
    cmp  AX,16384
    jbe  .043
    cmp  WORD PTR -14[BP],-16384
    jae  .043
    mov  AX,0
    mov  -12[BP],AX
    mov  AX,+8[BP]
    mov  -8[BP],AX
    mov  AX,+10[BP]
    mov  -6[BP],AX
    add  WORD PTR -14[BP],-32768
    jmp  SHORT .055
.043:             ;19
    mov  AX,1
    mov  -12[BP],AX
    mov  AX,+4[BP]
    mov  -8[BP],AX
    mov  AX,+6[BP]
    mov  -6[BP],AX
.055:             ;23
    push WORD PTR -14[BP]
    call ISIN
    add  SP,2
    mov  STROKE+2,AX
    push WORD PTR -14[BP]
    call ICOS
    add  SP,2
    mov  STROKE+4,AX
    lea  SI,-6[BP]
    push SI
    lea  SI,-8[BP]
```

```
        push SI
        call ZM_NODE
        add  SP,4
        lea  SI,-2[BP]
        push SI
        lea  SI,-4[BP]
        push SI
        lea  SI,STROKE
        push SI
        mov  AX,8
        push AX
        mov  AL,16
        mov  -10[BP],AX
        push AX
        call RT_VECTR
        add  SP,10
        mov  AX,0
        push AX
        push WORD PTR +12[BP]
        mov  AX,-2[BP]
        mov  DX,-6[BP]
        add  DX,AX
        mov  -6[BP],DX
        push DX
        mov  AX,-4[BP]
        mov  DX,-8[BP]
        add  DX,AX
        mov  -8[BP],DX
        push DX
        call COL_TEST
        add  SP,8
        or   AX,AX
        je   .0C5
        jmp  SHORT .0CC
.0C5:                        ;28
        mov  AX,0
        mov  SP,BP
        pop  BP
        ret
.0CC:                        ;30
        mov  AX,1
        mov  LB_ADDED,AX
        mov  AL,7
        push AX
        push WORD PTR +14[BP]
        push WORD PTR -6[BP]
        push WORD PTR -8[BP]
        call DSP_NAME
        add  SP,8
        mov  AX,-12[BP]
        or   AX,AX
        je   .0F3
        mov  AX,-10[BP]
        mov  SP,BP
        pop  BP
        ret
```

```
.0F3:                   ;34
    mov   AX,-10[BP]
    neg   AX
    mov   SP,BP
    pop   BP
    ret
.0FC:                   ;35
    mov   SP,BP
    pop   BP
    ret
LB_SEGMT  ENDP @CODE     ENDS
@CODE     SEGMENT   BYTE PUBLIC 'CODE'
    include   epilogue.h
    end
@BIGMODEL EQU  0
    include   prologue.h
    public    LB_STRT
    public    MAX_VCTR
@CODE     ENDS
@DATAB    SEGMENT
    extrn     VECTORS:word extrn     REC_PTRS:word extrn     STROKE:word extrn     CRS:word extrn     CEN_POS:word extrn     SEG_PLOT:word extrn     SEG_DS:word extrn     ZOOM_TBL:word extrn     ZOOMF_PL:word extrn     ZOOMF_DB:word extrn     NAV_LINE:word extrn     BUF_DB:word @DATAB    ENDS
@CODE     SEGMENT   BYTE PUBLIC 'CODE'
@CODE     ENDS
    extrn     DISABLE:near extrn     MOVBLOCK:near extrn     SRT_STRT:near extrn     ENABLE:near
```

```
        extrn    LB_SEGMT:near extrn    RT_VECTR:near

@CODE   SEGMENT  BYTE PUBLIC 'CODE'
LB_STRT PROC NEAR
.00:              ;7
        push BP
        mov  BP,SP
        sub  SP,42
        mov  AX,0
        lea  SI,-51[BP]
        mov  [SI],AL
        lea  AX,VECTORS
        sub  AX,18
        mov  -92[BP],AX
        lea  AX,VECTORS
        add  AX,72
        mov  -90[BP],AX
.022:             ;32
        add  WORD PTR -92[BP],18
        mov  AX,-92[BP]
        cmp  AX,-90[BP]
        jae  .039
        mov  AX,0
        mov  SI,-92[BP]
        mov  [SI],AX
        jmp  SHORT .022
.039:             ;33
        lea  AX,BUF_DB
        mov  -88[BP],AX
        lea  AX,REC_PTRS
        mov  -64[BP],AX
.047:             ;36
        mov  SI,-64[BP]
        add  WORD PTR -64[BP],2
        mov  AX,[SI]
        mov  -94[BP],AX
        or   AX,AX
        jne  ?1
        jmp  .0237
?1:
        mov  SI,-94[BP]
        mov  AX,[SI]
        mov  -72[BP],AX
        mov  SI,-94[BP]
        mov  AX,+2[SI]
        mov  -66[BP],AX
        push WORD PTR NAV_LINE
        call DISABLE
        add  SP,2
        mov  SI,-94[BP]
        push WORD PTR +4[SI]
        push WORD PTR SEG_DS
        push WORD PTR -88[BP]
        push QORD PTR SEG_PLOT
```

```
        mov   SI,-94[BP]
        push  WORD PTR +6[SI]
        call  MOVBLOCK
        add   SP,10
        mov   AX,-88[BP]
        mov   SI,-88[BP]
        add   AX,[SI]
        mov   -86[BP],AX
        mov   AX,-86[BP]
        dec   WORD PTR -86[BP]
        mov   SI,-88[BP]
        add   AX,+10[SI]
        mov   -84[BP],AX
        mov   AX,-88[BP]
        mov   SI,-88[BP]
        add   AX,+2[SI]
        mov   -82[BP],AX
        mov   AX,-82[BP]
        add   WORD PTR -82[BP],-8
        lea   SI,ZOOM_TBL
        mov   DX,ZOOMF_PL
        add   DX,2
        shl   DX,1
        add   SI,DX
        mov   DX,[SI]
        cmp   DX,ZOOMF_DB
        jle   .0E0
        mov   SI,-88[BP]
        mov   DX,+10[SI]
        jmp   SHORT .01E6
.0E0:                    ;46
        mov   SI,-88[BP]
        mov   DX,+12[SI]
.0E6:                    ;46
        shl   DX,1
        shl   DX,1
        shl   DX,1
        add   AX,DX
        mov   -80[BP],AX
        mov   AX,-88[BP]
        mov   SI,-88[BP]
        add   AX,+4[SI]
        mov   -78[BP],AX
        mov   AX,-88[BP]
        mov   SI,-88[BP]
        add   AX,+6[SI]
        mov   -74[BP],AX
        mov   SI,-88[BP]
        mov   AL,+18[SI]
        and   AX,255
        or    AX,AX
        je    .011C
        mov   AX,6
        jmp   SHORT .011F
.011C:                   ;50
        mov   AX,4
.011F:                   ;50
```

```
        mov    -68[BP],AX
.0122:                     ;51
        add    WORD PTR -82[BP],8
        mov    AX,-82[BP]
        cmp    AX,-80[BP]
        jb     ?2
        jmp    .022A
?2:
        inc    WORD PTR -86[BP]
        mov    SI,-82[BP]
        mov    AX,[SI]
        cmp    AX,+4[BP]
        je     .0141
        jmp    SHORT .0122
.0141:                     ;54
        mov    AX,-86[BP]
        cmp    AX,-84[BP]
        jae    .0194
        mov    SI,-86[BP]
        mov    AL,[SI]
        and    AX,255
        or     AX,AX
        je     .0194
        mov    AX,-78[BP]
        push   AX
        mov    BX,14
        mov    SI,-86[BP]
        mov    AL,[SI]
        and    AX,255
        sub    AX,1
        mul    BX
        pop    SI
        add    SI,AX
        mov    -76[BP],SI
        mov    SI,-76[BP]
        mov    AX,[SI]
        cmp    AX,-72[BP]
        jae    .017D
        jmp    SHORT .0192
.017D:                     ;58
        mov    SI,-76[BP]
        mov    AX,[SI]
        cmp    AX,-72[BP]
        jne    .0194
        mov    SI,-76[BP]
        mov    AX,+2[SI]
        cmp    AX,-66[BP]
        jge    .0194
.0192:                     ;58
        jmp    SHORT .0122
.194:                      ;60
        lea    SI,-51[BP]
        mov    AL,[SI]
        cbw
        or     AX,AX
        je     .01A0
```

```
        jmp   SHORT .01F5
.01A0:                        ;60
        mov   SI,-82[BP]
        mov   AL,+3[SI]
        and   AX,255
        and   AX,63
        mov   -54[BP],AL
        mov   AX,-88[BP]
        mov   SI,-88[BP]
        add   AX,+8[SI]
        mov   SI,-82[BP]
        add   AX,+6[SI]
        mov   -53[BP],AX
        mov   AX,1
        mov   -70[BP],AX
.01C8:                        ;65
        mov   SI,-53[BP]
        inc   WORD PTR -53[BP]
        mov   AL,[SI]
        cbw
        lea   SI,-51[BP]
        inc   WORD PTR -70[BP]
        mov   DX,-70[BP]
        add   SI,DX
        mov   [SI],AL
        cbw
        or    AX,AX
        je    .01E5
        jmp   SHORT .01C8
.01E5:                        ;66
        mov   AX,-70[BP]
        or    AX,AX
        je    .01EE
        jmp   SHORT .01F5
.01EE:                        ;67
        mov   AX,0
        mov   SP,BP
        pop   BP
        ret
.01F5:                        ;69
        mov   SI,-82[BP]
        mov   AL,+2[SI]
        and   AX,255
        push  AX
        mov   SI,-88[BP]
        mov   AL,+18[SI]
        and   AX,255
        or    AX,AX
        je    .0213
        mov   AX,6
        jmp   SHORT .216
.0213:                        ;72
        mov   AX,4
.216:                         ;72
        push  AX
        mov   AX,-74[BP]
```

```
        mov   SI,-82[BP]
        add   AX,+4[SI]
        push  AX
        call  SRT_STRT
        add   SP,6
        jmp   .0122
.022A:                      ;73
        push  WORD PTR NAV_LINE
        call  ENABLE
        add   SP,2
        jmp   .047
.0237:                      ;76
        call  MAX_VCTR
        mov   -92[BP],AX
        or    AX,AX
        je    .0279
        lea   AX,-51[BP]
        push  AX
        push  WORD PTR -70[BP]
        mov   SI,-92[BP]
        push  WORD PTR +16[SI]
        mov   SI,-92[BP]
        push  WORD PTR +14[SI]
        mov   SI,-92[BP]
        push  WORD PTR +12[SI]
        mov   SI,-92[BP]
        push  WORD PTR +10[SI]
        call  LB_SEGMT
        add   SP,12
        mov   -58[BP],AX
        or    AX,AX
        je    .026F
        jmp   SHORT .0279
.026F:                      ;80
        mov   AX,0
        mov   SI,-92[BP]
        mov   [SI],AX
        jmp   SHORT .0237
.0279:                      ;81
        mov   AX,-92[BP]
        or    AX,AX
        je    .0282
        jmp   SHORT .0289
.0282:                      ;82
        mov   AX,0
        mov   SP,BP
        pop   BP
        ret
.0289:                      ;83
        mov   AX,+4[BP]
        mov   SI,+6[BP]
        mov   [SI],AX
        mov   AL,-54[BP]
        and   AX,255
        and   AX,255
        mov   SI,+6[BP]
```

```
        mov   +2[SI],AL
        lea   AX,-51[BP]
        mov   -53[BP],AX
        mov   AX,0
        mov   -70[BP],AX
.02AE:                         ;87
        mov   SI,-53[BP]
        inc   WORD PTR -53[BP]
        mov   AL,[SI]
        cbw
        mov   SI,+6[BP]
        lea   DX,+3[SI]
        mov   BX,-70[BP]
        inc   WORD PTR -70[BP]
        add   DX,BX
        mov   [SI],AL
        cbw
        or    AX,AX
        je    .02D0
        jmp   SHORT .02AE
.02D0:                         ;88
        mov   AX,STROKE+2
        neg   AX
        mov   STROKE+2,AX
        cmp   WORD PTR -58[BP],0
        jg    ?3
        jmp   .035D
?3:
        lea   SI,-60[BP]
        push  SI
        lea   SI,-62[BP]
        push  SI
        lea   SI,CRS
        push  SI
        mov   SI,-92[BP]
        mov   AX,+4[SI]
        mov   SI,+6[BP]
        mov   +57[SI],AX
        sub   AX,CEN_POS+2
        push  AX
        mov   SI,-92[BP]
        mov   AX,+2[SI]
        mov   SI,+6[BP]
        mov   +55[SI],AX
        sub   AX,CEN_POS
        push  AX
        call  RT_VECTR
        add   SP,10
        lea   SI,-56[BP]
        push  SI
        mov   AX,+6[BP]
        add   AX,53
        push  AX
        lea   SI,STROKE
        push  SI
        mov   SI,-92[BP]
```

```
        mov    AX,+12[BP]
        sub    AX,-60[BP]
        push   AX
        mov    SI,-92[BP]
        mov    AX,+10[SI]
        sub    AX,-62[BP]
        push   AX
        call   RT_VECTR
        add    SP,10
        mov    SI,-92[BP]
        mov    AX,+6[SI]
        mov    SI,+6[BP]
        mov    +59[SI],AX
        mov    SI,-92[BP]
        mov    AX,+8[SI]
        mov    SI,+6[BP]
        mov    +61[SI],AX
        jmp    SHORT .03D4
.035D:                          ;100
        lea    SI,-60[BP]
        push   SI
        lea    SI,-62[BP]
        push   SI
        lea    SI,CRS
        push   SI
        mov    SI,-92[BP]
        mov    AX,+8[SI]
        mov    SI,+6[BP]
        mov    +57[SI],AX
        sub    AX,CEN_POS+2
        push   AX
        mov    SI,-92[BP]
        mov    AX,+6[SI]
        mov    SI,+6[BP]
        mov    +55[SI],AX
        sub    AX,CEN_POS
        push   AX
        call   RT_VECTR
        add    SP,10
        lea    SI,-56[BP]
        push   SI
        mov    AX,+6[BP]
        add    AX,53
        push   AX
        lea    SI,STROKE
        push   SI
        mov    SI,-92[BP]
        mov    AX,+16[SI]
        sub    AX,-60[BP]
        push   AX
        mov    SI,-92[BP]
        mov    AX,+14[SI]
        sub    AX,-62[BP]
        push   AX
        call   RT_VECTR
        add    SP,10
```

```
        mov    SI,-92[BP]
        mov    AX,+2[SI]
        mov    SI,+6[BP]
        mov    +59[SI],AX
        mov    SI,-92[BP]
        mov    AX,+4[SI]
        mov    SI,+6[BP]
        mov    +6[SI],AX
.03D4:                     ;109
        mov    AX,1
        mov    SP,BP
        pop    BP
        ret
LB_STRT ENDP
MAX_VCTR PROC NEAR
.03D8:                     ;114
        push   BP
        mov    BP,SP
        sub    SP,8
        mov    AX,0
        mov    -8[BP],AX
        mov    -2[BP],AX
        lea    AX,VECTORS
        sub    AX,18
        mov    -6[BP],AX
        lea    AX,VECTORS
        add    AX,72
        mov    -4[BP],AX
.03FE:                     ;124
        add    WORD PTR -6[BP],18
        mov    AX,-6[BP]
        cmp    AX,-4[BP]
        jae    .0426
        mov    SI,-6[BP]
        mov    AX,[SI]
        cmp    AX,-2[BP]
        jg     .0417
        jmp    SHORT .03FE
.0417:                     ;126
        mov    AX,-6[BP]
        mov    -8[BP],AX
        mov    SI,AX
        mov    AX,[SI]
        mov    -2[BP],AX
        jmp    SHORT .03FE
.0426:                     ;127
        mov    AX,-8[BP]
        mov    SP,BP
        pop    BP
        ret
MAX_VCTR ENDP
@CODE    ENDS
@CODE    SEGMENT  BYTE PUBLIC 'CODE'
        include   epilogue.h
        end
```

```
@BIGMODEL  EQU    0
       include    prologue.h
@CODE       ENDS
@DATAU      SEGMENT
       db     66,85
       db     84,84,79,78,32,37,100,32,80,82,69,83,83,69
@DATAC ENDS
@CODE       SEGMENT   BYTE PUBLIC 'CODE'
@CODE       ENDS
@DATAB      SEGMENT
       db     2 DUP (?)

public    MAP_RD
@DATAU      ENDS
@DATAB      SEGMENT
       extrn     LCEN_X:word extrn     LCEN_Y:word extrn     LCAR_X:word extrn     LCAR_Y:word extrn     LMARK_X:word extrn     LMARK_Y:word public    SCAN_COS
       public    SCAN_SIN
       extrn     SW_STAT:word
       extrn     CMD_STAT:word
       extrn     HOME:word extrn     NORTH:word extrn     DSP_QEP:word extrn     ZOOMF_PL:word extrn     ERR_MSG:word extrn     CEN_POS:word extrn     CLP_BNDY:word extrn     ZOOMF_DB:word
@DATAB      ENDS
@CODE       SEGMENT   BYTE PUBLIC 'CODE'
@CODE       ENDS
       extrn     SPRINTF:near extrn     DB_ZOOM:near extrn     RELOCATE:near extrn     ISMUL:near
```

```
        extrn      ICOS:near extrn      ISIN:near

@CODE      SEGMENT    BYTE PUBLIC 'CODE'

MAP_RD     PROC NEAR
@CODE      ENDS
      extrn      $ISWITCH:near

@CODE      SEGMENT BYTE PUBLIC 'CODE'
.00:               ;4
     push BP
     mov  BP,SP
     sub  SP,2
     mov  AX,CMD_STAT
     or   AX,AX
     je   .010
     jmp  SHORT .017
.010:              ;14
     mov  AX,0
     mov  SP,BP
     pop  BP
     ret
.017:              ;15
     cmp  WORD PTR CMD_STAT,2
     jne  .02A
     mov  AX,0
     mov  CMD_STAT,AX
     mov  SP,BP
     pop  BP
     ret
.02A:              ;16
     mov  AX,2
     mov  CMD_STAT,AX
     mov  AX,SW_STAT
     or   AX,AX
     je   .04D
     push WORD PTR SW_STAT
     lea  AX,@SW
     push AX
     lea  AX,ERR_MSG
     push AX
     call SPRINTF
     add  SP,6
.04D:              ;18
     mov  AX,SW_STAT
     add  AX@UW
     mov  -2[BP],AX
     mov  AX,0
     mov  @UW,AX
     mov  AX,-2[BP]
     push AX
     jmp  .01FA
.066:              ;21
```

```
        mov   AX,ZOOMF_PL
        sub   AX,1
        push  AX
        call  DB_ZOOM
        add   SP,2
        jmp   .0245
.077:                           ;24
        mov   AX,ZOOMF_PL
        add   AX,1
        push  AX
        call  DB_ZOOM
        add   SP,2
        jmp   .0245
.088:                           ;27
        jmp   .0245
.08B:                           ;29
        mov   AX,1
        mov   HOME,AX
        jmp   .0245
.095:                           ;32
        xor   WORD PTR NORTH,1
        jmp   .0245
.095:                           ;35
        mov   AX,0
        mov   HOME,AX
        call  SCAN_COS
        mov   BX,LCEN_X
        mov   CX,LCEN_X+2
        add   BX,AX
        adc   CX,DX
        mov   LCEN_X,BX
        mov   LCEN_X+2,CX
        call  SCAN_SIN
        mov   BX,LCEN_Y
        mov   CX,LCEN_Y+2
        add   BX,AX
        adc   CX,DX
        mov   LCEN_Y,BX
        mov   LCEN_Y+2,CX
        jmp   .0245
.0D6:                           ;40
        mov   AX,0
        mov   HOME,AX
        call  SCAN_COS
        mov   BX,LCEN_X
        mov   CX,LCEN_X+2
        sub   BX,AX
        sbb   CX,DX
        mov   LCEN_X,BX
        mov   LCEN_X+2,CX
        call  SCAN_SIN
        mov   BX,LCEN_Y
        mov   CX,LCEN_Y+2
        sub   BX,AX
        sbb   CX,DX
        mov   LCEN_Y,BX
        mov   LCEN_Y+2,CX
```

```
        jmp   .0245
.010E:                    ;45
        mov   AX,0
        mov   HOME,AX
        call  SCAN_SIN
        mov   BX,LCEN_X
        mov   CX,LCEN_X+2
        sub   BX,AX
        sbb   CX,DX
        mov   LCEN_X,BX
        mov   LCEN_X+2,CX
        call  SCAN_COS
        mov   BX,LCEN_Y
        mov   CX,LCEN_Y+2
        add   BX,AX
        adc   CX,DX
        mov   LCEN_Y,BX
        mov   LCEN_Y+2,CX
        jmp   .0245
.0146:                    ;50
        mov   AX,0
        mov   HOME,AX
        call  SCAN_SIN
        mov   BX,LCEN_X
        mov   CX,LCEN_X+2
        add   BX,AX
        adc   CX,DX
        mov   LCEN_X,BX
        mov   LCEN_X+2,CX
        call  SCAN_COS
        mov   BX,LCEN_Y
        mov   CX,LCEN_Y+2
        sub   BX,AX
        sbb   CX,DX
        mov   LCEN_Y,BX
        mov   LCEN_Y+2,CX
        jmp   .0245
.017E:                    ;55
        mov   AX,LCAR_X
        mov   DX,LCAR_X+2
        mov   LMARK_X,AX
        mov   LMARK_X+2,DX
        mov   AX,LCAR_Y
        mov   DX,LCAR_Y+2
        mov   LMARK_Y,AX
        mov   LMARK_Y+2,DX
        jmp   .0245
.01A1:                    ;60
        mov   AX,12
        mov   @UW,AX
        jmp   .0245
.01AB:                    ;63
        mov   AX,20
        mov   DX,32
        push  DX
        push  AX
```

```
        mov  AX,-5
        mov  DX,31
        push DX
        push AX
        call RELOCATE
        add  SP,8
        jmp  .0245
.01C4:                  ;66
        mov  AX,1
        mov  DSP_QEP,AX
        jmp  SHORT .0245
.01CD:                  ;69
        mov  AX,0
        mov  DSP_QEP,AX
        jmp  SHORT .0245
.01D6:                  ;72
        jmp  SHORT .0245
.01D8:                  ;74
        mov  AX,HOME
        or   AX,AX
        je   .01E2
        jmp  SHORT .01F8
.01E2:                  ;75
        push WORD PTR LCEN_Y+2
        push WORD PTR LCEN_Y
        push WORD PTR LCEN_X+2
        push WORD PTR LCEN_X
        call RELOCATE
        add  SP,8
.01F8:                  ;76
        jmp  SHORT .0245
.01FA:                  ;77
        call $ISWITCH
        dw   17
        dw   20
        dw   21
        dw   22
        dw   23
        dw   24
        dw   17
        dw    5
        dw    6
        dw    8
        dw    9
        dw   10
        dw   11
        dw   12
        dw    4
        dw    3
        dw    2
        dw    1
        dw   .0245
        dw   .01D8
        dw   .01D6
        dw   .01CD
        dw   .01C4
```

```
        dw      .01AB
        dw      .01A1
        dw      .01A1
        dw      .017E
        dw      .0146
        dw      .010E
        dw      .0D6
        dw      .09E
        dw      .095
        dw      .08B
        dw      .088
        dw      .077
        dw      .066
.0245:                        ;77
        mov     AX,-2[BP]
        mov     SP,BP
        pop     BP
        ret
MAP_RD  ENDP SCAN_COS  PROC NEAR
@CODE     ENDS
        extrn   $LLSHIFT:near @CODE     SEGMENT   BYTE PUBLIC 'CODE'
.024C:                        ;82
        push BP
        mov  BP,SP
        push WORD PTR CEN_POS+4
        call ICOS
        add  SP,2
        push AX
        mov  AX,CLP_BNDY
        mov  DX,1
        mov  CX,DX
        sar  AX,CL
        push AX
        call ISMUL
        add  SP,4
        cwd
        push DX
        push AX
        mov  AX,ZOOMF_DB
        cwd
        push DX
        push AX
        call $LLSHIFT
        pop  AX
        pop  DX
        mov  SP,BP
        pop  BP
        ret
SCAN_COS  ENDP

SCAN_SIN  PROC NEAR
.027F:                        ;92
```

```
        push BP
        mov  BP,SP
        push WORD PTR CEN_POS+4
        call ISIN
        add  SP,2
        push AX
        mov  AX,CLP_BNDY
        mov  DX,1
        mov  CX,DX
        sar  AX,CL
        push AX
        call ISMUL
        add  SP,4
        cwd
        push DX
        push AX
        mov  AX,ZOOMF_DB
        cwd
        push DX
        push AX
        call $LLSHIFT
        pop  AX
        pop  DX
        mov  SP,BP
        pop  BP
        ret
SCAN_SIN ENDP @CODE     ENDS
@CODE     SEGMENT   BYTE PUBLIC 'CODE'
        include   epilogue.h
        end
@BIGMODEL EQU  0
        include   prologue.h public    PRIOR_LB
@CODE     ENDS
@DATAB    SEGMENT
        extrn     CEN_POS:word extrn     CRS:word extrn     STROKE:word extrn     ZOOMF:word extrn     LB_ADDED:word @DATAB    ENDS
@CODE     SEGMENT   BYTE PUBLIC 'CODE'
@CODE     ENDS
        extrn     RT_VECTR:near extrn     BOX_CLIP:far extrn     IATAN2:far
```

```
        extrn       ISIN:far extrn       ICOS:far extrn       ZM_NODE:far extrn       COL_TEST:far extrn       DSP_NAME:far

@CODE           SEGMENT     BYTE PUBLIC 'CODE'

PRIOR_LB        PROC        NEAR
.00:                ;6
    push BP
    mov  BP,SP
    sub  SP,22
    mov  AX,0
    mov  -2[BP],AX
.0C:                ;15
    mov  SI,+4[BP]
    lea  AX,+3[SI]
    mov  DX,-2[BP]
    inc  WORD PTR -2[BP]
    add  AX,DX
    mov  SI,AX
    mov  AL,[SI]
    cbw
    or   AX,AX
    je   .025
    jmp  SHORT .0C
.025:               ;16
    dec  WORD PTR -2[BP]
    mov  AX,-2[BP]
    or   AX,AX
    jne  .032
.031:               ;17
    mov  AX,0
    mov  SP,BP
    pop  BP
    ret
.038:               ;18
    lea  SI,-14[BP]
    push SI
    lea  SI,-16[BP]
    push SI
    lea  SI,CRS
    push SI
    mov  SI,+4[BP]
    mov  AX,+57[SI]
    sub  AX,CEN_POS+2
    push AX
    mov  SI,+4[BP]
    mov  AX,+55[SI]
    sub  AX,CEN_POS
    push AX
```

```
        call  RT_VECTR
        add   SP,10
        lea   SI,-10[BP]
        push  SI
        lea   SI,-12[BP]
        push  SI
        lea   SI,CRS
        push  SI
        mov   SI,+4[BP]
        mov   AX,+61[SI]
        sub   AX,CEN_POS+2
        push  AX
        mov   SI,+4[BP]
        mov   AX,+59[SI]
        sub   AX,CEN_POS
        push  AX
        call  RT_VECTR
        add   SP,10
        mov   AX,-16[BP]
        mov   -20[BP],AX
        mov   AX,-14[BP]
        mov   -18[BP],AX
        lea   SI,-4[BP]
        push  SI
        lea   SI,-10[BP]
        push  SI
        lea   SI,-12[BP]
        push  SI
        lea   SI,-18[BP]
        push  SI
        lea   SI,-20[BP]
        push  SI
        call  BOX_CLIP
        add   SP,10
        or    AX,AX
        je    .0B6
        jmp   SHORT .0BD
.0B6:                        ;24
        mov   AX,0
        mov   SP,BP
        pop   BP
        ret
.0BD:                        ;25
        mov   AX,-12[BP]
        sub   AX,-20[BP]
PRIOR_LB      ENDP
@CODE         ENDS
@CODE         SEGMENT BYTE PUBLIC 'CODE'
include epilogue.h
        mov   AX,-10[BP]
        sub   AX,-18[BP]
        push  AX
        call  IATAN2
        add   SP,4
        mov   -22[BP],AX
        cmp   WORD PTR -22[BP],18432
```

```
        jbe   .0E9
        cmp   WORD PTR -22[BP],-18432
        jae   .0E9
        mov   AX,0
        mov   SP,BP
        pop   BP
        ret
        add   SP,2
        mov   STROKE+2,AX
        push  WORD PTR -22[BP]
        call  ICOS
        add   SP,2
        mov   STROKE+4,AX
        cmp   WORD PTR ZOOMF,0
        jl    .0129
        mov   AX,16
        mov   DX,ZOOMF
        mov   CX,DX
        sar   AX,CL
        mov   -8[BP],AX
        mov   AX,8
        mov   DX,ZOOMF
        mov   CX,DX
        sar   AX,CL
        mov   -6[BP],AX
        jmp   SHORT .0149
.0129:                        ;33
        mov   AX,16
        mov   DX,ZOOMF
        neg   DX
        mov   CX,DX
        shl   AX,CL
        mov   -8[BP],AX
        mov   AX,8
        mov   DX,ZOOMF
        neg   DX
        mov   CX,DX
        shl   AX,CL
        mov   -6[BP],AX
.0149:                        ;36
        lea   SI,-6[BP]
        push  SI
        lea   SI,-8[BP]
        push  SI
        lea   SI,STROKE
        push  SI
        push  WORD PTR -6[BP]
        mov   SI,+4[BP]
        mov   AX,+53[SI]
        add   AX,-8[BP]
        push  AX
        call  RT_VECTR
        add   SP,10
        mov   AX,-8[BP]
        add   -16[BP],AX
        mov   AX,-6[BP]
```

```
        add   -14[BP],AX
        lea   SI,-14[BP]
        push  SI
        lea   SI,-16[BP]
        push  SI
        call  ZM_NODE
        add   SP,4
        mov   AX,LB_ADDED
        or    AX,AX
        je    .0189
        mov   AX,1
.0181:                      ;41
        xor   AX,1
        push  AX
        push  WORD PTR -2[BP]
        push  WORD PTR -14[BP]
        push  WORD PTR -16[BP]
        call  COL_TEST
        add   SP,8
        or    AX,AX
        jne   .019E
.0198:                      ;41
        xor   AX,AX
        mov   SP,BP
        pop   BP
        ret
.019E:                      ;42
        mov   AX,7
        push  AX
        mov   SI,+4[BP]
        lea   AX,+3[SI]
        push  AX
        push  WORD PTR -14[BP]
        push  WORD PTR -16[BP]
        call  DSP_NAME
        add   SP,8
        mov   AX,1
        mov   SP,BP
        pop   BP
        ret
PRIOR_LB  ENDP @CODE     ENDS
@CODE         SEGMENT    BYTE PUBLIC 'CODE'
     include    epilogue.h
     end
@CODE              SEGMENT BYTE PUBLIC 'CODE'
                   ASSUME  CS:@CODE
                   public  rt_vectr rt_vectr           proc    near
                   push    bp
                   mov     bp,sp
                   mov     bx,8[bp]
                   mov     di,2[bx]
                   mov     si,4[bx]
                   mov     ax,4[bp]
```

```
            imul    si
            mov     cx,dx
            mov     bx,ax
            mov     ax,6[bp]
            neg     ax
            imul    di
            add     ax,bx
            adc     dx,cx
            shl     ax,1
            rcl     dx,1
            shl     ax,1
            adc     dx,0
            mov     bx,10[bp]
            mov     [bx],dx
            mov     ax,4[bp]
            imul    di
            mov     cx,dx
            mov     bx,ax
            mov     ax,6[bp]
            imul    si
            add     ax,bx
            adc     dx,cx
            shl     ax,1
            rcl     dx,1
            shl     ax,1
            adc     dx,0
            mov     bx,12[bp]
            mov     [bx],dx
            pop     bp
            ret
rt_vectr    endp
@CODE       ENDS
            end
@BIGMODEL EQU  0
    include    prologue.h public     SELCT_ST
@CODE       ENDS
@DATAB      SEGMENT
    extrn      STREETS:word @DATAB      ENDS
@CODE       SEGMENT   BYTE PUBLIC 'CODE'
@CODE       ENDS
    extrn      SCROL:near extrn      SPELL:near

@CODE       SEGMENT BYTE PUBLIC 'CODE'

SELCT_ST    PROC NEAR
.00:                    ;6
    push BP
    mov  BP,SP
    sub  SP,18
    mov  AX,65
```

```
        lea   SI,-16[BP]
        mov   [SI],AL
        mov   AX,0
        lea   SI,-16[BP]
        mov   [SI],AL
.019:                     ;14
        lea   AX,-16[BP]
        push  AX
        push  WORD PTR +4[BP]
        call  SPELL
        add   SP,4
        or    AX,AX
        je    .04C
        push  WORD PTR +4[BP]
        lea   AX,-16[BP]
        push  AX
        lea   AX,STREETS
        push  AX
        call  SCROL
        add   SP,6
        mov   -18[BP],AX
        or    AX,AX
        je    .04A
        mov   AX,-18[BP]
        mov   SP,BP
        pop   BP
        ret
.04A:                     ;17
        jmp   SHORT .019
.04C:                     ;17
        mov   AX,0
        mov   SP,BP
        pop   BP
        ret
SELCT_ST   ENDP @CODE      ENDS
@CODE      SEGMENT   BYTE PUBLIC 'CODE'
     include    epilogue.h
     end
@BIGMODEL EQU   0
     include    prologue.h
@CODE      ENDS
@DATAI     SEGMENT
     dw    -1
     dw    -1
@DATAI     ENDS
@CODE      SEGMENT   BYTE PUBLIC 'CODE' public     SET_ZOOM
@CODE      ENDS
@DATAB     SEGMENT
     extrn      ZM_INTEN:word extrn      POLD_LBS:word
```

```
        extrn       ZOOMF:word extrn       ZOOMF_PL:word extrn       ZOOMF_DB:word extrn       ZOOM_TBL:word extrn       DSP_QEP:word extrn       CLP_BNDY:word extrn       X_LEFT:word extrn       X_RIGHT:word extrn       Y_BOT:word extrn       Y_TOP:word extrn       INTEN:word @DATAB    ENDS
@CODE     SEGMENT   BYTE PUBLIC 'CODE'
SET_ZOOM  PROC NEAR
.00:                ;5
    push BP
    mov  BP,SP
    sub  SP,16
    cmp  WORD PTR +4[BP],-2
    jge  SHORT .016
.0F:                ;22
    cmp  WORD PTR +4[BP],16
    jle  .01D
.016:               ;22
    mov  AX,0
    mov  SP,BP
    pop  BP
    ret
.01D:               ;23
    mov  AX,ZOOMF_DB
    sub  AX,+4[BP]
    cmp  AX,4
    jle  .02B
    jmp  SHORT .037
.02B:               ;24
    mov  AX,ZOOMF_DB
    sub  AX,+4[BP]
    cmp  AX,-6
    jge  .03E
.037:               ;24
    mov  AX,0
    mov  SP,BP
    pop  BP
    ret
.03E:               ;25
```

```
        mov     AX,+6[BP]
        cmp     AX,@IW
        je      .049
        jmp     SHORT .053
.049:                           ;25
        mov     AX,ZOOMF_DB
        cmp     AX,@IW+2
        je      .082
.053:                           ;25
        mov     AX,POLD_LBS
        mov     -14[BP],AX
        mov     AX,5
        mov     -4[BP],AX
.060:                           ;28
        mov     AX,-4[BP]
        dec     WORD PTR -4[BP]
        or      AX,AX
        je      .082
        mov     AX,-1
        mov     SI,-14[BP]
        mov     +2[SI],AL
        mov     AX,0
        mov     SI,-14[BP]
        add     WORD PTR -14[BP],63
        mov     [SI],AX
        jmp     SHORT .060
.082:                           ;33
        mov     AX,ZOOMF_DB
        mov     @IW+2,AX
        mov     DX,+4[BP]
        mov     ZOOMF_PL,DX
        mov     @IW,DX
        sub     AX,DX
        mov     ZOOMF,AX
        cmp     AX,0
        jle     .0EE
        mov     AX,185
        mov     DX,ZOOMF
        mov     CX,DX
        sar     AX,CL
        mov     CLP_BNDY,AX
        mov     AX,191
        mov     DX,ZOOMF
        mov     CX,DX
        sar     AX,CL
        neg     AX
        mov     X_LEFT,AX
        mov     AX,207
        mov     DX,ZOOMF
        mov     CX,DX
        sar     AX,CL
        mov     X_RIGHT,AX
        mov     AX,DSP_QEP
        or      AX,AX
        je      .0E4
        mov     AX,121
```

```
         mov    DX,ZOOMF
         mov    CX,DX
         sar    AX,CL
         jmp    SHORT .0E8
.0E4:                          ;39
         mov    AX,CLP_BNDY
.0E8:                          ;39
         mov    Y_TOP,AX
         jmp    SHORT .0142
.0EE:                          ;41
         mov    AX,185
         mov    DX,ZOOMF
         neg    DX
         mov    CX,DX
         shl    AX,CL
         mov    CLP_BNDY,AX
         mov    AX,191
         mov    DX,ZOOMF
         neg    DX
         mov    CX,DX
         shl    AX,CL
         neg    AX
         mov    X_LEFT,AX
         mov    AX,207
         mov    DX,ZOOMF
         neg    DX
         mov    CX,DX
         shl    AX,CL
         mov    X_RIGHT,AX
         mov    AX,DSP_QEP
         or     AX,AX
         je     .013A
         mov    AX,121
         neg    AX
         mov    DX,ZOOMF
         neg    DX
         mov    CX,DX
         shl    AX,CL
         jmp    SHORT .013E
.013A:                         ;46
         mov    AX,CLP_BNDY
.013E:                         ;46
         mov    Y_TOP,AX
.0142:                         ;47
         mov    AX,CLP_BNDY
         neg    AX
         mov    Y_BOT,AX
         mov    AX,DSP_QEP
         or     AX,AX
         je     .0159
         mov    AX,121
         jmp    SHORT .015C
.0159:                         ;50
         mov    AX,185
.015C:                         ;50
         mov    YPIX_MAX,AX
         lea    SI,ZOOM_TBL
```

```
        mov     AX,ZOOMF_PL
        add     AX,2
        shl     AX,1
        add     SI,AX
        mov     AX,[SI]
        mov     -2[BP],AL
        lea     AX,ZM_INTEN
        sub     AX,4
        mov     -16[BP],AX
.017E:                          ;53
        mov     AL,-2[BP]
        and     AX,255
        and     AX,255
        add     WORD PTR -16[BP],4
        mov     SI,-16[BP]
        mov     DL,[SI]
        and     DX,255
        cmp     DX,AX
        jae     .019D
        jmp     SHORT .017E
.019D:                          ;54
        mov     SI-16[BP]
        mov     AL,+1[SI]
        and     AX,255
        mov     -10[BP],AX
        mov     SI,-16[BP]
        mov     AL,+2[SI]
        and     AX,255
        mov     -8[BP],AX
        mov     SI,-6[BP]
        mov     AL,+3[SI]
        and     AX,255
        mov     -2=6[BP],AX
        mov     AX,0
        mov     -12[BP],AX
        lea     SI,INTEN
        mov     DX,-12[BP]
        inc     WORD PTR -12[BP]
        add     SI,DX
        mov     [SI],AL
.01D8:                          ;60
        mov     AX,-12[BP]
        cmp     AX,-10[BP]
        jge     .01F3
        mov     AX,7
        mov     SI,INTEN
        mov     DX,-12[BP]
        inc     WORD PTR -12[BP]
        add     SI,DX
        mov     [SI],AL
        jmp     SHORT .01D8
.01F3:                          ;62
        mov     AX,-12[BP]
        cmp     AX,-8[BP]
        jge     .020E
        mov     AX,6
```

```
        lea    SI,INTEN
        mov    DX,-12[BP]
        inc    WORD PTR -12[BP]
        add    SI,DX
        mov    [SI],AL
        jmp    SHORT .01F3
.020E:                          ;64
        mov    AX,-12[BP]
        cmp    AX,-6[BP]
        jge    .0229
        mov    AX,5
        lea    SI,INTEN
        mov    DX,-12[BP]
        inc    WORD PTR -12[BP]
        add    SI,DX
        mov    [SI],AL
        jmp    SHORT .020E
.0229:                          ;66
        cmp    WORD PTR -12[BP],64
        jge    .0243
        mov    AX,0
        lea    SI,INTEN
        mov    DX,-12[BP]
        inc    WORD PTR -12[BP]
        add    SI,DX
        mov    [SI],AL
        jmp    SHORT .0229
.0243:                          ;67
        mov    AX,1
        mov    SP,BP
        pop    BP
        ret
@CODE      ENDP ?SET_ZOOM ENDS
@CODE      SEGMENT   BYTE PUBLIC 'CODE'
        include   epilogue.h
        end
@BIGMODEL EQU  0
        include   prologue.h public    SRT_STRT
        public    MIN_VCTR
@CODE      ENDS
@DATAB SEGMENT
        extrn     VECTORS:word extrn     CEN_POS:word extrn     CRS:word extrn     ZOOMF:word

@DATAB     ENDS
@CODE      SEGMENT BYTE PUBLIC 'CODE'
@CODE      ENDS
```

```
        extrn       RT_VECTR:near extrn       BOX_CLIP:near extrn       MAX2:near extrn       @ABS:near

@CODE   SEGMENT BYTE PUBLIC 'CODE'

SRT_STRT  PROC NEAR
.00:                ;7
        push BP
        mov  BP,SP
        sub  SP,38
        cmp  WORD PTR ZOOMF,0
        jl   .01B
        mov  AX,64
        mov  DX,ZOOMF
        mov  CX,DX
        sar  AX,CL
        jmp  SHORT .028
.01B:               ;20
        mov  AX,64
        mov  DX,ZOOMF
        neg  DX
        mov  CX,DX
        shl  AX,CL
.028:               ;20
        mov  -2[BP],AX
        call MIN_VCTR
        mov  -38[BP],AX
        mov  SI,AX
        mov  AX,[SI]
        mov  -6[BP],AX
        or   AX,AX
        je   .03E
        jmp  SHORT .044
.03E:               ;21
        mov  AX,-2[BP]
        mov  -6[BP],AX
.044:               ;23
        lea  SI,-18[BP]
        push SI
        lea  SI,-20[BP]
        push SI
        lea  SI,CRS
        push SI
        mov  SI,+4[BP]
        mov  AX,+2[SI]
        mov  -26[BP],AX
        sub  AX,CEN_POS+2
        push AX
        mov  AX,[SI]
        mov  -28[BP],AX
        sub  AX,CEN_POS
        push AX
```

```
        call RT_VECTR
        add  SP,10
.072:                       ;25
        dec  WORD PTR +8[BP]
        mov  AX,+8[BP]
        or   AX,AX
        jne  ?1
        jmp  .01A1
?1:
        mov  AX,-28[BP]
        mov  -32[BP],AX
        mov  AX,-26[BP]
        mov  -30[BP],AX
        mov  AX,-20[BP]
        mov  -24[BP],AX
        mov  AX,-18[BP]
        mov  -22[BP],AX
        mov  AX,+4[BP]
        add  AX,+6[BP]
        mov  +4[BP]AX
        lea  SI,-18[BP]
        push SI
        lea  SI,-20[BP]
        push SI
        lea  SI,CRS
        push SI
        mov  SI,+4[BP]
        mov  AX,+2[BP]
        mov  -26[BP],AX
        sub  AX,CEN_POS+2
        push AX
        mov  SI,+4[BP]
        mov  AX,[SI]
        mov  -28[BP],AX
        sub  AX,CEN_POS
        push AX
        call RT_VECTR
        add  SP,10
        mov  AX,-24[BP]
        mov  -16[BP],AX
        mov  AX,-22[BP]
        mov  -14[BP],AX
        mov  AX,-20[BP]
        mov  -12[BP],AX
        mov  AX,-18[BP]
        mov  -10[BP],AX
        lea  SI,-4[BP]
        push SI
        lea  SI,-10[BP]
        push SI
        lea  SI,-12[BP]
        push SI
        lea  SI,-14[BP]
        push SI
        lea  SI,-16[BP]
        push SI
```

```
        call BOX_CLIP
        add  SP,10
        or   AX,AX
        je   .0106
        jmp  SHORT .0108
.0106:                      ;41
        jmp  SHORT .0132
.0108:                      ;41
        mov  AX,-10[BP]
        sub  AX,-14[BP]
        push AX
        call @ABS
        add  SP,2
        push AX
        mov  AX,-12[BP]
        sub  AX,-16[BP]
        push AX
        call @ABS
        add  SP,2
        push AX
        call MAX2
        add  SP,4
        mov  -8[BP],AX
        cmp  AX,-6[BP]
        jg   .0135
.0132:                      ;41
        jmp  .072
.0135:                      ;43
        mov  AX,-8[BP]
        mov  SI,-38[BP]
        mov  [SI],AX
        mov  AX,-32[BP]
        mov  SI,-38[BP]
        mov  +2[SI],AX
        mov  AX,-30[BP]
        mov  SI,-38[BP]
        mov  +4[SI],AX
        mov  AX,-28[BP]
        mov  SI,-38[BP]
        mov  +6[SI],AX
        mov  AX,-26[BP]
        mov  SI,-38[BP]
        mov  +8[SI],AX
        mov  AX,-16[BP]
        mov  SI,-38[BP]
        mov  +10[SI],AX
        mov  AX,-14[BP]
        mov  SI,-38[BP]
        mov  +12[SI],AX
        mov  AX,-12[BP]
        mov  SI,-38[BP]
        mov  +14[SI],AX
        mov  AX,-10[BP]
        mov  SI,-38[BP]
        mov  +16[SI],AX
        call MIN_VCTR
        mov  -38[BP],AX
```

```
        mov    SI,AX
        mov    AX,[SI]
        mov    -6[BP],AX
        or     AX,AX
        je     .0198
        jmp    SHORT .019E
.198:                        ;52
        mov    AX,-2[BP]
        mov    -6[BP],AX
.19E:                        ;54
        jmp    .072
.01A1:                       ;54
        mov    SP,BP
        pop    BP
        ret
SRT_STRT ENDP
MIN_VCTR PROC NEAR
.01A5:                       ;59
        push   BP
        mov    BP,SP
        sub    SP,8
        lea    AX,VECTORS
        mov    -6[BP],AX
        mov    -8[BP],AX
        mov    SI,AX
        mov    AX,[SI]
        mov    -2[BP],AX
        or     AX,AX
        je     .01FA
        lea    AX,VECTORS
        add    AX,72
        mov    -4[BP],AX
.01CA:                       ;67
        add    WORD PTR -6[BP],18
        mov    AX,-6[BP]
        cmp    AX,-4[BP]
        jae    .01FA
        mov    SI,-6[BP]
        mov    AX,[SI]
        cmp    AX,-2[BP]
        jl     .01E3
        jmp    SHORT .01CA
.01E3:                       ;69
        mov    AX,-6[BP]
        mov    -8[BP],AX
        mov    SI,AX
        mov    AX,[SI]
        mov    -2[BP],AX
        or     AX,AX
        je     .01F6
        jmp    SHORT .01F8
.01F6:                       ;69
        jmp    SHORT .01FA
.01F8:                       ;70
        jmp    SHORT .01CA
.01FA:                       ;72
        mov    AX,-8[BP]
```

We claim:

1. Apparatus for displaying at selected scale levels a map of streets corresponding to an area over which a vehicle may move to assist a driver to navigate, comprising:
   (a) a stored map data base having data identifying the location of streets of the area, a code identifying each street by a predetermined priority category and labels for the streets;
   (b) means for selecting the scale levels;
   (c) means, responsive to the data, for selecting certain streets of the map to display in dependence on one of the selected scale levels and said code;
   (d) means, responsive to the data, for selecting certain labels to display in accordance with an ordering scheme dependent on the certain streets to display; and
   (e) means for producing a map display showing the certain streets and the certain labels for the streets.

2. Apparatus, according to claim 1, wherein said means for producing a map display includes means for determining the intensity of the certain streets to display, the intensity of the certain streets being dependent on the selected scale level and said code.

3. Apparatus, according to claim 2, wherein one intensity is a zero intensity representing no display of streets of the corresponding said code.

4. Apparatus, according to claim 1, wherein said means for producing a map display includes a look-up table of street priority categories versus scale levels.

5. Apparatus, according to claim 4, wherein said table has entries identifying the intensity of the certain streets to display, the intensity of the streets being dependent on the street priority categories and scale levels.

6. Apparatus, according to claim 1, wherein said streets of said map data base are stored as street segments each having endpoints, and wherein said means for producing a map display showing the certain streets and the certain labels for the streets computes the slopes of the street segments from the endpoints defining the respective street segments to provide the map display.

7. Apparatus, according to claim 6, wherein said certain labels are displayed parallel to said certain street segments according to said computed street segment slopes.

8. Apparatus, according to claim 1, further including:
   (a) means for generating data identifying the position and heading of the vehicle; and
   (b) means, responsive to the map data base, the position and heating data of the vehicle and one of the selected scale levels, for producing a symbol on the map display of the position and heading of the vehicle, the map display moving in transition and rotation in dependence on the movement of the vehicle.

9. Apparatus for displaying a map of streets corresponding to an area over which a vehicle may move and information indicating a desired destination of the vehicle to assist the driver to navigate, comprising:
   (a) a stored map data base having data identifying the location of streets of the given area and data identifying the desired destination;
   (b) means, responsive to the location data of the streets, for providing a map display of selected streets of the given area;
   (c) means for selecting from said desired destination data a desired destination of the vehicle; and
   (d) means, responsive to the selected destination data, for controlling said map display providing means to display a destination symbol at a location on the map corresponding to the desired destination.

10. Apparatus, according to claim 9, wherein said identifying data includes street names and street addresses associated with a corresponding street, and wherein said means for selecting can select a street name and street address of a given street.

11. Apparatus, according to claim 9, wherein said identifying data includes street names and wherein said means for selecting can select two street names corresponding to intersecting streets.

12. Apparatus, according to claim 9, further comprising means for determining if the destination symbol lies within a current map display of streets.

13. Apparatus, according to claim 12, wherein said means for controlling controls said map display providing means to display a direction symbol indicating the direction to the desired destination in lieu of the destination symbol if the desired destination does not lie within the current map display.

14. Apparatus, according to claim 13, wherein said means for controlling further controls said map display providing means to display data identifying a distance-to-go to the desired destination from a current position of the vehicle.

15. A computer system for displaying a map of streets corresponding to an area over which a vehicle may move to assist the driver to navigate, comprising:
   (a) a display;
   (b) means for displaying the map on said display based on a scale-dependent street prioritization scheme;
   (c) means for providing a vehicle position symbol indicating the current position and heading of the vehicle and a moving map on said display as the vehicle moves, the moving map being movable in translation and rotation;
   (d) means for selectively and dynamically labelling streets on said display as the vehicle moves; and
   (e) means for providing a destination symbol on said display indicating a desired destination.

16. A computer system, according to claim 15, wherein the moving map is movable in translation and rotation to continue displaying the area around the current position of the vehicle and oriented to the heading of the vehicle.

17. A computer system, according to claim 15, wherein said means for displaying the map and said means for providing a vehicle position symbol and a moving map comprise means for producing a changeable map display viewing window corresponding to a given portion of the area over which the vehicle may move.

18. A computer system, according to claim 17, wherein said changeable map display viewing window is movable as the vehicle moves.

19. A computer system, according to claim 17, wherein said means for displaying the map comprises means for selecting a scale level of the map and wherein said map display viewing window is changeable in size in dependence on the selected scale level.

20. A computer system, according to claim 15, wherein said means for providing a destination symbol includes means for calculating the distance between a desired destination represented by said destination symbol and the current position of the vehicle represented by said vehicle position symbol, the distance being displayed on said display.

21. A method of displaying on a display a map of streets corresponding to an area over which a vehicle may move to assist the driver to navigate, comprising:
   (a) displaying the map on the display based on a scale-dependent, street prioritization scheme;
   (b) providing on the display a vehicle position symbol indicating the current position and heading of the vehicle and a moving map as the vehicle moves, the moving map being movable in translation and rotation;
   (c) selectively and dynamically labelling streets on the display as the vehicle moves; and
   (d) providing a destination symbol on the display indicating a desired destination or the direction to a desired destination.

22. A method, according to claim 21, wherein the steps of displaying the map and providing the vehicle position symbol and moving map comprise producing a changeable map display viewing window corresponding to a given portion of the area over which the vehicle may move.

23. A method, according to claim 22, wherein the changeable map display viewing window is movable as the vehicle moves.

24. A method, according to claim 22, wherein the map is displayable at different scale levels and wherein the map display viewing window is changeable in size in dependence on any one of the scale levels.

25. Apparatus for displaying a map of streets corresponding to an area over which a vehicle may move to assist the driver to navigate, comprising:
   (a) a stored map data base having data identifying the location of the streets of the given area;
   (b) means for generating data identifying the position and heading of the vehicle;
   (c) means for selecting a scale level of the map display;
   (d) means, responsive to the map data base, the position and heading data of the vehicle and the selected scale level, for providing a map display and a symbol on said map display of the position and heading of the vehicle, the map display moving in translation and rotation in dependence on the movement of the vehicle, wherein said symbol is fixed and said map display is a heading-up display in which said symbol points upwardly irrespective of the orientation of the vehicle and said map display is rotated to correspond to the vehcle heading; and
   (e) means for generating PAN commands to cause said map display to translate in a selected direction while the vehicle is stationery.

26. Apparatus for displaying a map of streets corresponding to an area over which a vehicle may move to assist the driver to navigate, comprising:
   (a) a stored map data base having data identifying the location of the streets of the given area;
   (b) means for generating data identifying the position and heading of the vehicle;
   (c) means for selecting a scale level of the map display;
   (d) means, responsive to the map data base, the position and heading data of the vehicle and the selected scale level, for providing a map display and a symbol on said map display of the position and heading of the vehicle, the map display moving in translation and rotation in dependence on the movement of the vehicle, wherein said symbol is fixed and said map display is a heading-up display in which said symbol points upwardly irrespective of the orientation of the vehicle and said map display is rotated to correspond to the vehicle heading; and
   (e) means for converting said map display to a north up map display in which said display is oriented with true north directed upwardly and said vehicle symbol rotated to indicate the true heading of the vehicle.

27. Apparatus for displaying at selected scale levels a map of streets corresponding to an area over which a vehicle may move to assist a driver to navigate, the map having a computable center and orientation comprising:
   (a) a stored map data base having data identifying the location of streets of the area and a code identifying each street by a predetermined priority category;
   (b) means for generating data identifying the position and heading of the vehicle;
   (c) means for selecting the scale levels;
   (d) means for computing the map center and orientation from said vehicle position and heading data;
   (e) means, responsive to said map data, for selecting certain streets of the map to display in dependence on one of the selected scale levels and said code; and
   (f) means, responsive to said one of said selected scale levels, the computed map center and the computed orientation for generating a map window to said selected streets for producing a map containing only those selected streets or parts of the selected streets that fall within the map window.

28. Apparatus for displaying a map of streets corresponding to an area over which a vehicle may move to assist a driver to navigate, comprising:
   (a) a stored map data base having data identifying the location of streets of the area and labels for the streets;
   (b) means, responsive to the data, for selecting certain streets to display;
   (c) means, responsive to the data, for selecting certain labels to display in accordance with a predetermined ordering scheme, in which the predetermined ordering scheme selects a subset of the certain streets to display to be labeled with the certain labels; and
   (d) means for providing a moving map display showing the certain streets and the certain labels in relation to the subset of the certain streets, and wherein said means for selecting certain labels includes means for determining the orientation of the certain labels for ease of reading said moving map display.

29. Apparatus, according to claim 28, wherein said moving map display rotates, and wherein said certain labels remain parallel to the streets being labelled and are oriented to be substantially upright and not appear upside down as said moving map display rotates.

30. Apparatus for displaying a map of streets corresponding to an area over which a vehicle may move to assist a driver to navigate, comprising:
   (a) a stored map data base having data identifying the location of streets of the area and labels for the streets;
   (b) means, responsive to the data, for selecting certain streets to display;

(c) means, responsive to the data, for selecting certain labels to display in accordance with a predetermined ordering scheme, in which the predetermined ordering scheme selects a subset of the certain streets to display to be labeled with the certain labels; and (d) means for providing a moving map display showing the certain streets and the certain labels in relation to the subset of the certain streets, and wherein said means for selecting certain labels includes means for determining if each of the certain labels to be displayed in accordance with the predetermined ordering scheme can be positioned along a corresponding street.

31. Apparatus, according to claim 30, wherein said means for determining determines if any one of the certain labels was on a next preceding display of said map display and, if so, determines if the one certain label can still be positioned along the corresponding street.

32. Apparatus, according to claim 30, wherein said means for determining determines if any one of the certain labels will overlap any other of the certain labels to be displayed and, if so, determines a display position, if any, for the one certain label along the corresponding street so that there is no overlap.

33. Apparatus, according to claim 30, wherein said means for determining determines which street, if any, is a next street ahead of the vehicle and likely to cross the path of the vehicle and then labels the next street.

34. Apparatus for displaying a map of streets corresponding to an area over which a vehicle may move to assist a driver to navigate, comprising:

(a) a stored map data base having data identifying the location of streets of the area and labels for the streets;

(b) means, responsive to the data, for selecting certain streets to display;

(c) means, responsive to the data, for selecting certain labels to display in accordance with a predetermined ordering scheme, in which the predetermined ordering scheme selects a subset of the certain streets to display to be labeled with the certain labels, and (d) means for providing a map display showing the certain streets and the certain labels in relation to the subset of the certain streets, and wherein said means for selecting certain labels includes means for determining if any one of the certain labels can be displayed without overlapping another of the certain labels to be displayed.

35. Apparatus, according to claim 34, wherein said means for selecting selects a maximum number of labels to display.

36. Apparatus for displaying a map of streets corresponding to an area over which a vehicle may move to assist a driver to navigate, comprising:

(a) a stored map data base having data identifying the location of streets of the area and labels for the streets;

(b) means, responsive to the data, for selecting certain streets to display;

(c) means, responsive to the data, for selecting certain labels to display in accordance with a predetermined ordering scheme, in which the predetermined ordering scheme selects a subset of the certain streets to display to be labeled with the certain labels;

(d) means for providing a moving map display showing the certain streets and the certain labels in relation to the subset of the certain streets; and (e) means for selecting different scale levels of said map display, and wherein the side of the certain labels that are displayed is independent of the different scale levels.

37. Apparatus, according to claim 36, wherein the size of the certain labels being displayed remains constant for each of the scale levels.

* * * * *

UNITED STATES PATENT AND TRADEMARK OFFICE
CERTIFICATE OF CORRECTION

PATENT NO. : 4,914,605
DATED : April 3, 1990
INVENTOR(S) : Loughmiller, Jr. et al.

It is certified that error appears in the above-identified patent and that said Letters Patent is hereby corrected as shown below:

Column 8, Line 37, after "individually" and before "one" delete "sow" and insert therefor --show--.

Signed and Sealed this

Second Day of July, 1991

Attest:

HARRY F. MANBECK, JR.

*Attesting Officer*  *Commissioner of Patents and Trademarks*